United States Patent
Graff

(10) Patent No.: US 7,908,202 B2
(45) Date of Patent: Mar. 15, 2011

(54) COMPUTER SYSTEM TO GENERATE FINANCIAL ANALYSIS OUTPUT

(75) Inventor: Richard A. Graff, Chicago, IL (US)

(73) Assignee: Graff/Ross Holdings, LLP, Chicago, IL (US)

(*) Notice: Subject to any disclaimer, the term of this patent is extended or adjusted under 35 U.S.C. 154(b) by 464 days.

(21) Appl. No.: 11/599,086

(22) Filed: Nov. 14, 2006

(65) Prior Publication Data

US 2008/0120247 A1    May 22, 2008

Related U.S. Application Data

(63) Continuation of application No. 09/134,451, filed on Aug. 14, 1998, now Pat. No. 6,192,347, and a continuation of application No. 09/134,453, filed on Aug. 14, 1998, now Pat. No. 7,203,661, and a continuation of application No. 08/181,632, filed on Jan. 12, 1994, now Pat. No. 5,802,501, and a continuation of application No. 07/967,644, filed on Oct. 28, 1992, now abandoned.

(51) Int. Cl.
G06Q 40/00    (2006.01)

(52) U.S. Cl. .............................. 705/37; 705/35

(58) Field of Classification Search .............. 705/35, 705/37
See application file for complete search history.

(56) References Cited

U.S. PATENT DOCUMENTS

| | | | |
|---|---|---|---|
| 3,426,676 A | 2/1969 | Zielke | |
| 3,581,072 A | 5/1971 | Nymeyer | |
| 3,648,256 A | 3/1972 | Paine et al. | |
| 3,946,218 A | 3/1976 | Rode et al. | 235/156 |
| 4,412,287 A | 10/1983 | Braddock, III | |
| 4,674,044 A | 6/1987 | Kalmus et al. | |
| 4,739,478 A | 4/1988 | Roberts et al. | 364/408 |
| 4,751,640 A | 6/1988 | Lucas et al. | |
| 4,752,877 A | 6/1988 | Roberts et al. | |
| 4,789,928 A | 12/1988 | Fujisaki | |
| 4,823,265 A | 4/1989 | Nelson | |
| 4,860,238 A | 8/1989 | Kraker | |
| 4,903,201 A | 2/1990 | Wagner | |
| 4,980,826 A | 12/1990 | Wagner | |
| 5,038,284 A | 8/1991 | Kramer | |
| 5,077,665 A | 12/1991 | Silverman et al. | |
| 5,083,270 A | 1/1992 | Gross et al. | |
| 5,101,353 A | 3/1992 | Lupien et al. | 364/408 |

(Continued)

FOREIGN PATENT DOCUMENTS

EP    0 448 800 A1    12/1990

(Continued)

OTHER PUBLICATIONS

"Wall Stree; Let the Sun Shine on Muni Bonds" by Diana B. Henriques for the New York Times Mar. 3, 1991.*

(Continued)

Primary Examiner — James A Kramer
Assistant Examiner — James A Vezeris
(74) Attorney, Agent, or Firm — Peter K. Trzyna, Esq.

(57) ABSTRACT

An electronic system, the system for selling fixed income instruments, the system including a second computer having an output device and at least one buyer's computer having an electrically coupled input device and a monitor, the buyer's computer and the second computer being respectively located, the computers being used in cooperation in a multiple computer system in electronically communicating data between the computers.

199 Claims, 17 Drawing Sheets

U.S. PATENT DOCUMENTS

| | | | |
|---|---|---|---|
| 5,133,480 A | 7/1992 | Matsumoto et al. | |
| 5,136,501 A | 8/1992 | Silverman et al. | |
| 5,184,232 A | 2/1993 | Burney | |
| 5,220,500 A | 6/1993 | Baird et al. | |
| 5,243,331 A | 9/1993 | McCausland et al. | 345/172 |
| 5,243,515 A | 9/1993 | Lee | |
| 5,257,366 A | 10/1993 | Adair et al. | |
| 5,297,032 A | 3/1994 | Trojan et al. | 364/408 |
| 5,375,055 A | 12/1994 | Togher et al. | |
| 5,502,778 A | 3/1996 | Ishikawa et al. | |
| 5,557,517 A | 9/1996 | Daughterty, III | |
| 5,774,880 A | 6/1998 | Ginsberg | |
| 5,787,434 A | 7/1998 | Nakamura et al. | |
| 5,802,501 A | 9/1998 | Graff | 705/36 R |
| 5,857,176 A | 1/1999 | Ginsberg | |
| 5,950,175 A | 9/1999 | Austin | |
| 6,023,687 A | 2/2000 | Weatherly et al. | 705/38 |
| 6,167,384 A | 12/2000 | Graff | 705/35 |
| 6,192,347 B1 | 2/2001 | Graff | 705/36 |
| 6,393,406 B1 | 5/2002 | Eder | 705/7 |
| 6,760,709 B2 | 7/2004 | Graff | 705/35 |
| 6,947,907 B1 | 9/2005 | Silverman | 705/40 |
| 7,143,038 B2 | 11/2006 | Katae | 704/258 |
| 7,203,661 B1 | 4/2007 | Graff | 705/36 |
| 7,505,934 B1 | 3/2009 | Graff | 705/36 |
| 7,523,063 B2 | 4/2009 | Harrington et al. | 705/37 |
| 7,685,053 B2 | 3/2010 | Graff | |
| 2002/0138419 A1 | 9/2002 | Melone et al. | 705/38 |
| 2003/0225665 A1 | 12/2003 | Gross et al. | 705/36 |
| 2003/0229555 A1 | 12/2003 | Marlowe-Noren | 705/38 |
| 2004/0177029 A1 | 9/2004 | Hammour et al. | 705/38 |

FOREIGN PATENT DOCUMENTS

| | | |
|---|---|---|
| JP | 2003141355 | 5/2003 |

OTHER PUBLICATIONS

"The Nasdaq Stock Market, Inc." http://www.answers.com/topic/the-nasdaq-stock-market-inc.*

Notice of Allowance and Fee(s) Due for U.S. Appl. No. 11/088,419, mailed on Jan. 26, 2010. pp. 1-211.

Forsyth, Randall W.; Mutual Bonds Pilgrim's Progress; Barron's National Business and Financial Weekly; Mar. 23, 1992; p. 47.

Roger Lowenstein; The Wall Street Journal Europe; "MFS Funds Now Paying the Price for Strategy of Writing Options"; Jul. 23, 1991; pp. 1-2.

Evans, Mikael K; Industry Week; "A Tale of Two Assets"; Jan. 20, 1992; vol. 241; 241; Iss. 2; pp. 1-3.

Office Action-Restriction Requirement for U.S. Appl. No. 11/088,419, dated Oct. 30, 2007. pp. 1-8.

Amendment and Response to Restriction Requirement for U.S. Appl. No. 11/088,419, filed Feb. 29, 2008. pp. 1-17.

Supplemental Amendment and Response to Restriction Requirement for U.S. Appl. No. 11/088,419, filed Mar. 13, 2008. pp. 1-22.

Supplemental Amendment and Response to Restriction Requirement for U.S. Appl. No. 11/088,419, filed Oct. 28, 2008. pp. 1-34.

Second Preliminary Amendment for U.S. Appl. No. 11/088,419, filed Nov. 14, 2006. pp. 1-18.

United States Court of Appeals for the Federal Circuit, 2007-1485. *Muniauction, Inc.* v. *Thomson Corporation*. pp. 1-20.

Web Pages of Projector Center labeled as Projector Center, 2000-2002, projectorcenter.com, http://web.archive.org/web/20021026135235/http://www.projectorcenter.com/lease_end.asp, printed Jul. 19, 2005. pp. 1-4.

*Graff/Ross Holdings, LLP* vs. *Federal Home Loan Mortgage Corporation, Freddie Mac* "Plaintiff's Complaint for Patent Infringement and Demand for Jury Trial". pp. 1-873.

David Harrison, Shariah Financing Eases Muslims' Minds, Aug. 21, 2002.

Principles of Shariah Governing Islamic Investment Funds, Jan. 12, 2001, printed from www.albalagh.net, through www.archive.org, labeled as Albalagh.

Seyad Shariat Financing, Mar. 26, 2003, printed through www.archive.org.

Office Action-Final Rejection for U.S. Appl. No. 10/719,474, dated Jun. 20, 2005. pp. 1-9.

Amendment and Response for U.S. Appl. No. 10/719,474, filed Nov. 21, 2005. pp. 1-6.

Office Action for U.S. Appl. No. 10/719,474, dated Feb. 14, 2006. pp. 1-24.

Amendment and Response for U.S. Appl. No. 10/719,474, filed Jun. 12, 2006. pp. 1-3.

Office Action-Final Rejection for U.S. Appl. No. 10/719,474, dated Aug. 28, 2006. pp. 1-8.

Amendment entered with Request for Continued Examination for U.S. Appl. No. 10/719,474, filed Feb. 28, 2006. pp. 1-22.

Office Action for U.S. Appl. No. 10/611,305, dated Oct. 18, 2007. pp. 1-10.

Response for U.S. Appl. No. 10/611,305, filed Apr. 18, 2008. pp. 1-5.

Office Action for U.S. Appl. No. 10/885,569, dated Jun. 26, 2008. pp. 1-38.

Response for U.S. Appl. No. 10/885,569, filed Jul. 9, 2008. pp. 1-2.

Office Action for U.S. Appl. No. 10/885,569, dated Apr. 17, 2009. pp. 1-19.

Hawkins, George B. "Using Business Valuation Techniques to Quantify Discounts for Fractional Interests in Real Estate." Banister Financial, Inc. Reprinted from the Spring 1997 Issue.

Schlenger et al. "Discount Available When Property Was Held Partly Outright and Partly in QTIP Trust." Estate Planning, vol. 23, No. 9, p. 435(2), Nov. 1996.

Davidson, Brad. Valuation of Fractional Interests in Real Estate Limited Partnerships—Another Appraisal Journal, vol. 60, No. 2, p. 184(11), Apr. 1992.

Supplemental Amendment and Response for U.S. Appl. No. 11/088,419, filed May 21, 2009. pp. 1-127.

Bond Risk Software and Services Meet Perilous Challenge. Wall Street Computer Review. Oct. 1990. pp. 1-14.

Automation Positions New Firm for Growth. Wall Street Computer Review. Feb. 1991. pp 1-4.

Request for Ex Parte Reexamination Under 35 U.S.C. Section 302 and C.F.R. Section 1.510. U.S. Patent No. 6,192,347, issued on Feb. 20, 2001. U.S. Appl. No. 09/134,451, filed Aug. 14, 1998. Titled: Systems and Methods for Computing to Support Decomposing Property Into Separately Valued Components. Graff, Richard A. pp. 1-72.

1986 CapitaLink Securities Corp No Act Letters. pp. 1-10.

1990 CapitaLink Securities Corp and CapitaLink Bond Auctions, Inc. No Act Letters. pp. 1-32.

"EJV's UniVu Platform Offers Fixed-Income Data and Analytics". Feature. Jun. 24, 1991. pp. 1-2.

"MarketView Unveils its MarketStation Trader Workstation". Feature. Apr. 2, 1990. pp. 1-2.

"V Bank, Trading Desk Systems Develop Trader Workstation". Feature. Mar. 11, 1991. pp. 1-2.

Wunsch Auction Systems, Inc. Securities and Exchange Commission, Division of Market Regulation. Feb. 28, 1991. pp. 1-8.

Wall Street Computer Review. vol. 5, No. 8. May 1988. pp. 1-9.

Wall Street Computer Review. vol. 6, No. 12. Sep. 1989. pp. 1-10.

Office Action for U.S. Appl. No. 11/088,419, mailed on Aug. 7, 2009. pp. 1-30.

Amendment and Response for U.S. Appl. No. 11/088,419, filed Oct. 23, 2009. pp. 1-127.

Brennan, P.I., "Portfolio Managers Weather Global Risk Management Challenge," in Wall Street Computer Review, Oct. 1, 1989, vol. 7, No. 1, p. 20-24, 54-56 (Abstract only).*

Guttentag, J.M., "The Evolution of Mortgage Concepts," in Financial Analysts Journal, Jan./Feb. 1992, vol. 48, No. 1, pp. 39-46.*

Epstein, L., "Duration Gains Influence as Rates Fall," in Corporate Cashflow, May 1992, vol. 13, No. 5, pp. 50-51.*

Coughlan, F., "Financial Add-ins Lighten Load of 1-2-3 Users; Specialized Programs Save Buyers Time, Effort by Cutting Steps out of Complex Calculations," in PC Week, Sep. 21, 1992, vol. 9, No. 38, p. 145.*

The Miami Herald Myron Lubell Column, "Charitable Deductions Are a Matter of Strategy," The Miami Herald, Jul. 19, 1993.*

Benninga, S., Financial Modeling, Chapters 15-17, The MIT Press, Cambridge, Massachusetts, 1997.*

Anon., "The UK Post Office, GEC Marconi (UK) and Mitel (Canada) Have Agreed That GEC Marconi Will Make Microelectronic Devices Based on Mitel's ISO-CMOS Technology, Building a Special Site at the AEI Semiconductor Plant at Lincoln," Enginee Jun. 12, 1980.*

Anon., "Research on an Optical-Digital Computer That Would Use Light Beams and Optical Pathways to Replace Electrical Signals and Wires Is Being Performed by SA Collins, Prof of Electrical Engineering at State U.," Industry Week, May 3,m 1982, p. 42.*

Vleck, L., "Interfacing ESI021 and RPP 16-S Computers" (abstract only), Mechanizace Automatizace Administrativy, 1983, Vo 23, No. 8, p. 318-9.*

Mims, F.M., "Analog Computer Techniques for Digital Computers," Computers and Electronics, Sep. 1984, vol. 22, p. 2.*

Rosenberg, J. M., "Dictionary of. Banking and Financial Services," 1985, John Wiley and Sons, Second Edition, pp. 138,262511,550, 594, and 602.*

Walters, D., "Californai Tax Board Decides Not to Appeal to Supreme Court on Taxing Dividends," The Bond Buyer, Jun. 2, 1988, vol. 284, No. 27902 p. 3 (1131)*.

Sharp, A.D., "Advising Clients on Municipal Bonds," National Public Accountant, Sep. 1991, vol. 36, No. 9, pp. 42-44.*

Munn, G.G., et al., "Encyclopedia of Banking Finance," 1991, Bankers Publishing Company, Ninth Edition, pp. 976-977.*

Shapiro, L. et al., "Advantages of Active Matrix LCD Technology in Electronic Transparencies" (Abstract only), Proceedings of the SPIE-The International Society for Optical Engineering, Feb. 1992, vol. 1664, p. 150-2.*

Auster, "Amortizing Life Estates and Term Interests After the Revenue Reconciliation Act of 1989," TAXES—The Tax Magazine, 68, pp. 459-469 (1990).

Auster and Lau, "Corporate Split Purchase Strategies," TAXES-The Tax Magazine, pp. 857-865 (1998).

Blum, "Amortization of a Retained Terminable Interest After Transfer of a Remainder," TAXES—The Tax Magazine, vol. 62, No. 4, pp. 211-219 (1984).

Booth, Cashdan and Graff, "Real Estate: A Hybrid of Debt and Equity," Real Estate Review, pp. 54-58 (1989).

DeAngelo and Masulis, "Optimal Capital Structure Under Corporate and Personal Taxation," J of Financial Economics, 8, pp. 3-29 (1980).

Dohrmann, G., "Net Lease," The Institutional Real Estate Letter, vol. 3, No. 9, pp. 1-7 (Sep. 1991).

Graff, "Perspectives on Debt-and-Equity Decomposition for Investors and Issues of Real Estate Securities," J of Real Estate Research, vol. 7, No. 4, pp. 449-467 (1992).

Graff, "Rethinking Components of Real Estate Value," Pensions & Investments, p. 42 (1991).

Graff, "Some New Ideas in Real Estate Finance," J of Applied Corporate Finance, 3:1, pp. 77-89.

Graff, R., "The Impact of Tax Issues on Real Estate Debt and Equity Separation," Real Estate Review, 20:3, pp. 50-58 (1990).

Leimberg, et al., "The Schnepper-Leimberg Joint Purchase of a Life Estate and a Remainder Interest," Tax Notes Special Report, vol. 32, No. 10, pp. 981-984 (1986).

Miller, "Debt and Taxes," J of Finance, vol. 32, No. 2, pp. 261-275 (1977).

Modigliani and Miller, "Corporation Incom Taxes and the Cost of Capital: A Correction," American Economic Review, 53, pp. 433-443 (1963).

Modigliani and Miller, "The Cost of Capital, Corporation Finance and the Theory of Investment," American Economic Review, 48, pp. 261-297 (1958).

Renata Morgenstern, "Electronic Bidding for Municipal Bonds: Technology Innovations for Competitive Bond Sales", Government Finance Review, pp. 23-25, Feb. 2000.

Nicholas J. Dazzo, "In Today's Muni Market, Data Bases, Not Books, Provide Dealers, Clients With Timely Bond Data: Municipal bond dealers have never had it so easy", Public Finance Technology, p. 12A, vol. 289, No. 28217, Aug. 29, 1989.

"JP Morgan and Capital Link In Bid to Develop Electronic Auction for Corporate Debt Securities", Trading Systems Technology, vo. 2, N20, Apr. 24, 1989.

Richard Richtmyer, "Survey Shows Bond Market Is Warming Up to Electronic Trading", The Bond Buyer, vol. 321, No. 30213, Aug. 20, 1997.

Stirland, Sarah, "Wall Street Is Rattledby Software That Can Remake Competitive Deals," The Bond Buyer (Aug. 21, 1996).

Parity Reference manual, Version 2.7.

BidComp brochure, When you've been on the underwriting desk as long as we have—you've got to be better than good. (1990).

Running the Parity program, pp. 1-14.

Thomas, Rick, President MuniBid Inc., "Wall Street Players Shouldn't Block New Bidding Technology," The Bond Buyer (Oct. 21, 1996).

Whalen, Robert, "Pittsburgh Will Be First Issuer To Auction Bonds On The Web Maturity by Maturity," The Bond Buyer (Nov. 13, 1997).

Cohen Jodi B., "Muni Auction Takes Show on the Road, Pitches Case to Potential Customers," The Bond Buyer (Feb. 17, 1998).

Cullen, Terri, "Internet Auction Site for Muni Bonds Could Spark Changes in Credit Markets," The Wall Street Journal (Mar. 16, 1998).

Shields, Yvette, "Panelists at Odds Over Internet's Maturity Bidding," The Bond Buyer (May 22, 1998).

Letter from Peter K. Trzyna, Esq. dated Feb. 21, 2001.

Letter from Peter K. Trzyna, Esq. dated Mar. 1, 1999.

Grant Street Group Products & Services, http://www.grantstreet.com/information/products.html. 2 pages, copyright 1997-2001.

Grant Street Group Information, http://www.grantstreet.com/information!, 3 pages, copyright 1997-2001.

Hershey Jr., Robert D., "Trading In Bonds On Line, At Last," The NewYork Times (Jun. 27, 1999).

Pro, Johnna, City first in nation to use Internet to market, sell municipal bonds, Pittsburgh Post-Gazette (Nov. 19, 1997).

"Municipals Sales & Trading," A collection of Bloomberg Magazine Articles.

A Review of Electronic Trading System in the U.S. Fixed Income Securities Markets, The Bond Market Association (Oct. 1997).

Dalcomp brochure, "A Thomson Financial Services Company".

Press release, "Dalcomp Purchases Parity" (Jan. 5, 1998).

Press release, "Dalcomp Purchases Parity" (Jan. 5, 1998).

Thomson Municipal Group brochure, "Integrated Technology". http://www.BidOhio.com. Introduction, Internet materials (Jan. 8, 2001).

Richtmyer, Richard, "Muni Players Leery of Grant Street's Foray Into On-Line Bidding," The Bond Buyer, Jun. 11, 1997.

Whalen, Robert, "Pittsburgh Uses Internet for Pioneering GO Sale," The Bond Buyer (Nov. 19, 1997).

Whalen, Robert, "Pittsburgh Returns to Internet With $257 Million Pension Deal," The Bond Buyer (Feb. 4, 1998.

Whalen, Robert, Pittsburgh Pension Deal Blazes Maturity-By-Maturity Trail, The Bond Buyer (Feb. 5, 1998).

Notice of Sale, $167,440,000 City of Pittsburgh, Pennsylvania, General Obligation Refunding Bonds, Series A of 1996.

Clark, Kim, "On the Frontier of Creative Finance: How Wall Street Can Securitize Anything," Fortune (Apr. 28, 1997).

Bencivenga, Dominic, Pioneer Deal Uses Copyright to Raise Capital, The NewYork Law Journal (May 15, 1997.

Extracts from Videotape Deposition of Daniel Veres, pp. 102-109 (Mar. 20, 2003).

Marketing Agreement (Nov. 22, 1994), TF 002557-TF 002569. Securities and Exchange Commission, 17 CFR Parts 200, 228, 229, 230, 232, 239, 240, 270 and 274, "Use of Electronic Media for Delivery Purposes," (May 9, 1996), TF 005698-TF 005723.

Securities and Exchange Commission, 17 CFR Parts 228, 229, 230, 232, 239, 240, 249, 250, 259, 260, 269 and 274, "Rulemaking for Edgar System," (Dec. 19, 1994), TF 005724-TF 005794.

Securities and Exchange Commission, 17 CFRPart 240, "Municipal Securities Disclosure," TF 005795-TF 005851 (Nov. 10, 1994).

"Competitive Bond Offerings," (Oct. 8, 1997) TF 005942.

"There's a new standard calculations," TIPS, Summit NJ, (Jan. 1996), TF 012027-TF 012047.

Parity, "Running the Parity program," (1997 Twenty First Century Municipals, Inc.), TF 012406-TF 012421.

Parity, "A Real-Time, No-Risk Bidding Networking From 21 Century Municipals," (1992), TF 012542-TF 012546.

Bondbidder, "User's Guide Version 4.2," Financial Systems Group, Inc., Matthews, NC, TF 012645-TF 012645-TF 012645-TF 012691.
Marketing Agreement, (Nov. 22, 1994), TF 0012750-TF 012758.
Service Mark Application-Principal Register Based on Intent to Use, Mark: Parity and Design, (Mar. 25, 1992), TF 012759-TF 012761.
Trademark Interview and Amendment Record, (Jun. 4, 1992), TF o12764-TF 012766.
Notice of Acceptance of Statement of Use, Mark: Parity, (Feb. 26, 1993), TF 012768.
Certificate of Registration No. 1772581, (May 18, 1993), TF 012771TF 012772.
21 Century Municipals, Inc., "Customer Invoice Analysis" Jan. 1, 1996 to Dec. 31, 1996, (Apr. 14, 1997), TF 012773.
Brochure, MuniBid, "Optimizing Bond Sales for the Tax-Exempt Issuer,"TF 012795-TF 012796.
Resnick, Amy B., "Parity On-Line Bidding Program Wins Positive Reviews," TF 012797.
Parity bidding system, TF 012813-TF 012818.
Schory, Brenda, Kane County Chronicle, "Electronic Bid Option," TF 012819, TF013802 (May 27, 1993).
Parity Reference Manual, Version 1.22, (1993), TF 012820-TF 012820-TF 012852.
Bond Buyer Correspondence (1994), TF 012854-TF 012857.
"The Electronic Bid Submission System," TF 012858-TF 012866. Jul. 9, 1993.
Letter to Dalcomp from The Bond Buyer. Jun. 14, 1993 fax to American Banker-Bond Buyer, TF012871TFOI2872.
Notes, TF 012873-TF 012877.
Bond Buyer Memo, (Dec. 4, 1992), TF 112878.
Bond Buyer Marketing Plan and correspondence, (Jul. 7, 1992), TF 012881-TF 012883.
Notes, (1993),TF 012884-TFOI2896.
Oct. 13, 1994 memo from Davis Landes, TF 012906-TF 012908.
Oct. 27 notes, TF 012921-TF 012923.
Nov. 1994 notes, TF 012925-TF 012933.
Parity Bid Form, (1995), TF 012934-TF 012937.
Parity, "Product Description," TF 012940-TF 012944.
Deal Analysis Sheets, (1997), TF 013082-TF 013255.
Deal Analysis Sheets, (1996), TF 013261-TF 013634.
Audio Tape, GFOA 1996 Conference, Tuesday Morning General Session, "Technologies Beyond the Finance Office," C. Toregas, et al., TF054432.
Audio Tape, GFOA 1996 Conference, Opening General Session, T. Riordan; Mayor V. Kata, President's Address; Keynote-J. Connors, TF054433.
Audio Tape, GFOA 1996 Conference, "Reengineering the Finance Office," K. Keith, et al., TF 054434.
Audio Tape, GFOA 1996 Conference, "Offering Debt Information on the Internet," A. Anders, et al., TF 054435.
Audio Tape, GFOA 1996 Conference, "www Home Pages for Governments," B. Redlin et al., TF 054436.
Audio Tape, GFOA 1996 Conference, "Debt Affordability Analysis, A Comparative Approach," T. Firestone, et al., TF 054437.
Parity, "Host Computer Operating Guide," TF 01365-TF 013650.
Fax from Landes to Dalcomp, BidComp Summary Report, TF o13651-TF013652.
Parity, "Issue Viewer Program Screen Specs," TF 013653-TF 013670.
"Task Description and Notes," (Apr. 10, 1998), TF 01367I-TF 013687.
"Calendar of Parity issues" and other formats (1998), TF 013688-TF 013694.
Press Release, "Wis. electronic bid test passes without a hitch" (Sep. 15, 1998), TF 013703-TF 013704.
Whalen, Robert,The Bond Buyer, "No Fuss, No Muss for Wisconsin Deal, And Morgan Stanley Wins the Bid," (Sep. 16, 1998), TF 013705-TF 013707.
MuniBid brochure, "Optimizing Bond Sales for the Tax-Exempt Issuer," TF 013708-TF 013709.
BidComp disk, TF -13710.
The Bond Buyer's Worksheets, BidComp, TF 013711-TF 013714.
The Bond Swap Series, Piedmont Software Company, Charlotte, NC, TF 013715-TF 013728.

Parity, Reference Manual, Version 1.22 (Sep. 1, 1992), TF 013775TF013801.
"Instructions for Accessing Issuer Program" (Parity 1992-1994), TF o13805-TF 013813.
"Host Computer Operating Guide," TF 013814-TF 013823.
Parity, "Running the Parity program," TF 013829-TF 013843 (Parity 1993-1995).
"Now, All The Power of BidComp Can Fit in Your PC," TF 013944TF 013946.
FSG, "System Descriptions," Financial Systems Group, Inc., Matthews, NC, TF 014000-TF 014008.
FSG, Financial Systems Group, Inc., TF 014009-TF 014013. Parity, "Reference Manual, Version 2.7," TF 014016-TF 014051.
Government Finance Officers Association, "Technology and Public Finance, 90th Annual Conference, Portland, Oregon," (May 19-22, 1996), TF 054143-TF 054187.
Article, "Fax Your Bid to Brevard".
"Bid Submission Confirmation" (Jul. 21, 1992).
"Bidcomp Screen," "Parity Bid Entry Screen," text TF 002565.
Brochure: "It's the SIAIPSA Standard Securities Calculations Software Library. Produced by TIPS." TF 012033, 012035.Add.
"Bondbidder User's Guide, Version 4.2," Financial Systems Group, Inc., TF 012645-TF 012691.
Citations TF 050079-TF 050145 (printed Oct. 1, 2001).
RetroSearch, Sep. 13, 2001 TF 050146-TF 050150.
Citations TF 050151-TF050179 (printed Oct. 1, 2001).
Citations TF 050180-TF050185 (printed Sep. 13, 2001).
Citations TF 050186-TF 050338 (Printed Sep. 13, 2001).
Citations TF 050339-TF 050501 (Printed Oct. 2, 2001).
Citations TF 050502-TF 050530 (Printed Feb. 6, 2002).
Citations TF 050531-TF 050534 (Printed Feb. 6, 2002).
Citations TF 050535-TF 050706 (Printed Feb. 6, 2002).
Citations TF 050707-TF 050770 (Printed Feb. 6, 2002).
Citations TF 050771-TF 050775 (Printed Oct. 2, 2001).
Citations TF 050776-TF 050780 (Printed Oct. 2, 2001).
Citations TF 050781-TF 050787 (Printed Oct. 2, 2001).
Citations TF 050788-TF 050864 (Printed Oct. 2, 2001).
Citations: TF 054133-TF 954135 (Printed Apr. 18, 2002).
Bureau of the Public Debt online, "Public Debt's Strategic Plan 1997-2001" TF 050950-TF 050962, TF 050867-TF 050879.
Government Finance Officers Association—GFOA.ORG, TF 050963-TF 050987 (Copyright 2002).
Yahoo Premium Document Search, Search results, TF 050988-TF 051013 (Printed Feb. 6, 2002).
"Bidding Wars" TF 051014-TF 051016 (Oct. 10, 1997).
"Poway set to auction land in industrial part. (South Poway Business Park)," San Diego Business Journal, TF 051017-TF 051018 (Jul. 3, 1995).
Edwards, Cheryl L., "Open Market Operations in the 1990s," Federal Reserve Bulletin, pp. 859-874, TF 051045-TF 051060 (Nov. 1997).
"Onsale Brings Thrill of Auctions and Bargain Hunting Online; Unique Internet retail service debuts with week-long charity auction for The Computer Museum in Boston," TF 051625-TF 051627 (May 24, 1995).
Siegmann, "Nowhere to go but up," PC Week, v. 12, n. 42, TF 051628-TF 051630 (Oct. 23, 1995).
"Internet Booms-Dnsale joins fray as online shopping picks up speed," Computer Reseller News, p. 73 TF 051631,051632 (Jun. 5, 1995).
Federal Reserve Bank of New York Research and Market Analysis Group, "Publications & Other Research 1997," TF 051779-TF 051822.
Bartolini, L. and Cottarelli, C., "Designing Effective Auctions for Treasury Securities," Federal Reserve Bank of New York Current Issues In Economics and Finance, vol. 3, No. 9, TF 051817-TF 051822, TF 050003-TF 050073 (Jul. 1997).
Federal Reserve Bank of New York Research and Market Analysis Group, "Publications & Other Research 1995," TF 051826-TF 051863.
Reinhart, Y, "An Analysis of Potential Treasury Auction Techniques," Federal Reserve Bulletin (Jun. 1992) TF 051893-TF 051903.

Mester, Loretta J., "There's More than One Way to Sell a Security: The Treasury's Auction Experiment," Business Review (Jul./Aug. 1995) TF 051906-TF 051920.

Friedman, Milton, "How to Sell Government Securities," The Wall Street Journal, p. A8 (Aug. 28, 1991), TF 051921-TF 051923.

Stevens, E.J. and Dumitru, Diana, "Auctioning Treasury Securities,". Economic Commentary Federal Reserve Bank of Cleveland (Jun. 15, 1992) TF 051924-TF 051927.

Brochure, "The Finance Officer and The Communities of Tomorrow," Conference dates: Jun. 1-4, 1997, Exhibit dates: Jun. 1-3, 1997, Application/Contract for Exhibit Space, Registration Form, TF 051928-TF 051935.

Preliminary Conference Program, "The Finance Officer and The Communities of Tomorrow," 91 Annual Conference, Jun. 1-4, 1997, TF 051937-TF 051952.

"Joint Report on the Government Securities Market," TF 051953-TF 051953-TF 052148 (Jan. 1992).

Miller, Preston J. and Roberds, William, "How Little We Know About Deficit Policy Effects," Federal Reserve Bank of Minneapolis Quarterly Review Winter 1992, TF 052149-TF 052168.

Umlauf, Steven R., "An empirical study of the Mexican Treasury bill auction," Journal of Financial Economics 33 (1993) 313-340. North-Holland, TF 052169-TF 052196 (1993).

Brochure, "Integrated Technology," Thomson Municipal Group, TF 002702-TF 002706.

White, Wilson, "Basics, The Municipal Bond Market," TF 006782TF-007043 (1985).

Fundamentals of Municipal Bonds, Fourth Edition, Public Securities Association, TF 007044-TF 007280 (1990).

Glossary of Municipal Securities Terms, First Edition: 1985 Municipal Securities Rulemaking Board, TF 007281-TF 007396.

Security Industry Trends, An Analysis of Emerging Trends in the Securities Industry, vol. XXII, No. 4, "America's Financial Market-A Global Capital Pool," TF 010721-TF 010732 (Aug. 30, 1996).

Security Industry Trends, An Analysis of Emerging Trends in the Securities Industry, vol. XXII, No. 3, "Securities Industry Performance: 1H96," TF 010734-TF 010764 (Jul. 18, 1996).

Whalen, Robert, "News and Trends: Market Keen on Dalcomp acquisition Expanded Platform for Internet Deals," The Bond Buyer, TF 012295-TF 012297 (Mar. 4, 1998).

Ulick, Jake, "Strong Demand for New Deals Uplifts Munis, Slashes Yields," The Bond Buyer, TF 012298-TF 012299 (Feb. 4, 1998).

Prospero, L., "Munis Unchanged As Busy New-Issue Session Begins," Dow Jones Newswires, TF 012300 (Feb. 3, 1998).

Prospero, L., "Munis -2: Pittsburgh to Sell $257M Bonds Via Internet," Dow Jones Newswires, TF 012301-TF 012302 (Feb. 2, 1998).

Rannazzisi, J., "Munis End Flat As New Issues Worth $2 Billion Are Well Received," The Bond Buyer, TF 012303-TF 012304 (Nov. 19, 1997).

Richtmyer, R, "News and Trends: Muni Players Leery of Grant Street's Foray Into On-Line Bidding," The Bond Buyer, TF 012305TF 012307 (Jun. 11, 1997).

Richtmyer, R., "Grant Street Advisers is Setting Up The First Muni Bond Auction Web Site," The Bond Buyer, TF 012308-TF 012309.

Richtmyer, Richard, "Gaining Parity: Dalcomp Purchases Electronic Bid System to Exploit Internet," The Digest, vol. 323, No. 30338, TF 012395-TF 012396 (Feb. 25, 1998).

Brochure, "MuniBid, Optimizing Bond Sales for the Tax Exempt Issuer," TF 012795-TF 012796.

Brochure, "Bidcomp: Reliability and support, backed by the integrity of The Bond Buyer," TF 013947-TF 013948.

"The 1998 Review of Electronic Transaction Systems in the U.S. Fixed Income Securities Markets," TF 049957-TF 049983 (Nov. 1998).

"The Bureau of the Public Debt, Strategic and Operational Plan 1997-2001," TF 049984-TF 049999.

"1996 Survey on the Use of the Internet and Other On-Line Services by Public Finance Officials," BMIA, Government Finance Officers Assn., TF 050865-TF 050866, TF 054320-TF 054324.

Bureau of the Public Debt online, Public Debt's Strategic Plan 19971002, TF 050879 (Updated May 20, 1999).

Cammack, Elizabeth B., "Evidence on Bidding Strategies and the Information in Treasury Bill Auctions," Journal Of Political Economy, TF 052197-TF 052227.

Schmerken, Ivy, "Cleansing the Treasury Auction,", Wall Street Computer Review, vol. 9, No. 2, 29, TF 053206-TF 053210, TF 054138-TF 054142.

McCright, John S., "Auctioning off the Internet, Delphi, Museum to sell wares on web," TF 053211, TF 054136-TF 054137.

K.C.; Harlan, Megan, Reviews, "The Week" Entertainment Weekly, May 2, 1997 Issue 377, p. 64 TF 053212-TF 053214.

Gordon, Maynard M., "Auctions become high tech. (auto auctions)," Dealer Business, vol. 29, No. 7, p. 21, TF 053215-TF 053217(Mar. 1995).

Mardesich, Jodi, "Onsale takes auction gavel electronic; site offers clearance for end-of-life products," Computer Reseller News, No. 691, p. 2.TF 053218-TF 053220 (Jul. 8, 1996).

Elliott, Elaine X., "A New Web Site Gives Agents An In on the Auction Craze," Travel Agent, TF 053221-TF 053224 (Nov. 18, 1996).

Cyberguide: Learning Lab + Marketplace, Netguide, vol. 2, No. 8 (Aug. 1995) TF 053345-TF 053349.

"Online Auction House Finds Growth With Second-Hand Technology," Webweek, vol. Two, Issue Eight, TF 053392-TF 053397 (Jun. 17, 1996).

Ravindran, S. et al., "Strategies for Smart Shopping in Cyberspace," Journal of Organizational Computing and Electronic Commerce 6(1),33-49, TF 053398-TF 053398-TF 053406 (1996).

Cheng, Kipp, "On-the-block party; A celeb auction in cyberspace," Entertainment Weekly, YF 053427(May 2, 1997).

Eng, Paul M., "Auctioning Off Relics Of The Computer Age," Business Week Online, TF 053407 (Apr. 11, 1994).

Eng, Paul M., "Window-Shopping Will Never Be The Same," Business Week Online, TF 053408 (Apr. 11, 1994).

Citations: TF053409 (printed Oct. 2, 2001).

Lu, Stacy, "Taking In the Sites; Web's On-Line Auctions Are a Browser's Delight," The New York Times, TF 953410-TF 053412 (Dec. 30, 1996).

Bryant, Adam, "Am I Bid Six? Click to Bid Six!; Airlines Are the Latest to Move to On-Line Auctions," The New York Times, TF 053413-TF 053416 (May 13, 1996).

Lewis, Peter H., "Company News; Auction of Collectbles on the Internet," The New York Times, TF 053417-TF 053418 (May 23, 1995).

Plotkin, Hal, "Art Net," Forbes, TF 053419-TF 053422 (Apr. 6, 1998).

Flanagan, William G. et al., "Auctions on the Internet?" Forbes, TF 053423-TF 053424 (Dec. 18, 1995).

"Executive Travel; Business Travel Notes," Los Angeles Times, TF 053425-TF 053426 (Sep. 28, 1995).

"On-line auctions: Going, going . . . ," The Economist, TF 053428-TF 053429 (May 31, 1997).

Wilder, Clinton, "Sold! On the Web-Internet Shopping Network's First Auction hopes to out-earn its parent," Information Week, TF 053430-TF 053431 (Jun. 16, 1997).

Tomkins, Richard, "Passengers take a seat at the Internet auction: Richart Tomkins on airlines' ventures into cyberspace in their questto fill unused capacity," Financial Times (London), TF 053432-TF 053433 (Jun. 17, 1996).

Copulsky, Erica, "Art dealers eye Internet as auction mechanism; Cantor Fitzgerald said to be looking seriously," Investment Dealers' Digest, TF 053434-TF 053435 (Nov. 11, 1996).

Smith, Laura B., "Going . . . gone; auctions on the Web; includes a related article on RFPs on the Web; PC Week Executive; Internet! Web/Online Service Information," PC Week, TF 053436-TF 053440 (Aug. 26, 1996).

Business Wire, "eBay's AuctionWeb: A New Way to Manage Holiday Gift Returns; One Man's Gewgaw id Another's Treasure on Internet Auction Service," TF 053478, 053487 (Dec. 27, 1996).

Business Wire, eBay's AuctionWeb Tops One Million Bids; Leading Online Auction Service Announces Record Year (Dec. 12, 1996) TF 053478-TF 053479, 053487-88.

PR Newswire, "Bonsai Software Introduces the EasyAuction™ Internet Auction Service," TF 053480, 053489 (Dec. 11, 1996).

PR Newswire, "Bonsai Software Unveils Fourth Internet Auction," TF 053481, 053490 (Nov. 11, 1996).
"Online auction site building strength," *Computer Retail Week*, p. 51, 053483, 053493 (Dec. 2, 1996).
O'Connell, D., "Aer Lingus holding auction of airline seats on Internet," Travel Trade Gazette UK & Ireland, p. 15, TF 053484, 053493 (Nov. 6, 1996).
PR Newswire, "Aer Lingus Internet Auction-Update," TF 053484TF 053485, 053453-54 (Aug. 12, 1996).
PR Newswire, "Aer Lingus Launches Cyber-Values on the Internet; Irish Airline is First European Carrier to Offer Seat Facility," TF 053485-TF 053486, 053494-95 (Aug. 1, 1996).
Lee, Ho Geun & Clark, Theodore H., "Impacts of the Electronic Marketplace on Transaction Cost and Market Structure," International Journal of Electronic Commerce/Fall 1996, vol. 1, No. 1, pp. 127-149, TF 053496-TF053518 (1996).
Rockoff, Todd E. and Groves, Michael, "Design of an Internet-basedsystem for remote Dutch auctions," Internet Research: Electronic Networking Applications and Policy, vol. 5, No. 4, pp. 10-16, TF 053519-053525 (1995).
"Made in Texas: Global Exports Boost State Economy," The Southwest Economy, Issue 5-1995, Federal Reserve Bank of Dallas, TF 053526-TF 053537 (1995).
"Canadian Economy," Government of Canada Securities, A Publication of the Department of Finance, TF 053538-TF 053538-TF 053541 (Jun. 1997).
Secondary Market, Government of Canada Securities, A Publication of the Department of Finance, TF 053542-TF 053543.
Dictionary of Computer Words, pp. 134-135, 142-143, 194-195, 302-303, TF 053544-TF 053549(1995).
"The Finance Officer and The Communities of Tommorow," 91 Annual Conference, Jun. 1-4, 1997, TF 054188-TF 0542325.
Government Finance Officers Association, "Performance, 89th Annual Conference," TF 054233-TF 054273 (Jun. 11-14, 1995).
Government Finance Officers Association, "Exploring the Boundaries of Government Finance," 88th Annual Conference, TF 054274TF 054314 (Jun. 5-8, 1994).
Zorn, Paul, "Use of On-Line Technology: A GFOA/MBIA Survey," Government Finance Review, pp. 28-30, TF 054315-TF 054317 (Aug. 1996).
GFOA Newsletter, GFOA Product Corner, pp. 2-3, TF 054318-TF 054319 (Jun. 14, 1996).
Government Finance Officers Association 90th Annual Conference, Portland, Oregon, AudioNideo Tape Listing Order Form, TF 054325-TF 054328 (May 18-22, 1996).
Underwood, Chris, "A Multiple Round Ascending Auction Process Suitable for the Disposal of Spectrum in New Zealand," TF 054700TF 054705 (Jan. 17, 1996).
Gribik, Paul, "*27Learning From California's QF Auction," Public Utility Fortnightly, vol. 133, No. 8, TF 054706-TF 054711 (Aug. 15, 1995).
La Roche, Elaine, "Bandwidth, Risk and Real Time: Cyberfinance in the 21 Century," The Bond Market Association, ID 04-02671-ID 04-02676 (Apr. 26, 1996).

Meehan, John J., Globalization and Technology at Work in the Bond Markets, The Bond Market Association, ID 04-02677-ID 04-02681 (Mar. 1, 1997).
Ruth, Heather L., "Extracting Business Value From Technology Investments in the Bond Business," The Bond Market Association, ID 04-02682-ID 04-02682-ID 04-02690 (Sep. 14, 1995).
Press Release, "PSA Chair Elaine LaRoche Warns Bond Market Professionals to Harness Technology or Become Obsolete," ID 04-02691-ID 04-02692 (Apr. 26, 1996).
Parity, "Running the Parity program," (1994 Twenty First Century Municials), ID04-02745-ID 04-02758.
Patent Maintenance Fees-Public Inquiry, Patent # 6161099, TF 054438.
"Response to First Non-Final Office Action" for Ex Parte Reexam Control No. 90/009,556, filed on Apr. 12, 2010, pp. 1-5. Including: "Standard Securities Calculation Methods: Current Formulas for Price and Yield Computations". Spence, Bruce M., Graudenz, Jacob Y., and Lynch, Jr. John J. Securities Industry Association, New York. 1973, pp. 1-136, "Notice of Allowance" for U.S. Appl. No. 11/088,419, mailed on Jan. 26, 2010, pp. 1-131, and "Notice of Allowance" for U.S. Appl. No. 11/599,086, mailed on Mar. 10, 2010, pp. 1-9.
Sam Rimell, Ex Parte Reexamination Final Office Action, Aug. 2, 2010, pp. 1-34, USA.
Michael K. Mutter, Response to Final Action Under 37 C.F.R. 13116, Sep. 30, 2010, pp. 1-13, USA.
James A. Vezeris, Ex Parte Reexamination Final Office Action, Aug. 2, 2010, pp. 1-34, USA.
Alan Kay, Report and Recommendation, United States District Court for the District of Columbia, Civ. Case No. 07-796 (RJL)(AK), Aug. 27, 2010, pp. 1-16, USA.
Brett C. Govett, Plaintiff Graff/Ross Holdings LLP's Objections to Report and Recommendation, United States District Court for the District of Columbia, Civil Action No. 1:07-CV-796-RJL-AK, Sep. 13, 2010, pp. 1-75, USA.
Matthew J. Moore, Freddie Mac's Opposition to Graff/Ross's Objections to Report and Recommendation, United States District Court for the District of Columbia, Civil Action No. 07CV796 RJL, Sep. 13, 2010, pp. 1-26, USA.
Brett C. Govett, Plaintiff Graff/Ross Holdings LLP's Reply In Support of Its Objections to Report and Recommendation, United States District Court for the District of Columbia, Civil Action No. 1:07-CV-796-RJL-AK, Oct. 11, 2010, pp. 1-11, USA.
Matthew J. Moore, Plaintiff's Complaint For Declaratory Judgement and Demand for Jury Trial, United States District Court for the District of Columbia, Nov. 15, 2010, Case 1:10-cv-01948-RWR, pp. 1-10, USA.
Sam Rimmell, Ex Parte Reexamination Advisory Action Before The Filing of an Appeal Brief, U.S, Patent and Trademark Office, Control No. 90/009,556, Oct. 22, 2010, pp. 1-8, USA.
Sam Rimell, Office Action in Ex Parte Reexamination, Feb. 12, 2010, pp. 1-9, USA.

* cited by examiner

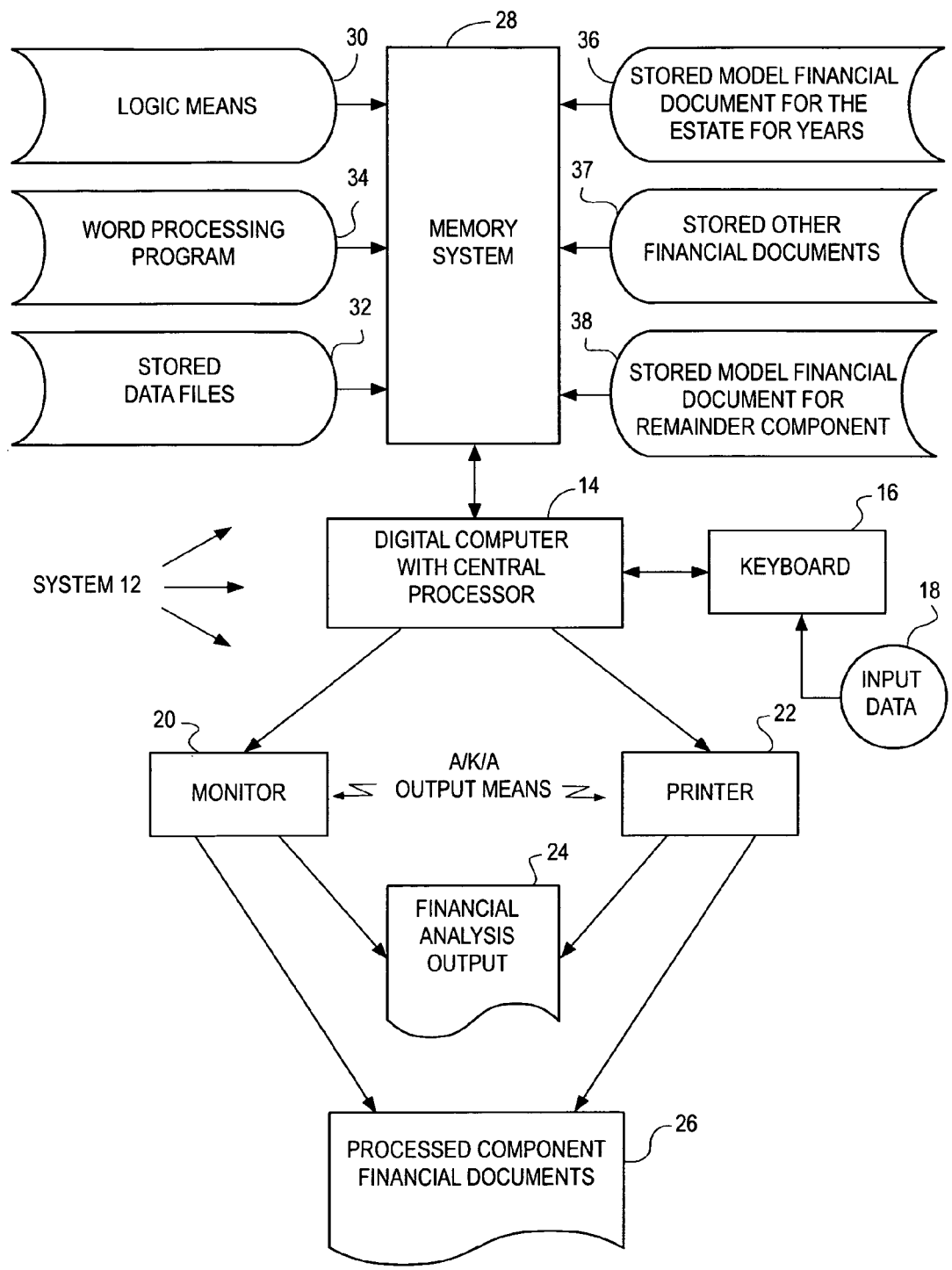

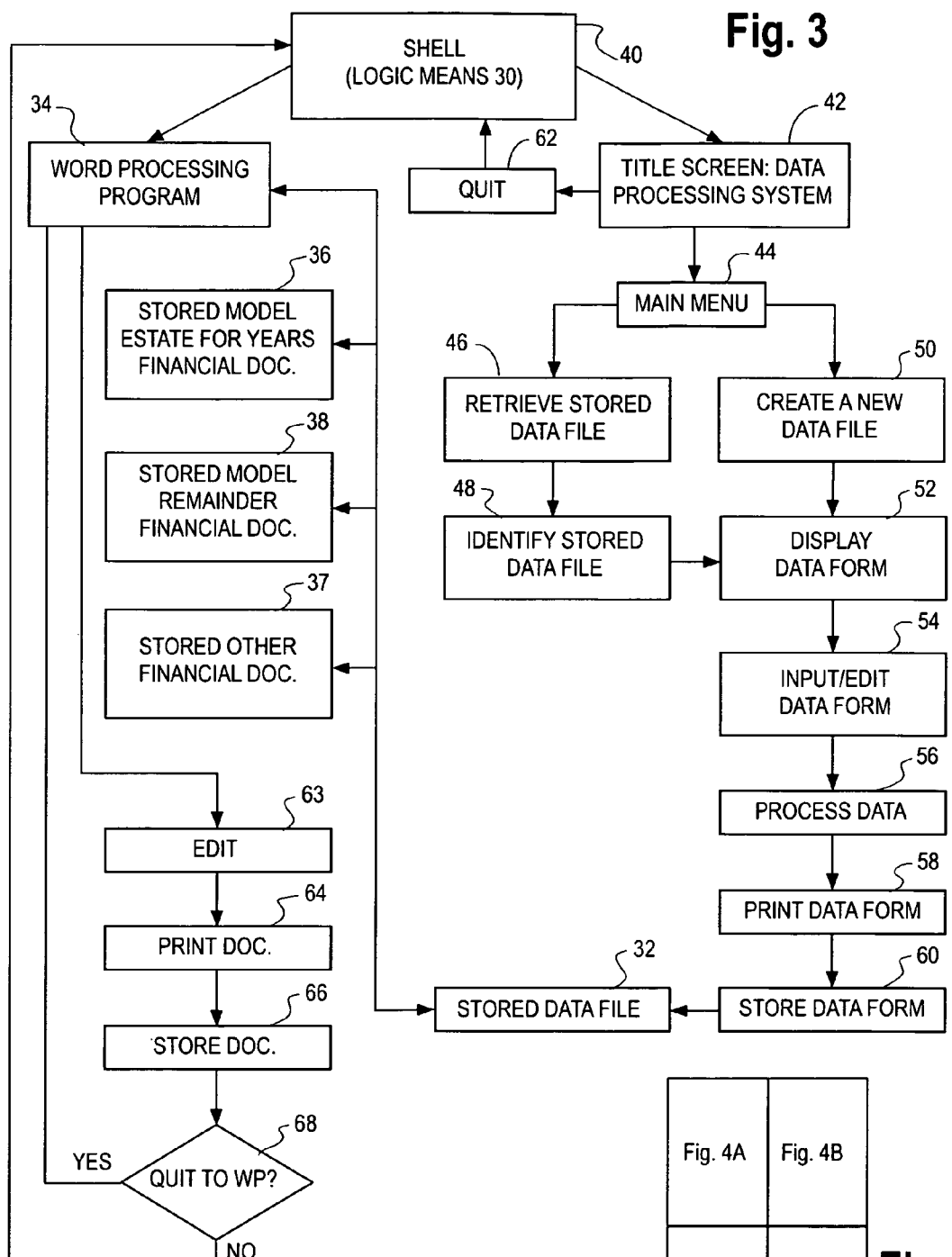

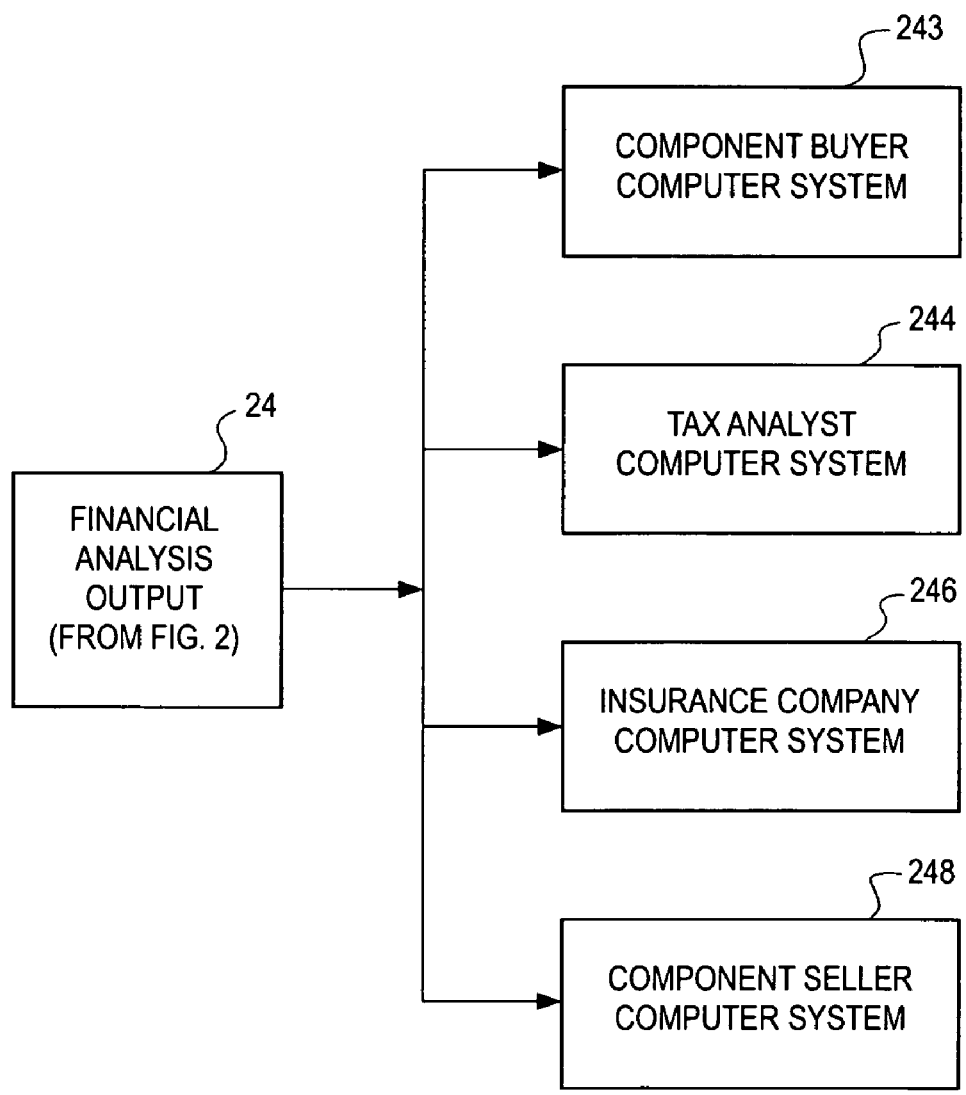

COMPUTER SYSTEM TO GENERATE FINANCIAL ANALYSIS OUTPUT

I. PRIORITY DATA

This is a continuation of, claims priority from, and incorporates by reference: U.S. patent application Ser. No. 09/134,451, filed Aug. 14, 1998, issued as U.S. Pat. No. 6,192,347; U.S. patent application Ser. No. 09/134,453, filed Aug. 14, 1998, issued as U.S. Pat. No. 7,203,661; U.S. patent application Ser. No. 08/181,632, filed Jan. 12, 1994, issued as U.S. Pat. No. 5,802,501; and U.S. patent application Ser. No. 07/967,644, filed on Oct. 28, 1992, now abandoned.

II. TECHNICAL FIELD

This invention concerns a digital, electrical computer and a data processing system, and methods involving the same, applied to the financial fields of securities, real estate, and taxation. More particularly, this invention relates to a computer system for supporting a financial innovation involving the securitization of property by its decomposition into at least two components. One component can be an estate for years component and a second component can be a remainder interest. The computer system computes the respective values and investment characteristics of the components, and produces documentation thereof, to facilitate financial transactions involving the separate components.

III. BACKGROUND OF THE INVENTION

A. Description of the Prior Art

During the last recession, a far greater number of businesses failed than would normally have been expected. Bankruptcies, financial defaults, and foreclosures on property also increased, and bad real estate loans caused an atypically large number of lenders to collapse. If there were obvious ways to increase investment return under conditions of economic stress, most likely those ways would have been uncovered long ago.

Consider real estate, for example. Commercial real estate market activity was at or near a standstill for several years around the start of this decade, beginning in the last recession and continuing for more than a year past the end of the recession. Although excess development of commercial space received great attention in the financial press, there was also a drastic reduction in capital for real estate equity investment and finance.

Real Estate equity capital declined as pension funds reduced or ended commitments of new equity capital to real estate capital markets. Capital for real estate finance declined correspondingly as savings and loan institutions withdrew from commercial real estate lending. Of even greater significance, real estate lending practices of insurance companies and commercial banks came under greater regulatory scrutiny in response to increased loan defaults in the early 1990s, which led to a tightening of standards for real estate loans and a reduction in flexibility on loan terms.

Property values fell, and investors were uncertain of how far values had fallen because so few sales of commercial property were occurring.

The problem was not a lack of potential investors. Although the pension funds had withdrawn from the markets, the core group of real estate developers and professionals involved in the markets before the pension funds entered were still committed to the real estate business and were still willing to commit capital to acquire and control real estate for business investment purposes.

Nor was the problem a lack of potential financing. Despite some withdrawal by savings and loan institutions, insurance companies were still available to provide financing for sound commercial real estate developments. However, there were at least two key constraints on loan commitments by insurance companies that had the practical effect of restricting the amount of available financing.

One key constraint was the emergence of a more strict regulatory environment that restricted the maturities of most loans that insurance companies were willing to make to no more than ten (10) years. This conflicted with the dictates of tax considerations for taxable investors, which suggested that the terms of loans should be at least fifteen (15) years, and preferably twenty (20) years or more.

A second key constraint was that, due to high nationwide vacancy rates in commercial properties, insurance companies were making real estate loans primarily on property that was almost fully leased to tenants that were unlikely to default on their leases. Thus, credit ratings of the tenants were a prime consideration in deciding whether loans should be made.

In fact, insurance companies usually viewed real estate loans as financings of existing tenant leases. Accordingly, lenders usually insisted that property owners assign the rent payments to the lenders to provide additional assurance that loan payments would be made, and lenders also insisted that the rent assignments totally amortize the loans. (The primary reason that most offered mortgages were for no more than ten years was that, in the high-vacancy rental environment existing at that time, most leases ran for no more than ten years.) Furthermore, the lenders could frequently have viewed their legal claims on the tenants' rental payments as perhaps more important than their claims on the property, because in a market with excess space, a claim on vacant space was not particularly valuable.

In other words, during this period of excess rental capacity, financing necessary to sustain the level of liquidity historically experienced by the real estate markets was not available from financial institutions on acceptable terms and conditions.

The result was market "gridlock" and a dearth of real estate transactions until the current economic expansion led to a nationwide increase in demand for rental space and a corresponding decrease in vacancy rates.

Similar troubles have been features of the real estate market at low points in the real estate cycle at various times in the history of the market. Despite great economic pressure to improve the situation, a more efficient technology for real estate finance in an economic environment of excess rental capacity and weak economic activity has not surfaced.

IV. SUMMARY OF THE INVENTION

In response to the above, a new financial product has been developed based on the concept that property value consists of separately valuable property rights that can be worth more when sold separately. In a manner of speaking, the whole can be less than the sum of its parts.

With the development of a new financial product, a need has arisen for new machines and processes to use in bringing the product to market and sustaining it. These machines and processes are the subject of the present invention.

A. Real and Personal Property

As an example, in the case of property that is customarily leased by corporations, leased and unleased property have different investment characteristics. Ownership of leased property is a fixed-income asset with investment characteristics that depend upon lease covenants, the market for corporate debt, and the lessees' credit ratings. By contrast, ownership of unleased property is a speculative asset having investment characteristics that depend on the spot rental market for that type of property. Thus it is possible to split ownership of this type of property into at least two components, at least one of which is a fixed-income asset.

Consider real estate, for example, which can be divided into an estate for years and a remainder interest. Lenders can purchase the estate for years outright instead of writing a commercial mortgage on the whole property. Alternatively, a special purpose entity can be established to purchase the estate for years, and the lenders can purchase ownership or equity interests in the entity. Similarly, the other component—the remainder interest—can be purchased by real estate investors (or, again, the remainder interest can be purchased by a special purpose entity in which the real estate investors purchase equity or ownership interests) in lieu of the standard investment approach, in which the investor would purchase all rights to the property using some funds from a commercial loan. Examples of such special purpose entities include, but are not limited to, trusts, limited partnerships, and limited liability companies. The term of the estate for years can be determined by the parameters that describe the property, in particular by the remaining lengths of the terms of the existing leases.

For purposes of this summary of the invention, in those cases in which a special purpose entity is created to hold a component, for example, such as the estate for years or remainder interest, an equity interest in the component is intended to refer to an equity interest in the special purpose entity.

If the property is fully leased (or is almost fully leased), and the leases will not expire until after the estate for years has expired, then the estate for years has the investment characteristics of a fixed-income asset rather than of property. Under these circumstances, at least for real estate, insurance companies are allowed by regulators to treat the estate for years as a fixed-income investment, and to compute its value accordingly. In other words, the insurance companies value the estate for years based on cash flow characteristics of the leases and credit ratings of the tenants, and not based on the value of real estate or the risk in the real estate markets.

Due to an interplay of values for the property components and the needs of respective purchasers, including tax needs, it is frequently possible to sell the components of the property separately for more than the price that the property as a whole would command.

From the perspective of an investor who acquires the remainder interest, a purchaser of the estate for years has accepted an assignment of the lease payments for the term of the estate for years in return for financing the acquisition of the property by the remainder interest purchaser. From this perspective, the amount of financing provided is equal to the purchase price of the estate for years, the lease payments during the estate for years term completely amortize the financing, and the length of the financing term equals the term of the estate for years.

Unlike traditional mortgage finance, shorter financing terms (less than fifteen years) are not a problem under this structure for the remainder interest investor, because: (1) during the estate for years term, the investor does not incur any tax liabilities; and (2) taking possession of the property upon expiration of the estate for years is not a taxable event for the investor. In other words, the investor does not have any tax liability until there is an obligation to pay taxes on rent payments received after taking possession of the property at the expiration of the estate for years, and those rental payments provide the cash to meet the taxes due on those payments. Therefore, the estate for years term is irrelevant to the remainder interest investor, except insofar as the term determines the amount of financing the estate for years purchaser provides (the longer the estate for years term, the greater the amount of financing). In addition, upon expiration of the estate for years, the remainder interest investor owns the property outright (i.e., without any debt).

From the perspective of a financier, this financing product has no claim on the property investor (i.e., the remainder interest investor), but the strongest possible direct claim on the tenants, because the financier is the owner of record during the estate for years term. In other words, this financing product is more efficient than a commercial mortgage at matching the legal recourse claims in event of default with the asset that is actually being financed: tenant promises to pay future rent. The estate for years term can be as long as the existing leases are committed to run—typically ten years or less, although sometimes longer in the case of property that is fully leased for long terms. However, investor preferences may dictate an estate for years term that is significantly shorter than the longest lease term, and technical considerations may suggest an estate for years term that is slightly longer than the longest lease term.

In addition, ownership can be structured so that the transaction creates the estate for years and the remainder interest, in order to create the most favorable tax consequences for the financier and the property investor.

It is frequently the case that special purpose entities with one or more limited liability equity interests created to hold one or more components can enhance the value of equity interest(s) in the components. An opportunity for value enhancement can arise because direct ownership of an equity interest in tangible property can expose the owner to potentially unlimited legal liability as a result of events involving the property, whereas component ownership via an equity interest in the entity is a limited liability equity interest in the component. In other words, a special purpose entity with one or more limited liability equity interests can transform one or more components of a property into limited liability components, i.e., components with one or more limited liability equity interests. Thus market-based component valuation, in the case in which a component is held by an entity, involves both valuation of the investment characteristics of a component and the effect of the entity on the investment characteristics of the component.

Any additional tax liability created by existence of a special purpose entity that contains one or more components of a property detracts from the investment returns that flow from the property to investors in the components, resulting in a reduction in the market values of the relevant components. The loss of value is most significant in the case of United States federal tax liabilities, since United States federal tax rates are usually higher than corresponding state and local taxes. Thus an appropriate entity for purposes of holding estate for years and remainder interests is an entity that does not incur additional tax liabilities, at least at the United States federal tax level. A pass-through entity for United States federal tax purposes is an example of such an entity. An example of such a pass-through entity is a grantor trust.

Since an entity that holds one or more component interests in a property is not expected to retain significant amounts of income, another appropriate type of entity is an entity that is allowed a United States federal tax deduction for distributions to holders of equity interests in the entity.

In cases in which an entity holds one or more components of a property, the entity can be used to modify investment characteristics of the components without modifying underlying leases on the property. For example, put or call options on some equity interests in the entity can be inserted into the organizational document of the entity. In the case of fixed-income components, these can be used to add features that are sometimes found in United States government bonds and corporate bonds without approaching lessees to renegotiate the leases.

It is not necessary for a component to be purchased in its entirety by one investor. A component can be divided into shares so that investors can purchase fractional interests in the component. In those cases in which there is a special purpose entity for the component, fractional interests in the component can be created by dividing the equity interest in the entity into shares with equal equity participation rights. This accords prospective investors the investment option of purchasing fractional interests in the component simply by purchasing fewer than the entire number of shares in the equity interest.

More generally, multiple classes of shares with various equity participation rights in the entity can be created, according investors the investment option of purchasing more general types of equity interests in the component.

More particularly, an investor can purchase an equity interest in a component that is less than the entire equity interest in the component. In the case wherein the entire equity interest in the component is divided into fractional interests, each fractional interest is valued by multiplying the valuation of the component by the fraction represented by the fractional interest. In the case wherein the entire equity interest in the component is divided into more general types of equity interests, the equity interests may be valued by more general market-based techniques, such as by regarding an individual equity interest as a separate temporal component if the investment characteristics of the equity interest are those of a temporal component and valuing each such interest by the methodology introduced herein for valuing components. If one of these equity interests is then further subdivided into fractional subinterests, then each fractional subinterest is valued by multiplying the valuation of the entire equity interest by the fraction represented by the fractional subinterest.

An example of more general equity interests in remainder components occurs in cases in which insurance is available to protect remainder component investors against the risk of a decline in property value below some specified value at some specified future time or time interval close to the expiration date of the estate for years term. Such insurance, known as residual value insurance, implies that the minimum possible return over the estate for years term for remainder component investors is greater than—100% so long as the insurer remains solvent, and that the value of the minimum possible investment return for the remainder component over the estate for years term is equal to the return value that will transform the remainder component purchase price into the insured minimum future property value. The existence of residual value insurance implies that the remainder component can in turn be decomposed into at least two types of equity interests, including a preferred equity interest that receives most or all of the protection of the residual value insurance and a residual equity interest that receives little or none of the protection of the residual value insurance.

The preferred equity interest may be viewed for investment purposes as a zero-coupon fixed-income asset, possibly with a bonus feature of an equity participation on the upside, with a bond term approximately equal to the estate for years term and a credit rating equal to the credit rating of the insurer. Accordingly, the preferred equity interest will be of interest primarily to fixed-income investors and the residual equity interest will be of interest primarily to equity investors. Such preferred/residual decompositions of remainder interests carve additional fixed-income assets out of property that are essentially independent of the fixed-income assets represented by the estate for years components.

In cases in which there is an entity for a component, the purchase by investors of less-than-entire interests in the component may be facilitated by the division of the equity interest in the entity into one more classes of shares. If there is a single class of shares in the entity, then a purchase of shares in the entity is equivalent to the purchase of a fractional economic interest in the component.

Although it is expected that entities associated with components will be special purpose entities established to facilitate specific transactions, more general entities not designed for specific transactions may be appropriate in some circumstances. For example, this could occur in order to avoid duplicative costs associated with creating multiple separate entities in situations wherein multiple equity interests with the appropriate investment characteristics can be created with fewer entities.

As in the case of special purpose entities with limited liability components, a more general entity for a component can affect both the extent of liability exposure on the part of investors in that component and also the degree of control investors in that component and possibly also investors in other components of the property as well have over the property in event of lessee default during the estate for years term. Thus market-based component valuation in the case wherein any component is held by an entity involves valuation of the investment characteristics of the component, including any effect of any entity on the investment characteristics of the component. So for example, a component that is a lease or leases packaged in an entity (e.g., a limited liability component) can have a different valuation than a naked lease or leases-more particularly, this is likely to be the case if more than one of the components is a limited liability component.

There can also be cases in which there is an entity for an equity interest in a component, which can be either in lieu of or in addition to an entity for the entire component. For example, in the case of publicly traded equity interests in a component, nominal ownership of the equity interest could be held by an investor's brokerage firm, or the equity interest could be in the form of depository receipts for shares in a component such as American Depository Receipts for shares whose registered ownership resides offshore, with no material impact from an investor's perspective on the investment characteristics of the equity interest. More generally, in cases in which an entity for an equity interest has no material effect on investment return, risk, or liquidity characteristics of the equity interest, and no material effect on the degree of investor control potentially available to an investor, the existence of the entity will have no effect on valuation of the equity interest.

In this way, there can be a concatenated sequence of entities for an equity interest. Such a functional sequence can be regarded for investment analysis and descriptive purposes as a single entity.

The effect of such a concatenated sequence on valuation of a component can be analyzed by successively valuing the impact of each entity in the sequence, starting with the entity that is legally closest to the property and working successively towards the entity that is legally closest to the investor.

In the case of real estate, the purchase price of the estate for years component alone, or a material interest therein, will almost never be large enough to cover the sale price of the property and the cost of component separation. This implies that a market-based valuation and sale of the remainder component, or a material interest therein, is an essential factor in the implementation of component separation. In the case of tangible personal property, the purchase price of the estate for years component also will almost never be large enough to cover the sale price of the property and the cost of component separation, except in those cases wherein the property can reasonably be expected to reach the end of its useful economic life during the estate for years term.

B. Tax-Exempt Finance

Separating property into at least two components along a time dimension (e.g., into an estate for years and a remainder interest) can also be used to enhance the investment value of tax-exempt securities such as tax-exempt general obligation bonds, tax-exempt industrial revenue bonds, and tax-exempt leases. This separation can be applied either to individual securities or to pools of tax-exempt securities. Value enhancement can be achieved in two ways: (1) cash flow streams from the components can appeal to investors who would not be interested in the entire cash flow stream of the original asset, and (2) the combined tax shelter benefits that accompany the components can be greater than the tax shelter benefits associated with the original asset. Both effects are significant, though in some situations, the tax effect will be the more dramatic of the two.

Unlike the example of taxable leased property discussed above, for the tax-exempt property example, both components can be viewed as fixed-income securities. One would expect that these fixed-income securities would be valued by investors in the marketplace by comparison with other fixed-income securities.

For tax-exempt securities, to effect a successful change in cash flow benefits from splitting the property or asset into components, one can proceed indirectly in separating the asset into components. Rather than directly separating ownership of the tax-exempt security itself, it is better to create an entity to hold the tax-exempt security, and then to separate one or more of the equity interests in the entity along the time dimension into estate for years and remainder components.

From a legal perspective, creating tax-exempt components can be accomplished within the framework of a general or special purpose entity, examples of which include general and limited partnerships and mutual funds. However, to create limited-liability components, smooth the cash flow streams, and avoid an imposition of unusual bookkeeping requirements on fixed-income investors, an entity with one or more limited liability equity interests is the preferred format, with some limited liability equity interests as the assets that are subject to component separation. To enhance marketability of the components, and to facilitate investor valuation of the components by comparison with alternative fixed-income investments available in the marketplace, the entity may alter the frequency of cash flows to holders of equity interests from schedules of the original assets (e.g., the original assets could generate monthly cash flows, and the components could generate semiannual cash flows).

In general, component separation will produce two effects: (1) the estate for years components will generate more tax deductions than are necessary to shelter the cash flows of this component from taxes; and (2) the remainder interest component will generate fewer tax deductions than are necessary to shelter the cash flows of this component from taxes (the tax obligations associated with the remainder component will still be lower than those associated with a conventional taxable fixed-income security). It is also possible that, in some situations, purchasers of taxable securities may view remainder interests as taxable securities and value those interests more highly than investors in tax-exempt securities.

The same component separation technology can be applied to separate the following fixed-income assets along the time dimension into components: a taxable fixed-income security, a portfolio of taxable fixed-income securities, a portfolio of taxable and tax-exempt fixed-income securities. More generally, the same component separation technology can be applied to any asset or portfolio of assets that is either ratable as if it were a fixed-income security (possibly of investment grade), where the term "ratable" refers in general to fixed-income ratings assigned by widely recognized investment rating agencies such as Standard and Poor's and Moody's Investors Service, or classifiable for regulatory purposes as a fixed-income security (possibly of investment grade) by a major regulatory agency for financial institutions or institutional investors, e.g., National Association of Insurance Commissioners (NAIC) investment classifications assigned by the NAIC Securities Valuation Office or the offices of individual state insurance commissioners. However, in general the maximum incremental tax benefits that can be generated are smaller than in the case of tax-exempt fixed-income securities.

The combined investment value of the tax deductions generated by the various components may be greater than, equal to, or lower than the tax deductions associated with the original tax-exempt or taxable asset(s). Since creating an entity to hold the original securities requires a diversion of a portion of the asset cash flow stream to pay administrative expenses associated with maintenance of the entity, component separation of securities is likely to be of interest only when the combined value of tax deductions generated by the components exceeds tax deductions associated with the original asset(s).

In general, determining a schedule of economic benefits associated with various equity interests in the entity, valuing the tax deductions associated with the components, and pricing of the components as fixed-income securities, are computation-intensive procedures.

C. Automated Support

To efficiently offer the above-described financial products, it would be best to use automated means to do computing and data processing, i.e., machine, manufacture, and process applied to supporting the proper structuring and pricing of the components. Efficiency also dictates a need to use automated means to incorporate the computational output in generating financial documents associated with a separated purchase transaction.

Therefore, the invention has an object providing a machine, manufacture, and process for providing applied to financial analytical data automation, including pricing data, for the decomposition of property.

A further object of the invention is to provide the same applied to supporting a new financing product that is based on providing financing of preferably fifteen years or less, while also allowing taxable investors to avoid tax problems encountered with typical mortgage financing.

Another object of the invention is to provide the same applied to calculating financial particulars of the property based on the concept that the source of property value is property rights that can be split and separately valued.

Another object of the invention is to provide the same applied to using the financial particulars in efficiently tailoring financial documents to support transactions involving property components.

Another object of the present invention is to provide the same applied to real estate as the property.

Still another object of the invention is to provide the same applied to supporting the decomposition of real estate into an estate for years and a remainder interest, particularly for computing the price, including tax, of these components.

Still another object of the invention is to provide the same to computing the after-tax yield for the estate for years and the equivalent pretax yield that would be required to obtain the same after-tax return from a bond.

Yet another object of the present invention is to provide the same applied to equity interests in entities that hold tax-exempt securities or pools of tax-exempt securities as the property.

Yet another object of the invention is to provide the same applied to supporting the decomposition of equity interests in entities that hold tax-exempt securities or pools of tax-exempt securities into estate for years and remainder interests, particularly for computing the price, including tax, of these components.

Still another object of the invention is to provide the same applied to analyzing the returns offered based on certain assumptions to inform potential investors of the range of outcomes as they relate to certain inputs.

Still another object of the invention is to provide the same applied to generating data so that comparisons can be made to alternative investment opportunities.

These and other objects are addressed by a digital computer having a logic means for controlling electrical signal processing and modification. The logic means can be completely hard wired or it can be programmable so that one or more computer programs can run on the digital computer. Preferably an embodiment includes a computer program running on a programmable digital computer system to provide financial analytical data concerning decomposed property. The computer system is connected to receive information representing a description of the characteristics of the property from a data input means, such as a keyboard. The computer system also outputs computed data and documentation to an output means and saves the output financial analysis to a memory system. The computer system also has a second means for automatically controlling the digital computer to produce financial documents from the financial analysis and model documents stored in the memory system.

The computer system uses as input data information obtained from a variety of sources, including The Wall Street Journal tabulation of daily Treasury bond interest rates, insurance company weekly publications that list private placement debt risk premia, the property offering documents, and the property lease documents. For applications to tax-exempt finance, the computer system also uses tax-exempt bond finance interest rates tabulated and published daily by such sources as Telerate Systems.

With this information, it is possible to compute the following: (1) the optimal choice of the estate for years term to maximize profitability of the components; (2) whether risk characteristics of either component are appropriate for inclusion in a prospective investor's portfolio; and if so, (3) whether an expected return justifies the system-determined purchase price.

V. BRIEF DESCRIPTION OF THE DRAWINGS AND SPECIMENS

The aforementioned and other objects and features of this invention and the manner of attaining them will become apparent, and the invention itself will be best understood, by references to the following description of the invention in conjunction with accompanying figures and specimens.

A. Figures

FIG. 3 is a flow chart showing the logic of a logic means for controlling the electrical computer system in accordance with the present invention.

FIG. 6 is a graphic representation of interrelated computer systems, in accordance with the present invention.

B. Specimens

Specimen 1 (Screens 1-4) is a series of computer screens constructed by the computer system, in accordance with the present invention.

Specimen 2 (Screens 1-4) is a series of four computer screens constructed by the computer system, for another embodiment in accordance with the present invention.

Specimen 3 is an example of a financial document for an estate for years real estate component constructed based on data in the data table and by means of the computer system, in accordance with the present invention.

Specimen 4 is an example of a financial document for a remainder real estate component constructed based on data in the data table and by means of the computer system, in accordance with the present invention.

Specimen 5 is an example of a financial document for securitization of a remainder real estate component constructed based on data in the data table and by means of the computer system, in accordance with the present invention.

Specimen 6 is an example of a financial document for securitization of a remainder real estate component constructed based on data in the data table and by means of the computer system, in accordance with the present invention.

VI. DETAILED DESCRIPTION OF A PREFERRED EMBODIMENT OF THE INVENTION

A. Financial Innovation

Figure 1:
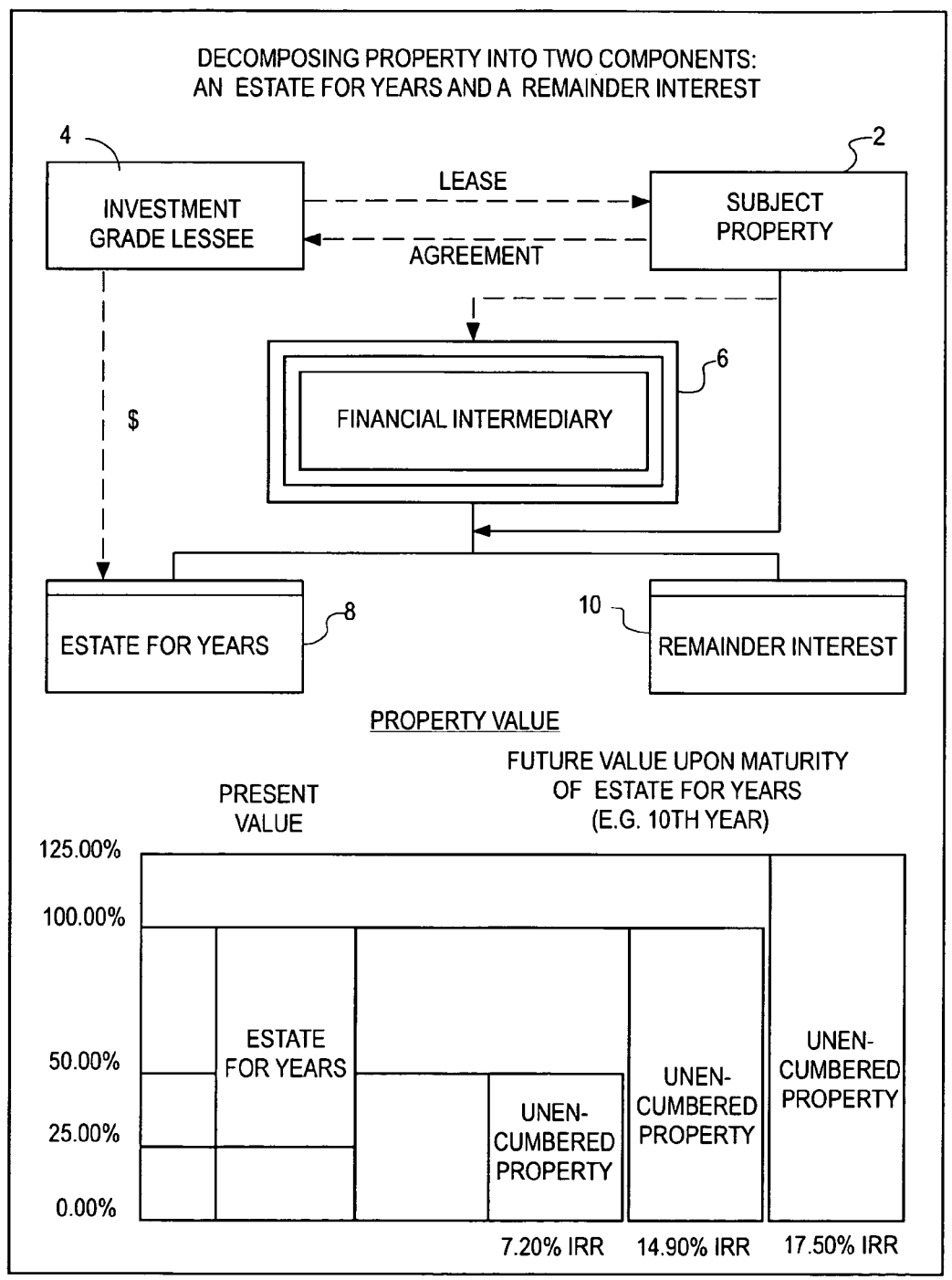
FIG. 1 is a graphic representation of a separated purchase transaction in accordance with the present invention.
Figure 4A:
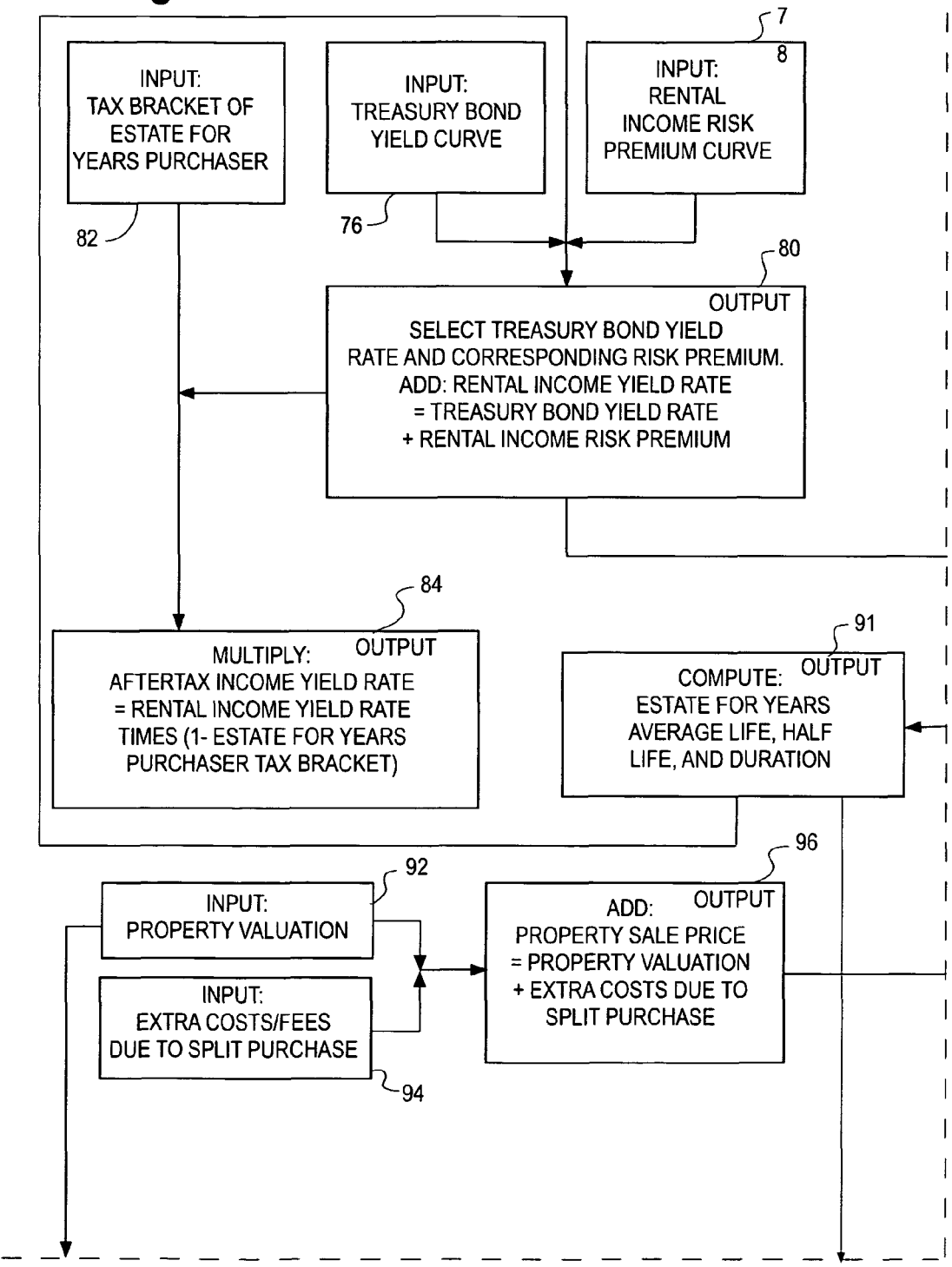
FIG. 4a-4e is a flow chart showing the data input, computational and other logic, and data output of the logic means for controlling the computer system in accordance with the present invention.
Figure 4B:
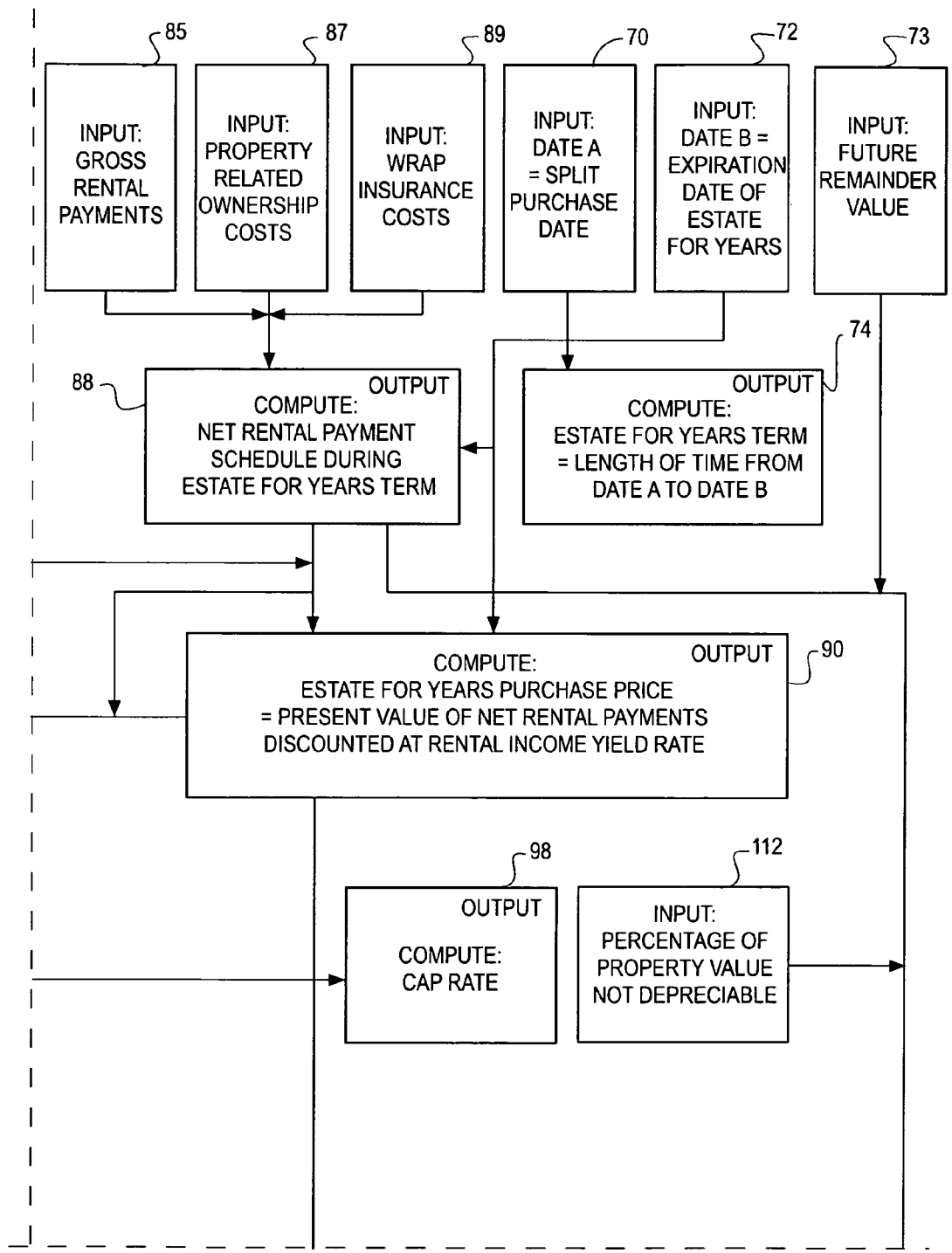
Figure 4C:
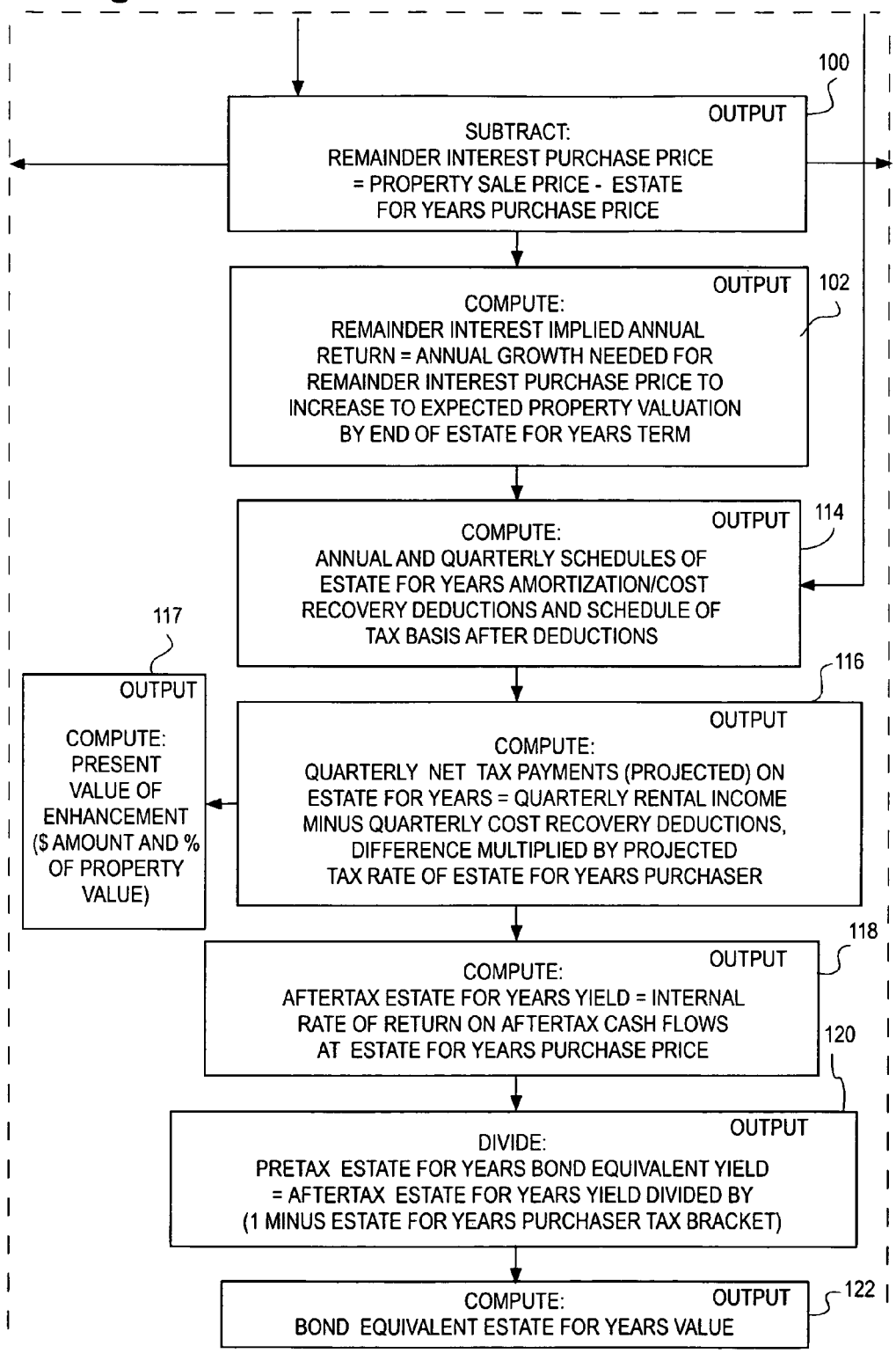
Figure 4D:
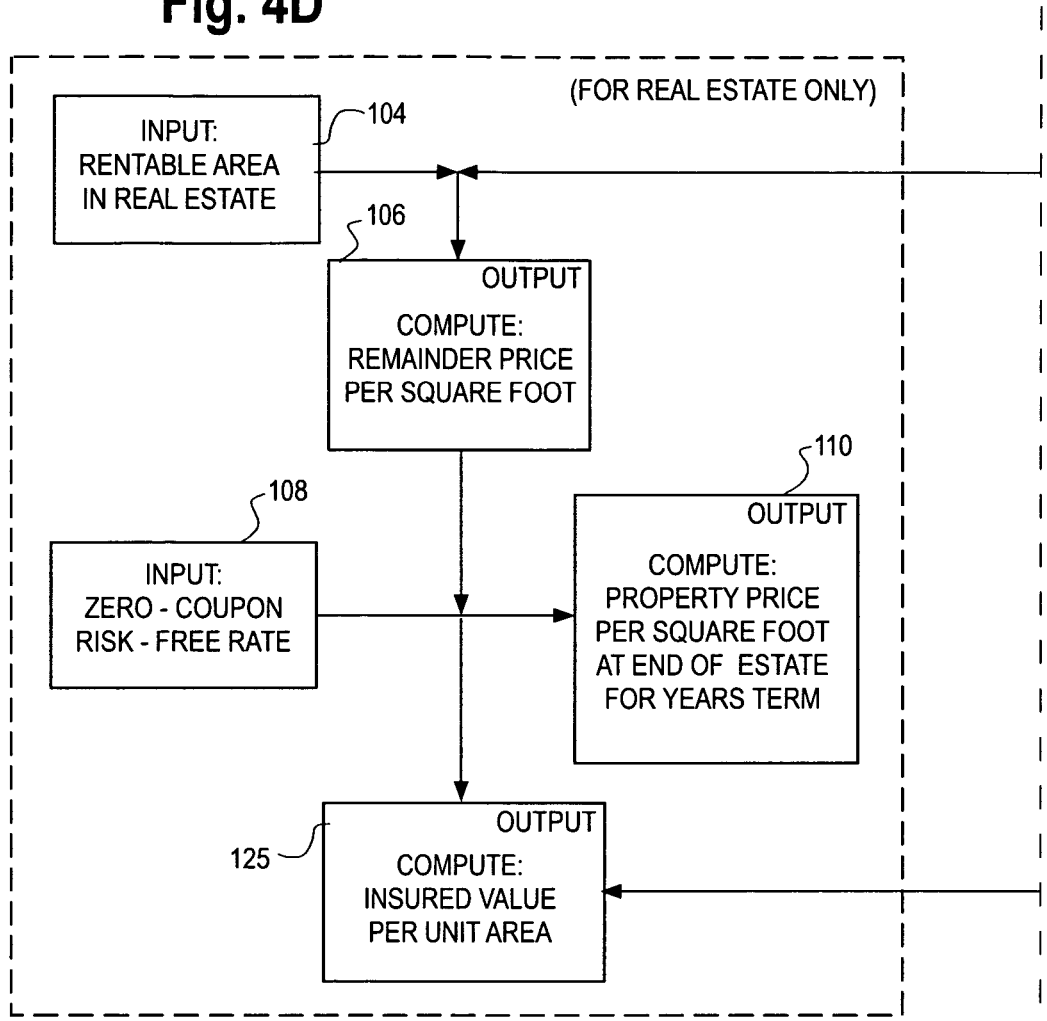
Figure 4E:
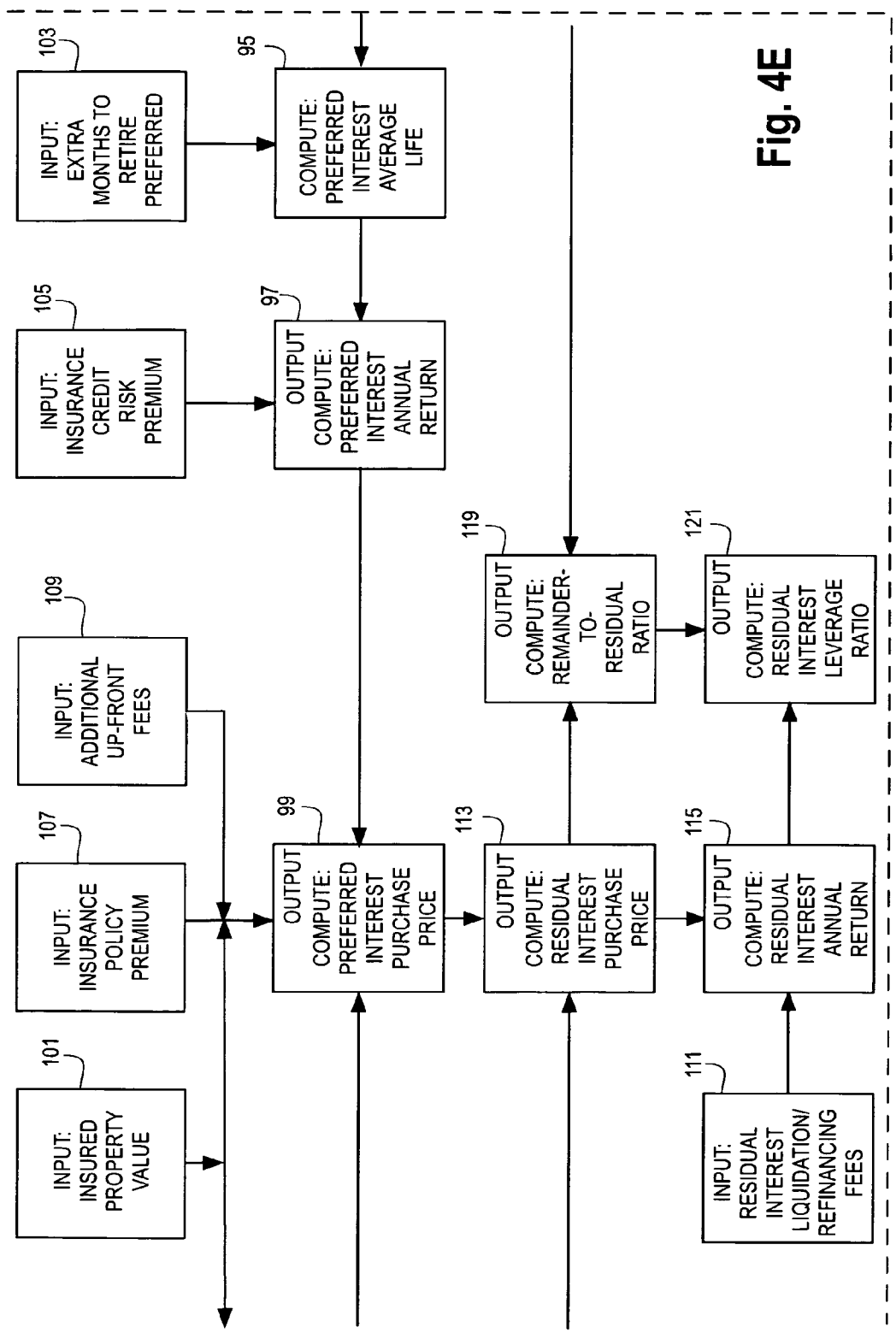

FIG. 1 illustrates the nature of the financial innovation that gave rise to the need for the computer system and methods of the present invention. Rights to a Subject Property 2 (any property whatsoever, but in a preferred embodiment, real estate) are leased to a Lessee 4, preferably an investment-grade lessee, for a definite term, in exchange for rent. All rights to the Subject Property 2 and cash flow from rent money from the Subject Property 2 are conveyed to an investor in an estate for years or to an entity with one or more limited liability equity interests, for example a trust, that holds title to the estate for years and that—absent any competing claims—flows the rent money through to the investor. Financial Intermediary 6 separates the Subject Property 2 and cash flow of rent money into at least two components, using a computer system and methods of the present invention. The components are securitized into rights to an Estate For Years 8 and a Remainder Interest 10. For example, property law provides mechanisms for the temporal decomposition of property. In the case of real estate, one mechanism is to create multiple deeds. For example, there can be a deed to a term interest in a property, and a separate deed to a remainder interest in the property. In nearly all states, both deeds represent real interests in the property. Similarly, in the case of tangible personal property there can be multiple titles, for example, a title to a term interest in a property and a separate title to a remainder interest in the property. The use of a financial intermediary facilitates the separation process but is not necessary in all cases.

The term of separation usually coincides with the remaining term on the existing tenant lease, and is almost never longer than the shortest remaining tenant lease term. The estate for years component can, therefore, be viewed as a fixed-income asset, but tax considerations may dictate whether the remainder component is viewed as a pure equity asset or as a mixture of pure equity and fixed-income.

When component separation takes place, Subject Property 2 is sold to the Financial Intermediary 6, and two trusts may be established to acquire actual titles to the respective components. For example, the estate for years can be a term of years interest. In the case of real estate as the property, one trust is issued a deed to the term of years interest by the property seller and the other trust is issued a deed to the remainder interest by the property seller. In the case of tangible personal property as the property, one trust is issued a bill of sale for the term of years interest by the property seller and the other trust is issued a bill of sale for the remainder interest by the property seller.

Any existing property debt is retired at, or prior to, the time of acquisition. An obligation of any trustee of the trust for the Estate for Years 8 is to preserve title to the estate for years and to prevent any property encumbrances from being established during the separation term.

If there is an estate for years trust, it has a term beneficial interest, and if there is a remainder interest trust it has a remainder beneficial interest. The term beneficiary has all rights and obligations of estate for years ownership during the trust term except a right to encumber the property or petition a court to terminate or dissolve the estate for years/remainder interest structure. A remainder beneficiary enjoys no rights or benefits until the term interest expires, and then enjoys all rights and benefits of the fee simple title.

In this case, the term beneficial interest becomes the (fixed-income) estate for years component, and the remainder beneficial interest becomes the remainder component.

The components are both viewed as personal property for legal purposes.

Ownership of either component can be transferred without affecting the legal status or investment characteristics of the Subject Property 2 or the other component. Similarly, while legal judgments against the owner of either component can create a lien against that component, such judgments cannot create a lien against the Subject Property 2 or the other component.

For tax purposes (usually for United States tax purposes), the holder of the estate for years component (or an equity interest therein) is usually entitled to amortize the acquisition cost (e.g., purchase price) of the estate for years component (or the acquisition cost of the equity interest therein) over the portion of the estate for years term remaining after acquisition of the estate for years component (or the equity interest therein).

Alternatively, the estate for years holder may be entitled to both depreciation and amortization deductions. In this case however, the value of the deductions is interleaved, not additive. That is, although the combined deduction would be greater than the amortization deduction alone, the combined deduction would be smaller than the sum of the amortization and depreciation deductions.

As an additional alternative, in some cases in which there is a single entity for both the estate for years and remainder components, the estate for years holder may be entitled to cost recovery in the form of depreciation of the temporally decomposed property in lieu of amortization of the estate for years purchase price. These situations usually involve tangible personal property and leases with terms that are longer than the statutory cost recovery period for that type of property, in which cost recovery via depreciation is faster for the estate for years investor than cost recovery via amortization of the estate for years price over the lease term.

Whichever cost recovery deduction schedule is claimed by the estate for years holder, the tax treatment of the estate for years will be different from the treatment claimed by the holder of conventional taxable debt, because for tax purposes, the estate for years is an income-producing asset rather than a debt instrument.

If the estate for years component holder is a corporate investor, then the tax write-offs accruing from component separation are available to offset taxes on either passive or operating income.

Separation is facilitated if the lease(s) is triple-net, i.e., during the trust term, the lease(s) obligates the tenant to the estate for years component holder for property management and maintenance, payment of taxes, and property insurance. Thus, absent a default by a tenant, the rights and obligations of the estate for years component holder involve the right to receive scheduled net rental payments, while the benefits of property occupancy belong to the tenant. The only claim of the estate for years component holder on any property asset is a contingent one, in event of a tenant default.

In a tenant default, the estate for years component holder has recourse against the tenant as prescribed by property law and the lease covenants. This recourse against both tenant financial assets and the remaining portion of term property occupancy rights is the subject of traditional principles of property law. The availability of tax write-offs accruing from component separation continues unaffected by a tenant default event.

The default risk associated with the estate for years is identical to the default risk associated with tenant general obligation debt. The expected value of the combined estate for years default claims compares favorably with the claims available to the holders of tenant unsubordinated debentures.

Leased and unleased property have different investment characteristics. The nature of this difference can be illustrated by considering the extreme cases of two unleveraged general purpose single-tenant properties of similar size, location, and architecture, one perpetually leased on a triple-net basis to an investment-grade tenant, the other momentarily unleased.

In the case of the perpetually leased property, all future rental cash flows are determined. Absent tenant default, there will be no future rental negotiations. Thus, there are no present values that fluctuate with changes in the spot market for comparable space, implying that the value of this property does not depend on the real estate market. Property value in this case depends solely on the contracted values of future net cash flows, tenant credit risk, and long-term interest rates. In other words, this asset has the investment characteristics of tenant debt.

By contrast, all future rentals from the unleased property are as yet undetermined, and the present value of these rentals fluctuates with expectations about the future evolution of the spot rental market. In short, this asset is a pure real estate equity investment, with no fixed-income component.

Typical institutional-grade property is not well represented by either extreme. Such property is usually fully leased or almost-fully leased for a reasonable period of time, with arrangements for tenant occupancy beyond that period open to future negotiation. As in the case of perpetually leased property, existing leases have the investment characteristics of fixed-income assets, whereas the speculative risk dimensions investors associate with equity real estate are due entirely to the remaining rights in the property asset: the right to future rental opportunities after existing leases expire.

By securitizing net-leased property to separate ownership of current leases from ownership of future leases, the net-leased property is decomposed into estate for years and pure equity remainder components. The estate for years components are appropriate for investors interested in traditional fixed-income investments, while the pure equity remainders are appropriate for real estate investors, speculators, and tax-exempt institutions interested in acquiring portfolio diversification benefits of real estate at a fraction of the cost for all components of the real estate.

The separation of property into components can create major tax benefits if property is properly securitized and the components are sold to independent investors in a simultaneous three-way transaction.

As part of the undivided property, most of the lease cash flows are taxable income, while as a stand-alone asset, most of the lease cash flows are tax-exempt. This suggests a change in the appropriate buyers for lease income streams. As part of whole property, lease income produces the greatest after-tax benefit for tax-exempt institutions; whereas, packaged as stand-alone assets with incremental tax deductions, taxable institutions are natural investors.

The present value of the incremental tax deductions generated during the estate for years term by separation of ownership into components is an enhancement to property value. This implies that the combined market values of securitized components should be greater than the value of unsecuritized property. The tax deductions themselves can also be viewed as a fixed-income asset, which can be valued by fixed-income techniques. Alternatively, the combined value of incremental tax deductions and the lease income stream can be valued by fixed-income techniques as a single fixed-income package.

From a tax perspective, the estate for years is an income-producing asset; from the return/risk perspective, it is an asset-backed bond. Unlike commercial mortgages, the default claims generated by the estate for years have recourse against financial assets held by the entities who have obligated themselves to make the cash flow payments.

The example herein involves a single-tenant property; the case of multitenant property component separation is slightly more complicated if the lease terms of tenants vary. Because the estate for years must have the characteristics of a fixed income asset, it may be that a credit enhancing instrument such as an insurance policy against tenant default will have to be created to wrap around the lease agreements to achieve the characteristics of a marketable fixed income asset. The use of such an enhancement may broaden the application of the separation process in both single-tenant and multitenant property by creating investment-grade estate for years fixed-income components in properties without investment-grade tenants. Alternatively, there may be cases of properties with below-investment-grade tenants in which it is not cost-effective to reduce the default risk of the estate for years components with credit enhancement insurance. In these cases, equity interests in the estate for years components will be ratable as fixed-income securities, for example, that are below investment-grade, where the term "ratable" refers throughout this investment description to fixed-income ratings assigned by widely recognized investment rating agencies such as Standard and Poor's and Moody's Investors Service, or classifiable for regulatory purposes as fixed-income securities, for example, that are below investment-grade, by a major regulatory agency for financial institutions or institutional investors, e.g., National Association of Insurance Commissioners (NAIC) investment classifications assigned by the NAIC Securities Valuation Office or the offices of individual state insurance commissioners.

In the case of single-tenant property, the estate for years default risk is determined by the tenant credit rating. Thus, the estate for years default risk is identical to the default risk of tenant debentures. In the event of tenant default, the estate for years owner has the same claim on tenant financial assets as holders of tenant debentures, so long as the tenant does not declare bankruptcy.

In tenant bankruptcy, the estate for years holder has a combination of claims with combined values that can be shown to exceed the expected recovery rate on defaulted corporate debentures, as determined by average prices on publicly traded debentures immediately after default and by asset recovery rates subsequent to defaults on unsubordinated general obligation debt.

In other words, estate for years default risk is the same as default risk on general obligation tenant debt, but in default the loss risk is less. This can be reflected in pricing the component, as illustrated below.

One possibility is to generate an investment-grade estate for years component (e.g., a component such that at least one certificate evidencing ownership or beneficial ownership of the component, a fractional interest therein, or an equity interest therein, is an investment-grade security), for example, with between four percent (4%) and six and one half percent (6-1/2%) after-tax yields under current property market conditions. This is an after-tax premium of between 20 and 170 basis points over corporate debentures of comparable credit risk. Alternatively, this represents an approximate pre-tax equivalent premium of between 25 and 230 basis points for taxable buyers in a 36% marginal tax bracket.

These premia can be expected to erode slowly as the markets for the property components develop. Sellers will learn to value each component separately in arriving at property valuation. (To value each component, one could use separate computer systems to compute such valuation for each component separately. In effect, this approach is the invention disclosed herein divided into two computer systems, one for each component. Such an approach is viewed as an equivalent to the present invention.) In any case, eventually multiple bidders for estate for years interests will drive estate for years yield premia down to double or single-digit basis points.

However, by placing the estate for years interests privately, dissemination of this embodiment of the investment technology may lag.

In short, when viewed as a financial asset, unleveraged commercial property is a portfolio comprised of at least two components with different investment characteristics: a fixed-income asset essentially consisting of all ownership rights while existing leases are in place, and a pure equity component essentially consisting of all ownership rights after existing leases expire.

B. Computer System

The present invention is directed to a computer system for manipulating digital electrical signals to produce an illustration of a decomposition of property into separately valued components. The computer system includes a digital electrical computer controlled by a processor. A first logic means controls the processor in manipulating digital electrical signals representing input data to the computer, the input data characterizing at least two components decomposed from the property. The manipulating includes transforming the digital electrical signals into modified digital electrical signals representing respective values for each of the components, the values being computed to reflect taxation for the components. Input means is electrically coupled to the computer and operable for converting the input data (which can be entered manually) into the digital electrical signals and communicating the digital electrical signals to the computer. Output means is electrically coupled to receive the modified digital electrical signals from the computer and to convert the modified digital electrical signals representing the respective values into an illustration of the computed respective prices.

The computer system can additionally include a second logic means for controlling the processor in further manipulating the electrical signals, the further manipulating producing at least one financial document for one of the components, the financial document being constructed in response to electrical signals representing preexisting text and stored in memory accessed by said computer and in response to said modified digital electrical signals representing the respective values.

The computer system can be used in cooperation with one or more computer systems in respective locations to either recompute the computations (i.e., signal processing) discussed above or do supplemental computations (i.e., signal processing) as discussed below.

The property can be any property or divisible property right. Preferably, the property is real estate, but in another preferred embodiment, the property is a tax-exempt security.

Figures 1, 5A:
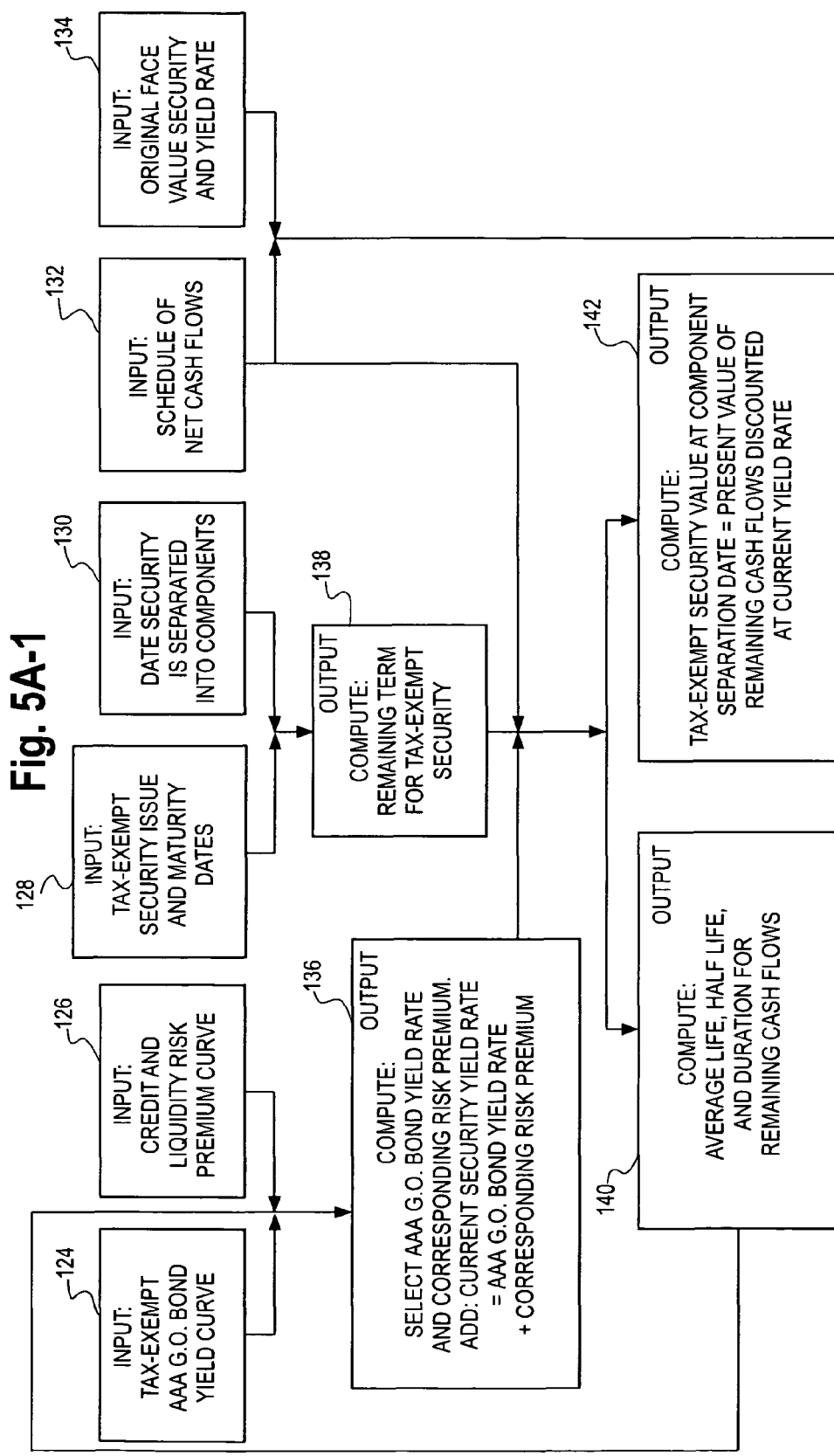
FIGS. 5a-5d is a flow chart showing the data input, computational and other logic, and data output of the logic means for controlling the computer system in accordance with the present invention as applied to tax-exempt property.
Figures 2, 5A:
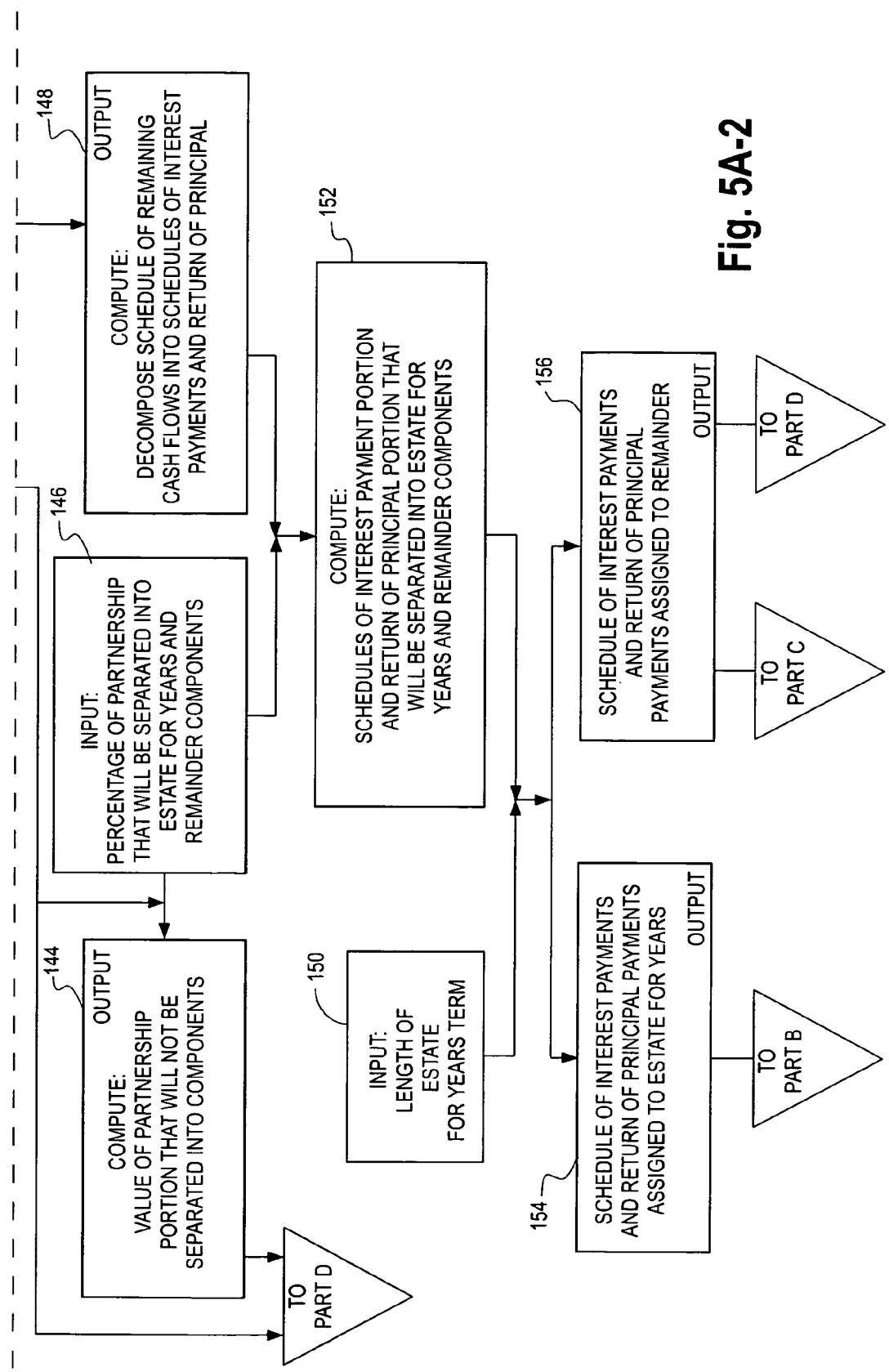
FIG. 2 is a diagram representing the electrical computer system and its input and output in accordance with the present invention.

More particularly, with reference to FIG. 2, the hardware, input, and output of a Computer System 12 according to the present invention are shown. The System 12 includes a Digital Computer 14, such as an IBM-compatible personal computer with a DOS operating system. Digital Computer 14 preferably has a model 486 central processor or a 386 central processor with a math coprocessor. Digital Computer 14 is operably linked to a Keyboard 16, for receiving Input Data 18 (described more particularly below with regard to FIG. 3) and converting it into electrical signals. Digital Computer 14 also is operably linked to output means, such as a Monitor 20 and a Printer 22 (such as a dot-matrix or laser printer) for outputting Financial Analysis Output 24 (described more particularly below with regard to Specimen 1) and Processed Component Financial Documents 26 (described more particularly below with regard to Specimens 3 and 4).

Digital Computer 14 is additionally operably linked to Memory System 28, comprising a means for storing Logic Means 30, such as a diskette or a hard disk, and a means for communicating the Logic Means 30 to the Digital Computer 14, such as a disk drive. Logic Means 30 can be a LOTUS 123 (Version 2.01 or higher) computer program, which is used to produce Specimen 1, though as described subsequently, a program dedicated to the purposes of this invention would be preferable.

When loaded and running on Digital Computer 14, Logic Means 30 controls the Computer System 12 transforming the electrical signals from Keyboard 16 into electrical signals associated with constructing files 32 (or records, if so desired) and of Financial Analysis Output 24. Storing a plurality of data files 32 would be appropriate, for example, for analyzing different separated purchase transactions or for analyzing how one or more changes in Input Data 18 influence the Financial Analysis Output 24.

Memory System 28 also stores a Word Processing Program 34, such as Word Perfect 5.1. Word Processing Program 34 is useful for constructing and editing text files to be printed via Printer 22 as Processed Component Financial Documents 26.

Preferably, one text file includes a Stored Model Financial Document For the Estate For Years 36, for example, an organizational document (e.g., for an entity for the estate for years real estate component such that certificates evidencing equity interest in the entity are securities, as exemplified in Specimen 3) or a disclosure document for securities law purposes for the securitized estate for years real estate component (e.g., for an equity interest in the securitized estate for years real estate component, as exemplified in Specimen 5). Another text file includes Stored Model Financial Document For Remainder Component 38, for example, an organizational document (e.g., for an entity for the remainder real estate component such that certificates evidencing equity interest in the entity are securities, as exemplified in Specimen 4) or a disclosure document for securities law purposes for the securitized remainder real estate component (e.g., for an equity interest in the securitized remainder real estate component, as exemplified in Specimen 6). Still another text file includes Stored Other Financial Documents 37, detailed subsequently herein.

It is to be explicitly understood that other implementations of the present invention, say, those using a different kind of digital computer, analogous hardware, multiple computer systems, comparable input and output, a computer program or programs written in a different language, or a hardwired system replacing the computer program, are entirely acceptable and equivalent to the present invention. Also the invention can be implemented by hardwired logic in a handheld calculator. When software is loaded into, and running, a programmable computer, the software sets what in effect are many, many "switches," and the result can be considered a new computer machine, with logic formed from the set switches. Instead of setting the switches, an equivalent would be to hardwire the same or equivalent circuitry. Therefore, whether a configurable device is configured to the requirements of the present invention, or a device is constructed from scratch solely for meeting the requirements of the present invention, is a distinction without a difference from an electrical signal processing standpoint. All these embodiments are different species of the present invention that are within the contemplated scope of the present invention.

C. Logic Means 30

Focusing more particularly on Logic Means 30, it should be recognized that System 12 is intended for a specific purpose, for operation under certain assumptions, to compute the values of components decomposed from property, and to provide documentation thereof; System 12 involves certain Input Data 18 and Financial Analysis Output 24, each of which is discussed below in greater detail.

1. Purpose

The Logic Means 30, in conjunction with the rest of System 12, is intended to facilitate financial transactions involving the separate components of property, preferably commercial real estate in a separated purchase transaction. For a separated purchase transaction to take place, the sum of the prices the two investors agree to pay for their respective components should theoretically be at least equal to a price at which the owner is willing to sell the property.

Logic Means 30 partially automates financial considerations that take into account the different investment characteristics of the two components. This facilitates or reduces the cost for, carving a property value into respective values, which can be treated as prices, for the estate for years and the remainder interest. In addition, Logic Means 30, in conjunction with Digital Computer 14, calculates various financial parameters to assist prospective purchasers in deciding whether the components are suitable as investments at the respective sale prices.

Logic Means 30, in conjunction with Digital Computer 14, calculates throughout the estate for years the values and tax bases of the separate components so that the sale and purchase of each component may take place privately or through a financial exchange established to provide liquidity in a market in which none presently exists.

Further, Logic Means 30, in conjunction with Digital Computer 14, provides accounting support to the estate for years investor by computing, on both annual and quarterly bases, the tax deductions generated by the property and the estate for years. These deductions may be used by the estate for years investor to reduce taxes on income produced by the estate for years and in certain other taxable operations. Because these deductions affect the basis of the remainder interest upon expiration of the estate for years, the accounting support set forth is also necessary for the remainder interest.

Logic Means 30 can also be used in conjunction with Word Processing Program 34 to efficiently incorporate Financial Analysis Output 24 into Financial Documents 26 (and to edit and revise the stored Model Financial Documents 36 and 38 for each separate purchase transaction) for each of the components.

2. Assumptions

The Logic Means 30 is intended to support the separated purchase transaction of real estate in which the estate for years has a definite and specified term, and in which the property is leased for rent prior to, or coincident with, the separated purchase transaction. For the estate for years to be an asset with fixed-income investment characteristics, the term of the estate for years is normally no longer than the shortest term remaining on the lease(s). That is, the estate for years entitles the holder to the right to receive the net cash flows from the existing leases until the end of the term. Furthermore, the risk of default on the scheduled cash flow(s) is determined by either the lowest-rated tenant credit risk or the value-weighted average credit risk of the tenants, with the former the norm.

It is assumed in this embodiment that ownership of the components is structured so that, after the separated purchase transaction, the purchaser(s) of the estate for years is (are) entitled to amortize the estate for years purchase price for tax purposes and also over the estate for years term. Additionally, it is assumed that any depreciation deductions are to be taken by the estate for years purchaser(s). Finally, it is assumed in this embodiment that the entire investment return on any preferred equity interest in the remainder component is insured via residual insurance, that the preferred equity interest does not have any participatory interest in the investment return on the remainder component other than the insured return, and that none of the residual value insurance is left over to insure the return on the residual equity interest in the remainder component. This implies that the preferred interest is a ratable fixed-income asset and that it is usually an investment-grade fixed-income asset in cases in which the residual value insurer has an investment grade credit rating.

In addition, it is assumed in this embodiment that the cost of the residual value insurance is payable in the form of a single up-front insurance premium at the time the property is separated into components. Other embodiments can incorporate general schedules and amounts of residual value insurance premium payments over the estate for years term. Still other embodiments can provide for the possibility that creation of a preferred interest in a remainder component, the purchase of residual value insurance for the preferred interest, or both the creation of a preferred interest in a remainder component and the purchase of residual value insurance for the preferred interest, can occur as one or more events subsequent to separation of the property into estate for years and remainder interests. These and yet other embodiments can also allow for the cost of possible interim financing for the remainder interest prior to the time the residual value insurance takes effect.

3. Pricing the Estate for Years

Under the above assumptions, the risk and return characteristics of the estate for years are those of a fixed-income asset. This implies that prospective investors will price the estate for years as a fixed-income investment, i.e., prospective purchasers will value the estate for years relative to comparable investments available in the bond market at the time of the separated purchase transaction.

Specifically, prospective purchasers of the estate for years will look at the available yield on Treasury securities of comparable cash flow characteristics for a comparable average life, add a risk premium based on the average credit risk of the tenants and, under present market conditions, probably add an additional premium due to the illiquidity of the investment. The sum of the appropriate Treasury rate plus the risk and the illiquidity premiums is a typical fixed income market discount rate for the estate for years.

4. Input Data 18

Generally, in order to value the estate for years as a fixed-income investment, a schedule of net cash flows during the estate for years term is determined. Typically, this will comprise a stream of scheduled monthly net rental payments. If the estate for years does not begin on the first day of a month and terminate on the last day of a calendar month, net rental payments could also include fractional monthly rental payments for the first and last months of the estate for years term. In addition, the date of the split purchase transaction, and the date that the estate for years terminates, are also entered as Input Data 18.

Estate for years valuation also includes the appropriate discount rate for the estate for years. But instead of inputting this number directly, the Logic Means 30 prompts a request (as Input Data 18) for the appropriate annualized Treasury bond interest rate for bonds of an equivalent average life to the estate for years, plus an appropriate risk/illiquidity premium, as discussed above.

To compute the remainder interest purchase price, the property sale price, together with any extra expenses (i.e., fees and commissions) arising in the securitization of the real estate components, are also entered as Input Data 18.

To estimate the depreciation and amortization deductions to which the estate for years purchaser is entitled, the Logic Means 30 assumes that the percentage of the property purchase price represented by land is not depreciable, but that the remaining portion of the purchase price is depreciable, as prescribed by the tax code. Thus, the Logic Means 30 requires the user to enter the percentage of property value that is not depreciable and the amounts and depreciation schedules for the remaining portions of the purchase price.

To project the after-tax cash flows of the estate for years investor, and hence this investor's projected after-tax income rate, the Logic Means 30 also uses the projected tax bracket schedule of the estate for years investor as Input Data 18.

To calculate the implied purchase price of the property for the remainder interest buyer at the time the estate for years expires, the Logic Means 30 further uses an implied risk-free opportunity cost of capital for the remainder interest buyer, typically though not necessarily the zero-coupon risk-free Treasury rate for the estate for years term, as Input Data 18.

5. Elements of the Financial Analysis Output

Elements of the Financial Analysis Output 24 of Logic Means 30 include (1) a representation of the price for the estate for years component, and (2) a representation of the price for the remainder interest component. The price an estate for years investor is willing to pay can be computed from the net rental cash flows, the interest rates in the bond markets, and the credit ratings of the tenants. The Logic Means 30 discounts the sequence of net rental payments scheduled during the estate for years term at the required estate for years discount rate to determine an appropriate purchase price for the estate for years. The price a remainder interest investor must pay is computed as the difference between: (1) the sum of the property asking price plus the costs and fees associated with separating the components, and (2) the estate for years valuation. This formula follows because between them the purchasers of the components must come up with the property asking price together with any extra expenses associated with creating the components. If these prices are acceptable to prospective component purchasers, then a separated purchase transaction of the real estate interests can be consummated.

6. Additional Output

In one embodiment of the invention, Logic Means 30 can have Compute Present Value of Enhancement 117, which computes the present value of the enhancement in property value due to component separation. This value is computed as the difference between the present value of the estate for years after-tax cash flows, and the after-tax cash flows the estate for years would generate if the estate for years were still a part of undivided property and subject to the same tax deductions available to the owner of undivided property. The discount rate used to compute this present value is the after-tax income yield rate for both sets of cash flows.

Logic Means 30 outputs the present value of the enhancement in two forms: expressed as a dollar amount, and expressed as a percentage of the gross property sale price.

The present value of the enhancement must be greater than the cost of extra fees and commissions due to securitization, in order for component separation to be a value-enhancing process.

Value enhancement is a rough measure of the attractiveness of component separation in each prospective transaction. However, it is not used directly in pricing components, nor in preparing documentation describing investment characteristics of the components.

7. Computer Screens and Logic

A preferred embodiment of this invention would involve a stand alone computer and a computer program (Logic Means 30) stored on a hard disk (of Memory System 28) of a 486 Personal computer (Digital Computer 14). Unlike a hardwired equivalent embodiment, a programmable Computer System 12 is more readily adaptable to produce whatever output a user of Computer System 12 may desire with respect to a prospective separated purchase transaction. The preferred programming language is structured BASIC, although C, Fortran, or any other language with mathematical formulaic capabilities is acceptable. The operating version of the computer program for users should be in compiled code.

The Logic Means 30 includes Shell 40, which permits the option of accessing Word Processing Program 34 or a Title Screen 42 of a data processing system. Title Screen 42 informs the user of the name and ownership of the Logic Means 30, notice of any copyrights or patents that involve the invention, etc.

The Title Screen 42 leads to a Menu 44 screen created by Computer System 12 to query the user as to whether the user wants to retrieve one of the Data Files 32 stored from a previous run of the Logic Means 30 that the user saved in Memory System 28 or to create a new data file to become a new one of the stored Data Files 32. If the user makes a menu selection indicating that the Logic Means 30 should retrieve one of the stored Data Files 32, the Logic Means 30 asks on a Retrieve Stored Data File Screen 46 for the name and directory of the selected Data File 32. Block 48 performs the function of recalling the appropriate one of Data File 32.

Otherwise, the user can make a menu selection at Block 44 to create a New Data File 50. Regardless of which of these selections is made, Logic Means 30 displays a Data Form 52 like Screen 1 of Specimen 1, which will either have blank spaces to receive Input Data 18 to fill in the Data Form or will already be completed as a stored Data File 32. Specimen 1, Screen 1, herein is a representation of a completed data form. This representation, which is illustrative only, involves 10-year leases and a certain pattern of rents, and as such, it is a limited illustration of the capabilities of the invention discussed herein. Also, a portion of the Financial Analysis Output 24 is presented in Screen 2 and Screen 3 of Specimen 1, which is a simplification over the use of a dedicated program to generate the Financial Analysis Output 24 after all of the Input Data 18 has been entered.

The Logic Means 30 has an Input/Edit Data Form 54 screen adapted to receive Input Data 18 from the user by manual operation of Keyboard 16. Thereby, the user is able to enter or edit a column of rents until all payments have been entered. The user is also able to edit data on the data form, as is discussed more particularly below. Editing a data form recalled from Data File 32 efficiently enables recomputing similar data without having to enter data all anew. Instructions informing the user of which keys perform the functions can appear at the top or bottom of the screen. After the user is satisfied that all information solicited in the data form has been entered correctly, the user enters a command to enable Data Processing 56. The Logic Means 30, in conjunction with Digital Computer 14, calculates the output parameters indicated in FIG. 4 to produce a new Data Form as Financial Analysis Output 24 in FIG. 2.

The Logic Means 30 also provides options to Print 58 the Financial Analysis Output 24 and to Store 60 the Financial Analysis Output 24 as a Data File 32. The user makes a selection at Blocks 58 and 60 by pressing an appropriate key on Keyboard 16.

The Logic Means 30 returns to the Main Menu 44 to either repeat the aforesaid sequence or to quit 62 to the Shell 40. The action of pressing an exit key at any point in the sequence, if this feature is used, should bring up a fail-safe screen requesting the user to confirm the exit instruction by pressing another designated key, or cancel the exit instruction by pressing any other key.

From Shell 40, the user can alternatively enter a selection to call up the Word Processing Program 34. Word Processing Program 34 can access the Stored Model Estate For Years Financial Document 36 or the Stored Model Remainder Component Financial Document 38 or other financial documents to modify the selected document to include information computed from Process Data 56. This information can include the expected returns under various performance scenarios, the price, and various quantitative descriptions of risk, e.g., prices under various scenarios. Process Data 56 can be contained entirely within one computer or can encompass a group of at least two computers that communicate electronically. Thus, computations of the expected returns under the various performance scenarios can take place entirely within one computer or can take place within a group of computers that communicate computations and/or data on the expected returns under the various investment scenarios electronically within the group. Similarly, computations of the prices under the various performance scenarios can take place entirely within one computer or can take place within a group of computers that communicate computations and/or data on the prices under the various investment scenarios electronically within the group.

Edit 63 involves editing any of the stored model documents of Block 36, Block 37, and Block 38, particularly to incorporate information from a Stored Data File 32. Print Document 64 permits printing the modified selected document at Printer 22 as one of the Processed Component Financial Documents 26. Store Document 66 permits storing the modified selected document via Memory System 28. Quit to Word Processing Program 68 inquires whether the user prefers to return to Word Processing Program 34 to repeat a loop defined thereby, or to go to the Shell 40.

Other Stored Model Financial Document 37 represents other financial documentation required to successfully place the securitized components. For each component, these include at least one securities document, e.g., one or more of the following group: an organizational document for an entity such that a certificate evidencing an ownership or equity interest in the entity is a security, a security evidencing an ownership or equity interest in such an entity, and a disclosure document for securities law purposes, such as an offering memorandum, prospectus, or term sheet, which would normally include some or all of the following.

Security Description
Property Description and Legal Description
Lease Synopsis and Lease Agreement
Description of Tenant(s)
  Business
  Financial Assessments
Financial Analysis Based Upon Various Assumptions and Inputs
Presentation of Risk Characteristics In this description, the term "securities law" can refer to United States federal securities law alone or to all applicable United States federal, state and territorial securities law.

A portion of the Financial Analysis Output 24 is presented in Screens 2-4 of Specimen 2, which is a simplification over the use of a dedicated program to generate the Financial Analysis Output 24 after all of the Input Data 18 has been entered.

Turning now to FIG. 4, the input and computational logic of a preferred embodiment of Logic Means 30 is detailed. The logic of Input Date A 70 receives entry of the date on which a separated purchase transaction is to take place, and Input Date B 72 receives entry of the expiration date for the estate for years. The transaction date and the estate for years expiration date should be entered as numbers, i.e., the number of the month, the number of the day, so that the length of the period between the two dates can be easily computed in Compute Estate For Years Term 74. Block 74 computes the number of whole and fractional months in the estate for years term, both as an output and for use elsewhere in the logic in computing discounted presented values and the schedules of annual and quarterly depreciation and amortization deductions, as discussed subsequently.

Usually, the end of the estate for years term will be on the last day of a calendar month, and the transaction date will be on the first or last day of a calendar month. Thus Block 72 stores the number of days in any fractional calendar month at the beginning or end of the term, if any, separately from, and in addition to, the length of the term (i.e., Block 72 keeps the number of days in beginning and end fractional calendar months separate from each other). By subtracting the separated purchase date from the expiration date of the estate for years, the Logic Means 30 can be used to compute the length of the estate for years term (e.g. "10 years", "9 years 8 months", or "9 years 10 months 11 days").

The Logic Means 30 also includes Input Treasury Bond Yield Rates 76 and Input Rental Income Risk Rates 78 for respectively receiving entry of the Treasury bond yield curve and the rental risk premium curve as a function of the yield curve. The output of Block 91, which is only slightly sensitive to changes in position on the yield curve, is used interactively to select the appropriate Treasury bond rate and rental income risk premium.

The data entered in Blocks 76 and 78 are used in Compute Rental Income Rate 80, which adds the data to compute the rental income yield rate, which is the discount rate used to value the pretax net rental payment cash flows. Rather than treating the value as an input, the Logic Means 30 has the user input the corresponding Treasury bond yield rate and the rental income risk premium appropriate for the tenant credit ratings. The rental income yield rate is computed in Block 80 as the sum of the Treasury bond yield rate and the rental risk premium.

The Logic Means 30 also has Tax Bracket 82 for receiving input data representing the tax bracket of the estate for years purchaser. The estate for years purchaser will usually be a taxable investor, in order to take advantage of the tax deductions associated with ownership of the estate for years asset. The Logic Means 30 computes the after-tax income yield rate, (i.e., the marginal after-tax interest rate the estate for years investor receives on income from senior debentures of the same default risk as the estate for years) in Block 84. The computation is the product of the pretax interest rate on those debentures (obtained from Block 80) multiplied by one minus the tax bracket of the estate for years purchaser (obtained from Block 80).

Input Gross Rental Payment 85, which is applicable for non-triple net leases, receives the projected gross rental payment. Input Property-Related Ownership Costs 87, which is also applicable for non-triple net leases, receives the projected ownership costs. Input Wrap Insurance Costs 89 is actually a part of Input Block 87 in the case of non-triple net leases, but is broken out and made a separate input in the case of triple-net leases that are not bondable. This is the schedule of insurance payments for the wrap insurance policies needed to upgrade a non-bondable triple-net lease to bondable status.

Compute Scheduled Net Rental Payments 88 receives the data input in Blocks 85, 87, and 89 to compute net rental payments during the estate for years term, as mentioned above. However, for triple-net leases, Block 88 can be an input of net rental payments, with Blocks 85 and 87 unnecessary, and Block 89 optional or unnecessary: (1) unnecessary in the case of bondable triple-net leases; and (2) optional for other triple-net leases, depending on whether or not insurance to upgrade the triple-net lease to bondable status is cost-effective. If the user selects to enter the monthly rental payments manually, the Logic Means presents Screen 54 with the aforementioned two columns: a list of the calendar months in the estate for years term (beginning with the month that includes the transaction date, and ending with the month that includes the expiration date of the estate for years security) on the left, and corresponding spaces for rental payments on the right. Alternatively, in the (typically occurring) cases of leases which have constant net rental payments, or for which the term can be divided into a small number of subterms during each of which the net rental payments are constant, the various net rents and the periods to which they apply may be entered in lieu of a month-by-month net rent schedule.

The data input in Block 88 is used in Compute Estate for Years Purchase Price 90. The estate for years purchase price, which is implied by the rental income yield rate, is the discounted present value of the net scheduled rental payments, valued at the rental income yield rate computed in Block 80. If the transaction date is the first day of a calendar month, and the estate for years term consists of a whole number of months, then Formula 1 gives this value.

$$\text{Estate for Years Purchase Price} = \sum_{j=1}^{N} \frac{(\text{rent in } j\text{th month})}{(1+r/12)^{j-1}} 1, \quad (1)$$

where r=the annual rental income yield rate, and N=the number of months in the estate for years term.

The data input for Block 90 together with the output of Block 90 is used in Block 91 to compute the weighted average life, half life, and duration, for the Estate for Years. One or more of these values—the weighted average is currently the preferred choice—is typically used by investors to determine which value on the Treasury yield curve is the most suitable choice for input through Block 76. Because these values only vary by relatively small amounts as the inputs from Blocks 76 and 78 are varied, rough estimates of the correct place on the yield curve can be used for these inputs, with the output of Block 91 then used iteratively to correct the original estimates; alternatively, the iterative loop can be omitted, and instead performed manually by the user to select among candidate yield curve values and converge interactively to the appropriate place on the yield curve based upon the output of Block 91. If the manual mode is employed, one, two or at most three, iterations will be required to converge to the correct yield curve value.

The Logic Means 30 additionally has Input Property Valuation 92 for receiving input data representing a property valuation of the real estate; Input Extra Fees 94 is for receiving input data representing fees and expenses incurred in structuring the separated purchase transaction. The securitization and separation of a property into components often entails greater costs than a traditional real estate sale. Those investing in the components are willing to pay the additional cost because, after a split purchase, the combined values of the two components is greater than the value of the real estate before the purchase as shown in FIG. 1, due to additional tax deductions available after the real estate interests have been divided.

The gross property sale price is computed in Property Sale Price 96 as the sum of the value of the undivided property (from Block 92) and the incremental expenses required to split the real estate into components (from Block 94). Expenses beyond those required in a conventional real estate transaction are considered here.

Compute Cap Rate 98 computes a rather crude indicator of the return on the investment. The cap rate is computed by dividing the total first year rent (from Block 88) by the gross property sale price of the undivided property (from Block 96).

Remainder Interest Purchase Price 100 computes the remainder interest purchase price as whatever amount in addition to the estate for years purchase price is required to put together the price required to purchase the real estate. This value is computed by subtracting the estate for years purchase price (from Block 90) from the gross property sale price (from Block 96).

Remainder Interest Implied Annual Return 102 computes the remainder interest component implied annual return, which is the annualized return the remainder interest investor will have earned if the value of the property when the estate for years expires is determined by multiplying Input Future Remainder Value 73 by Input Property Valuation 92. Input Future Remainder Value 73 is the expected remainder value at the end of the estate for years term, expressed as percentage of Input Property Valuation 92. In the case of institutional grade real estate, the input value received by Input Future Remainder Value 73 will frequently be close or equal to 100%, reflecting the frequently applicable assumption that the value of the decomposed property is expected to change little or not at all across the estate for years term.

This interest rate is the only unknown quantity in Formula 2, which is set forth below.

$$\text{Expected Property Valuation} = (\text{Remainder Component Purchase Price})(1+x)^{[N/12]}(1+(N/12-[N/12])x) \quad (2)$$

where Expected Property Valuation is the product of Input Future Remainder Value 73 and Input Property Valuation 92, N=number of months in the estate for years term, [N/12]=the largest integer that is less than or equal to N/12, and x=remainder component implied annual return.

Input Rental Area 104 is for receiving data input representing the rentable area in the real estate. This data is used in Remainder Price Per Square Foot 106 to compute the remainder price per square foot, which is computed by dividing the remainder interest purchase price (from Block 100) by the number of rentable square feet in the property (from Block 104).

Input Zero-Coupon Risk-Free Rate 108 is for receiving data input representing the zero-coupon risk-free rate. Then, in Block 110, the price per square foot that the remainder interest buyer is paying at the time the remainder interest matures into full ownership of the property is computed as equaling the amount to which the remainder price per square foot increases when it accrues interest at the zero-coupon risk-free rate. Formula 3 is used to compute this value.

$$\text{Price/Sq. Ft.} = (\text{Remainder Price/Sq. Ft.})(1+\text{zero-coupon risk-free rate})^{[N/12]}(1+(N/12-[N/12])(\text{zero-coupon risk-free rate})) \quad (3)$$

where N=number of months in the estate for years term, and [N/12]=the largest integer that is less than or equal to N/12.

Although this is the correct formula for a comparison of remainder interest prices at the beginning and end of the estate for years term in an arbitrage-free market, the remainder interest investor may find it more instructive to transforming this equation into a capital budgeting relation by substituting the remainder interest investor's opportunity cost of equity or debt capital for the risk-free rate.

Percentage of Property Value Not Depreciable 112 is for receiving input data representing a percentage of property value represented, in the case of real estate, by the land. If a conservative cost recovery position is taken by the estate for years investor and only amortization is claimed as a tax deduction, which is the likeliest scenario at the current time, then this input is unnecessary. If depreciation as well as amortization is claimed by the estate for years holder, then this value is used in Block 114 to compute the schedule of depreciation and amortization tax deductions, together with the resulting adjustments to the estate for years tax basis. These must be computed very carefully because if both deductions are claimed then the deductions are not completely independent of each other, and because the interaction is complex and subtle.

Under present tax law, during the estate for years term, the estate for years is entitled at least to a deduction computed by straight line amortization of the estate for years acquisition cost, and possibly depreciation deductions as well, with reductions in each end-of-year tax basis computed in accordance with established tax accounting principles.

After computing the values of these annual deductions, the investor allocates fractions of the deductions to each tax quarter as instructed in the present tax code (e.g., if the first year is the entire calendar year, one quarter of each deduction is allocated to each quarter), and the tax basis is reduced accordingly on a quarterly basis.

The quarter-by-quarter amortization and depreciation deductions, and the corresponding quarterly adjustments to the estate for years tax basis, will be entered into a preformatted table. This table will be available for viewing on the Monitor 20, can be stored with the other output data if saved in Data File 32 by the user of Computer System 12, and can be printed at Printer 22 if the user presses a designated key on the Keyboard 16. (It should be noted that this invention uses the tax code, whatever it may require, in decomposing the real estate into separate components; the invention of the computer system and methods involving it of course do not depend upon the present tax laws.)

Block 116 computes quarterly tax payments by subtracting the quarterly tax deductions from the quarterly net rental payments, and multiplying the result by the tax bracket of the estate for years investor. This is output since it is part of the accounting support for the estate for years investor.

Typically, tax payments are made by institutional investors four times per year, in the middle of months 1, 4, 7, and 10. The after-tax income component yield, which is computed in Block 118, is the after-tax yield to the estate for years buyer, and is the internal rate of return on the after-tax net rental cash flows. For rental payments made at the beginning of each month, it is preferred to divide the year into twenty-four (24) semi-monthly periods with cash flows at the beginning of each period. With this approach, the pretax rents are the cash flows in the odd-numbered periods (i.e., periods 1, 3, 5, ..., 21, 23), while the tax payments are the cash flows in periods 2, 8, 14, 20 (in the other even-numbered periods, the cash flows are treated as being equal to zero).

An alternative is to simplify the calculation conceptually for the estate for years holder by assuming that tax deductions occur with the same frequency as the cash flows (typically, on a monthly basis), and matching the occurrence of the tax deductions with the corresponding cash flows. In this case, for computational purposes the year will be divided into the same number of periods as the expected frequency of cash flows—typically, twelve periods, or monthly.

In Pretax Income Component Yield 120, the pretax income component yield is computed as the pretax interest rate that the estate for years buyer would have to receive if the estate for years were a bond, in order to be left with the same amount of after-tax income that results from owning the estate for years. This number is computed by dividing the after-tax income component yield (from Block 118) by one minus the tax bracket of the estate for years investor (from Block 82).

If the estate for years purchaser is a taxable investor, this number will be larger than the rental income yield rate of Block 80. This occurs because the estate for years is an income-producing asset rather than a bond, and hence income from the estate for years is subject to different tax regulations than income from a bond.

Block 122 computes the equivalent after-tax estate for years value by discounting the after-tax net rental payments at the after-tax income yield rate. This is the discount rate that would be applied to the after-tax cash flows if the estate for years were a bond.

Block 122 may compute other measures of the estate for years value by discounting different components of the after-tax cash flows at different discount rates that reflect the different risk characteristics of those components (e.g., discounting the pretax cash flows, tax payments, and tax deductions at rates that reflect the different degrees of certainty that they will be realized as projected at the time of component separation).

In cases in which the remainder component is to be decomposed into a preferred fixed-income interest and a residual equity interest, Input Credit Risk Premium Curve 105 receives the credit risk premium curve of the insurer for the preferred interest. Input Extra Months to Retire Preferred 103 receives the amount of time beyond the estate for years term, if any, that the residual equity interest investor has to refinance or sell the property and pay off the preferred interest holder. Average Life 95 computes the expected life of the preferred interest in the remainder component by adding the estate for years term to the value received by Input Extra Months to Retire Preferred 103, which equals the average life of the preferred interest since the preferred interest is a zero-coupon bond. Preferred Interest Annual Return 97 selects the Treasury bond yield rate from Input Data 78 and corresponding insurance credit risk premium from Input Data 105 corresponding to the preferred equity interest average life, and computes the preferred interest annual return by adding the Treasury bond yield rate to the insurance credit risk premium.

Input Insured Property Value 101 receives the insured value for the property at a date specified by the residual value insurance (e.g., at maturity of the preferred interest), expressed as a percentage of Input Property Valuation 92. Preferred Interest Purchase Price 99 converts the insured value for the property to a nominal amount by multiplying Input 101 and Input 92 together, and then computes the preferred interest purchase price by discounting the insured property value at maturity of the preferred interest back to the date of the temporal decomposition by the equation:

$$\text{Preferred Interest Purchase Price} = \text{Insured Property Value} / ((1+y)^{[M/12]}(1+(M/12-[M/12])y) \quad (4)$$

where y=preferred interest annual return, and M=number of months in the expected life of the preferred interest.

The cost of decomposing the remainder component into preferred and residual interests is computed in Residual Interest Purchase Price 113 as the sum of the cost of residual value insurance from Input Insurance Policy Premium 107 and any additional associated up-front fees from Input Additional Up-Front Fees 109, such as the costs of obtaining a credit rating for the preferred interest and of generating financial disclosure documents for the preferred and residual interests. Residual Interest Purchase Price 113 then computes the residual interest purchase price from the equation that the sum of the preferred interest and residual interest purchase prices is equal to the sum of the purchase price of the remainder component from Remainder Interest Purchase Price 100 and the cost of decomposing the remainder component into the preferred and residual interests. This is a linear equation in which the only unknown quantity is the purchase price of the residual interest, which implies that the equation can be solved for the residual interest purchase price as follows:

Residual Interest Purchase Price=Remainder Component Purchase Price+Residual Value Insurance Policy Premium+Additional Up-Front Fees− Preferred Interest Purchase Price (5)

In some exceptional cases, it may be desirable to use a fraction of the residual value insurance to insure the return on the preferred interest, reserving the remaining fraction of the residual value insurance to insure a portion of the return on the residual interest. This can lower the investment risk associated with the residual interest, enhancing the marketability of the residual interest by sacrificing some residual interest leverage. In such cases, the expression on the right side of Equation (4) for the preferred interest purchase price must be modified as follows: the right side of the equation must be multiplied by the fraction that represents the portion of residual value insurance that is allocated to insurance for the preferred interest return. Equation (5) still provides the solution for the residual interest purchase price in terms of the preferred interest purchase price.

Input Exit Fees 111 receives the expected future cost of liquidating or refinancing the remainder interest in order to raise the funds required to retire the preferred interest, which cost is expressed as a percentage of the expected property valuation at maturity computed in Block 102.

Residual Interest Annual Return 115 computes the expected annual return on the residual interest over the expected life of the preferred/residual decomposition. This interest rate is the only unknown quantity in the following equation:

$$\text{Expected Residual Interest Valuation at Maturity} = (\text{Residual Interest Purchase Price})(1+z)^{[M/12]}(1+(M/12-[M/12])z) \quad (6)$$

where Expected Residual Interest Valuation at Maturity is the value obtained by subtracting the sum of the preferred interest valuation at maturity and the expected nominal amount of exit fees from the expected property valuation at maturity from Block 102, z=residual interest annual return, and M=number of months in the expected life of the preferred interest. The preferred interest valuation at maturity equals the value of the portion of the minimum property value specified by the residual value insurance that is allocated to the preferred interest, which portion usually is equal to the entire amount of the specified minimum property value. The expected nominal amount of exit fees is obtained by multiplying the percentage value from Input Exit Fees 111 by the nominal value of the expected property valuation at maturity.

Remainder-to-Residual Ratio 119 divides the remainder interest valuation by the residual interest valuation. This represents the factor by which the amount of equity risk capital required to complete the acquisition and decomposition of the property is reduced via the use of residual value insurance to carve a fixed-income preferred interest out of the remainder component.

Residual Leverage Ratio 121 computes the factor by which leverage for the equity investor is increased (for the case of the scenario specified by the input values) by carving a preferred fixed-income interest out of the remainder component. This is computed by the following equation:

$$\text{Residual Leverage Ratio} = (\text{Remainder-to-Residual Ratio})(\text{Expected Residual Valuation at Maturity/Expected Property Valuation}) \quad (7)$$

where Remainder-to-Residual Ratio is obtained from Block 119, Expected Residual Valuation at Maturity is obtained from Block 115, and Expected Property Valuation is obtained from Block 102.

In Blocks 115 and 121, the residual interest annual return and the residual leverage ratio are computed net of fees associated with raising the funds required to retire the preferred interest. This is a financially conservative approach to the computation of these values and differs from the approach frequently taken in disclosure documents, which is to compute returns and leverage ratios based on asset values before imposition of any back-end liquidation or refinancing fees. It is important to note that the alternative values for the residual annual return and residual leverage ratio before imposition of back-end fees are also generated by this software, by setting Input Exit Fees 111 equal to zero.

By contrast, the incorporation of an assumed exit fee at the end of the estate for years term in Remainder Interest Implied Annual Return 102 and the expected property valuation input to Residual Leverage Ratio 121 is usually inappropriate in the case of a remainder interest that is not leveraged or decomposed into components, since in this case the remainder interest holder usually does not face an automatic need to refinance the property at the end of the estate for years term. In cases in which the remainder holder is expected to face such a need, expected exit fees can be subtracted from Input Future Remainder Value 73 either before or after data entry. This modification will flow through automatically to make appropriate modifications for expected remainder holder exit fees to the calculations for Remainder Interest Implied Annual Return 102 and Residual Leverage Ratio 121.

Insured Value Per Unit Area 125 computes the insured value of the property per unit area of rentable space by multiplying the property valuation from Input Property Valuation 92 by the insured value for the property from Input Insured Property Value 101 (as specified at maturity of the preferred interest by the residual value insurance and expressed as a percentage of Input Property Valuation 92) and dividing the resulting product by the rentable area of the property, usually in square feet, received from Input Rental Area 104.

In using Computer System 12 and the Financial Analysis Output 26, the user of Computer System 12 can construct financial documents by using a Word Processing Program 34 to revise such documents as those in Specimen 2 and Specimen 3 and the Stored Other Financial Document 37. These documents contain other terms and conditions and other particulars for the separated purchase transaction of the components of the real estate, in accordance with the present invention.

D. Computer Screens and Logic for Another Embodiment

In another embodiment of the present invention, the Logic Means 30, in conjunction with the rest of System 12, is used in connection with financial transactions involving separate components of one or more partnership interests in tax-exempt securities.

In this embodiment, Logic Means 30 partially automates the dividing of the partnership interest into respective, valued interests for the estate for years and the remainder interest. Computation of the values is based on fixed-income pricing techniques widely accepted by fixed-income investors.

In this other embodiment of the invention, the hardware, logic, and computer screens are as described above, with modifications to reflect the different kind of property being divided. Reflecting these modifications, Data Form 52, of which Screen 1 of Specimen 2 is an example, accepts inputs for a tax-exempt security with constant debt service payments.

The user enters or edits a column of debt service payments (instead of the rents in the above-mentioned embodiment) until all payments have been entered.

Other Stored Model Financial Document 37 represents other financial documentation required to successfully place the securitized components. For each component, these include a securities document, e.g., one or more of the following group: an organizational document for an entity such that a certificate evidencing an ownership or equity interest in the entity is deemed a security for securities law purposes, a security evidencing an ownership or equity interest in such an entity, and a disclosure document for securities law purposes, such as an offering memorandum, prospectus, or term sheet, which would normally include some or all of the following:

Security Description
Entity Description
Tax-Exempt Fixed-Income Security(ies)
Held by Entity (Description)
Description of Borrower(s) Financial Assessments
Financial Analysis Based Upon Various Assumptions and Inputs
Presentation of Risk Characteristics In this description, the term "securities law" can refer either to United States federal securities law alone or to all applicable United States federal, state and territorial securities law.

FIG. 5 represents the input and computational logic of this embodiment of Logic Means 30, which again is substantially as discussed in the above-mentioned embodiment. The pricing logic for components is analogous to the pricing of the estate for years in the case of tangible property. However, unlike the application of this invention to tangible property, every financial asset in the present embodiment—the original asset together with all components—is treated as a fixed-income asset, and is valued via fixed-income technology.

Values can be expressed, and computations performed, in absolute terms of a currency unit such as dollars, or in relative terms such as percentages of current value or original issue value of the tax-exempt securities in the partnership portfolio of interest. While all contracts ultimately require values to be expressed in absolute terms, comparisons of profitability are more easily made in relative terms. Specimen 2 illustrates both modes of expression for System 12 input and output.

To simplify the language in what follows, the remaining discussion will refer to "securities" in the singular only, i.e., "security;" however, it will be understood that the discussion applies both to single-security portfolios and multiple security portfolios held by the partnership. Where possible, the discussion will simply refer to the security as the "partnership portfolio." Similarly, the term "investor," when applied to the holders of estate for years and remainder components, is intended to refer to both the singular and plural cases.

The logic of Input Data 124 receives a schedule of interest rates for AAA publicly traded general obligation municipal bonds of annual maturities from one to thirty-five years. This serves as the analogue of the yield curve for the tax-exempt bond market, i.e., the basis for pricing all other tax-exempt securities, and this input is used by each pricing calculation herein. Input Data 126 receives a schedule of additional interest investors expect for holding a type of tax-exempt portfolio held by a limited partnership. Block 136 roughly estimates a remaining average life of the partnership portfolio, selects the corresponding AAA general obligation rate and risk premium, and adds them to obtain the current yield required by the fixed-income market for the partnership portfolio.

Input Data 132 receives the schedule of payments expected from the partnership portfolio. This will usually be in the form of a file specifying payment values and dates. However, in some cases an alternate description may be appropriate. For example, in the case of a single-security portfolio with constant debt service, the specification of principal value, frequency of payments, and amortization term constitutes a description from which, together with the yield rate from Input Data 134, a schedule of debt service payments may be reconstructed.

Using data received by Input Data Blocks 130 and 132, Block 142 extracts a schedule of remaining cash flows expected from the partnership portfolio, and computes a present value by discounting the cash flows at the rate received from Block 136. Based on this present value, an improved estimate of the average life of the portfolio is computed by Block 140.

Block 136 uses this improved estimate iteratively to recompute the current portfolio yield, and the recomputed portfolio yield is used by Blocks 142 and 140 to recompute the portfolio value and average life, respectively. As discussed earlier, average life is relatively insensitive to changes in the discount rate, so one or two iterations is almost always sufficient to obtain consistent output values that will not change with additional iterations.

This linked iteration is used four more times in the logic of Logic Means 30: in the calculations of discount rate, and the price, and the average lives of the estate for years and the remainder. The other examples are virtually identical, and will not be discussed separately.

Box 146 receives a percentage of the partnership that will be separated into estate for years and remainder components, and Box 148 computes a complementary value of the partnership that will not be separated into components. It is possible that several partnership interests will be separated into components, and that various estate for years components will have distinct terms; however, typically there will be only one partnership interest that will be separated into components, and it will be the entire limited partnership interest. Consequently, the "term" of the estate for years is clear because usually there is only one estate for years. However, the invention is intended to include the more general case of multiple component separations as well.

The choice of partnership percentage that will be separated into components as an input is arbitrary, at least in the case in which one component is separated into components. It is equally acceptable to input the partnership percentage that will not be separated into components, and to output the percentage of the partnership that will be separated into components.

Block 148 receives the schedule of partnership cash flows that will be received after the date the components are separated and decomposes the cash flows into interest and repayment of principal portions, using the original interest rate at which the security was issued (from Input Data 134). These distinctions are important in valuing the components because, under current federal tax law, only the interest portion of each payment is automatically tax-exempt; the repayment of principal portion is sheltered from federal taxation only to the extent that cost recovery deductions generated by the security are available to the security holder(s).

It will frequently be the case that the original tax-exempt interest rate received by Input Data 134 equals the current tax-exempt yield rate computed by Block 136. One natural way for this to occur is if the tax-exempt security in the partnership portfolio is created at the same time as the estate for years and remainder components. In this case, the embodiment of the invention defined herein will generate documentation for the tax-exempt security as well as documentation for the estate for years and remainder components.

Block 152 multiplies the payment schedules for interest and repayment of principal by the percentage of the partnership that will be separated into components to compute schedules for interest payments and repayment of principal payments that will be split between the components.

The length of the estate for years term received by Input Data 150 is used by Blocks 154 and 156 to split the schedules of interest and repayment of principal payments into schedules of payments that will be received by the estate for years investor and the remainder investor, respectively.

Block 158 receives the schedule of risk premium values for a security of the type represented by the estate for years. The estate for years risk premium schedule is related to the partnership portfolio risk premium schedule, but may differ due to different investor perceptions of risk in the two types of investments. While credit risk for the estate for years is the same as credit risk for the partnership portfolio, liquidity risk may be different. The liquidity risk will be increased if the estate for years is viewed as more difficult to sell prior to maturity than the partnership portfolio, as will be the case before this product is well-established in the fixed-income marketplace. But the liquidity risk will also lessen because the average life of the estate for years is shorter than the average life of the partnership portfolio. The combined effect on liquidity risk as perceived by investors is difficult to predict, and may have to be dealt with on a case-by-case basis.

The estate for years risk premium may also contain a component due to perceived tax risk, i.e., the risk that not all of the predicted incremental tax benefits associated with the estate for years will be received by the estate for years investor. This risk may be substantial in some cases, and nonexistent in others. For example, if the estate for years component carries insurance against loss of economic benefits due to a change in the tax laws, the estate for years investor would not be expected to demand additional return for tax risk, because this investor is not exposed to any risk of economic loss as a consequence of this risk dimension.

For marketing purposes, the estate for years component may disburse cash payments according to a different schedule than the partnership portfolio. For example, the partnership portfolio may receive payments monthly, or at irregular intervals (e.g., if the portfolio contains several securities), whereas the estate for years makes disbursements semiannually. Input Data 160 receives the frequency of estate for years cash disbursements, and Input Data 162 receives the tax-exempt interest rate the general partner(s) guarantee to accrue on warehoused payments from the partnership portfolio, usually from a tax-exempt money market fund.

Block 166 computes the cash payment schedule of the estate for years component. Each payment is computed by adding together the portion of the partnership portfolio disbursements warehoused for the estate for years investor since the last disbursement, and adding to that the interest accrued on the warehoused payments.

Block 164 computes the estate for years yield rate as in the case of the partnership portfolio yield rate (cf. Block 136).

Block 174 computes the estate for years purchase price by discounting the cash flows from Block 168. In general, this computation is an interactive process. First, Block 170 discounts the aftertax estate for years cash flows at the estate for years yield rate computed by Block 164. This discounts all of the interest portions of the cash flows, but assumes that repayment of principal portions are reduced by tax payments before discounting, where tax payments are computed using the projected tax rates from Input Data 162.

Figures 1, 5B:
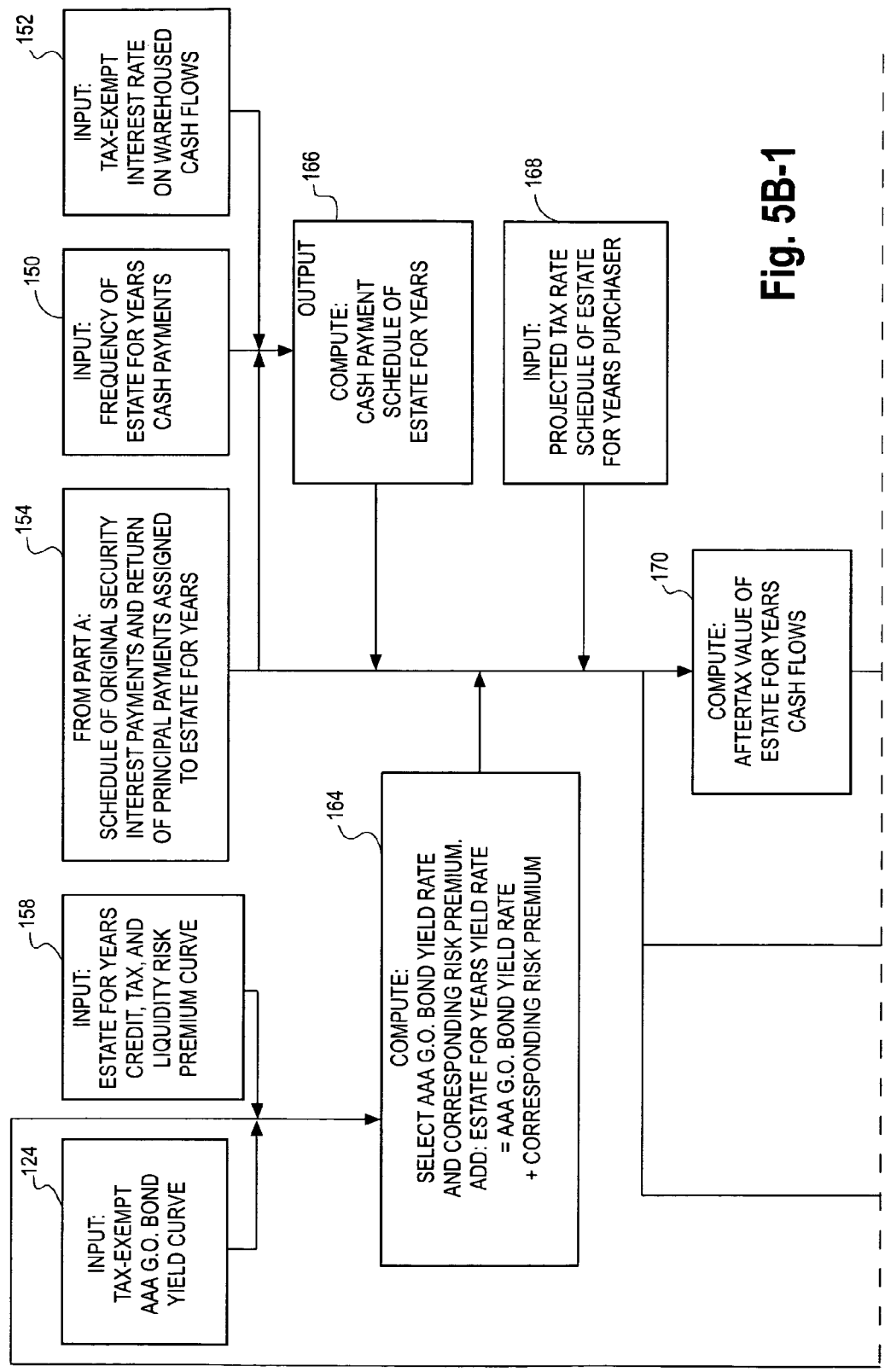
Figures 2, 5B:
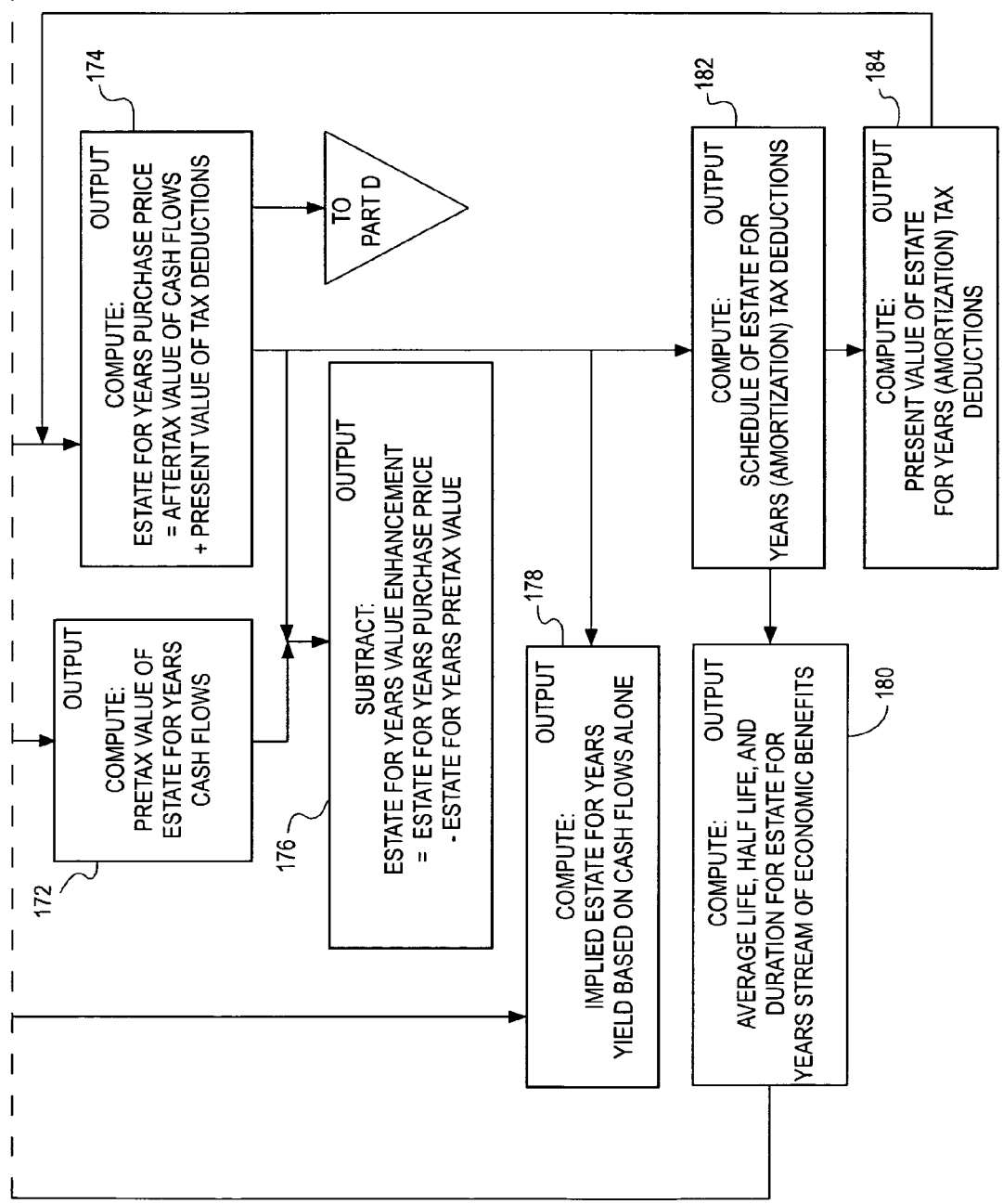
Figures 1, 5C:
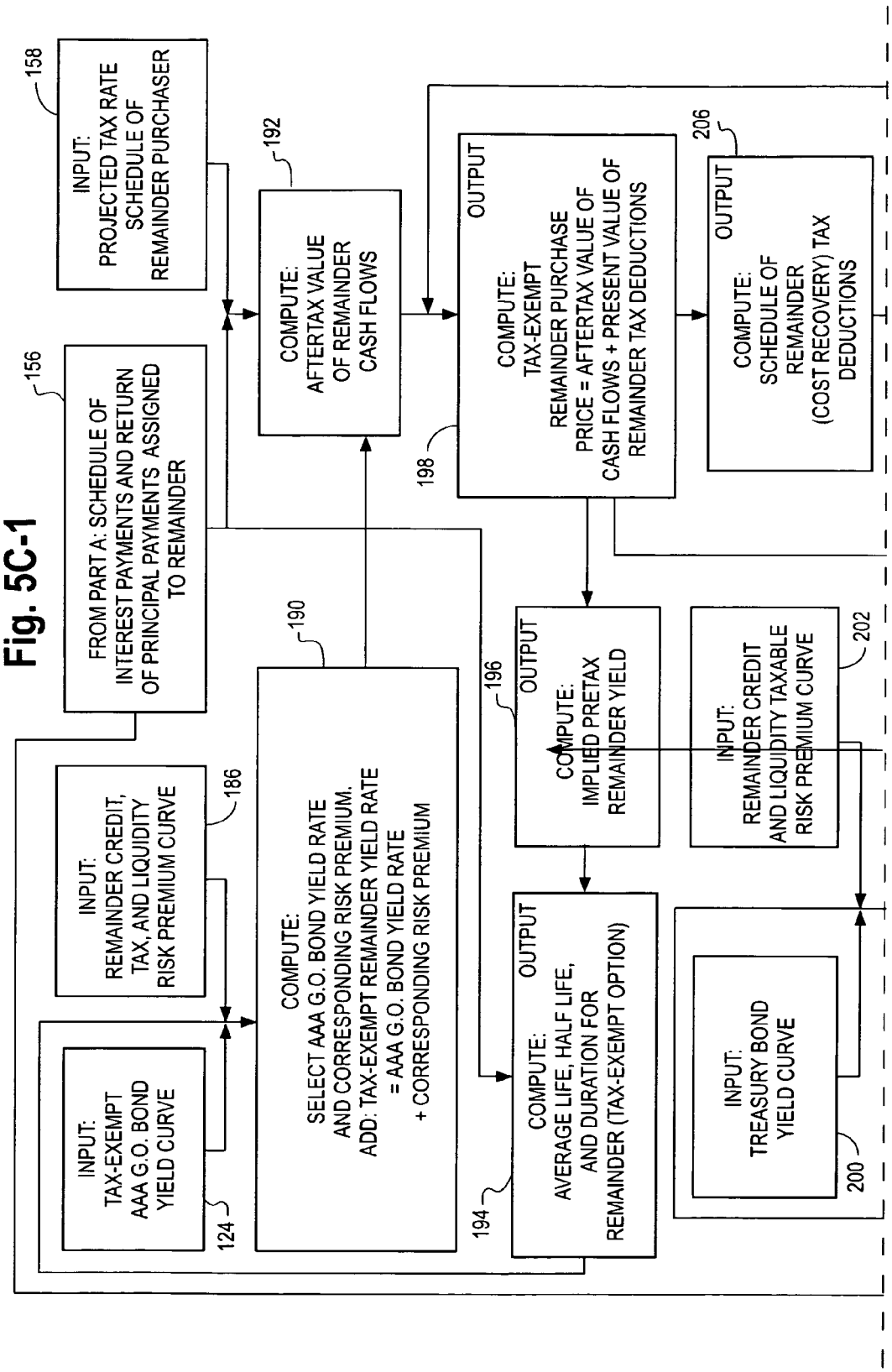
Figures 2, 5C:
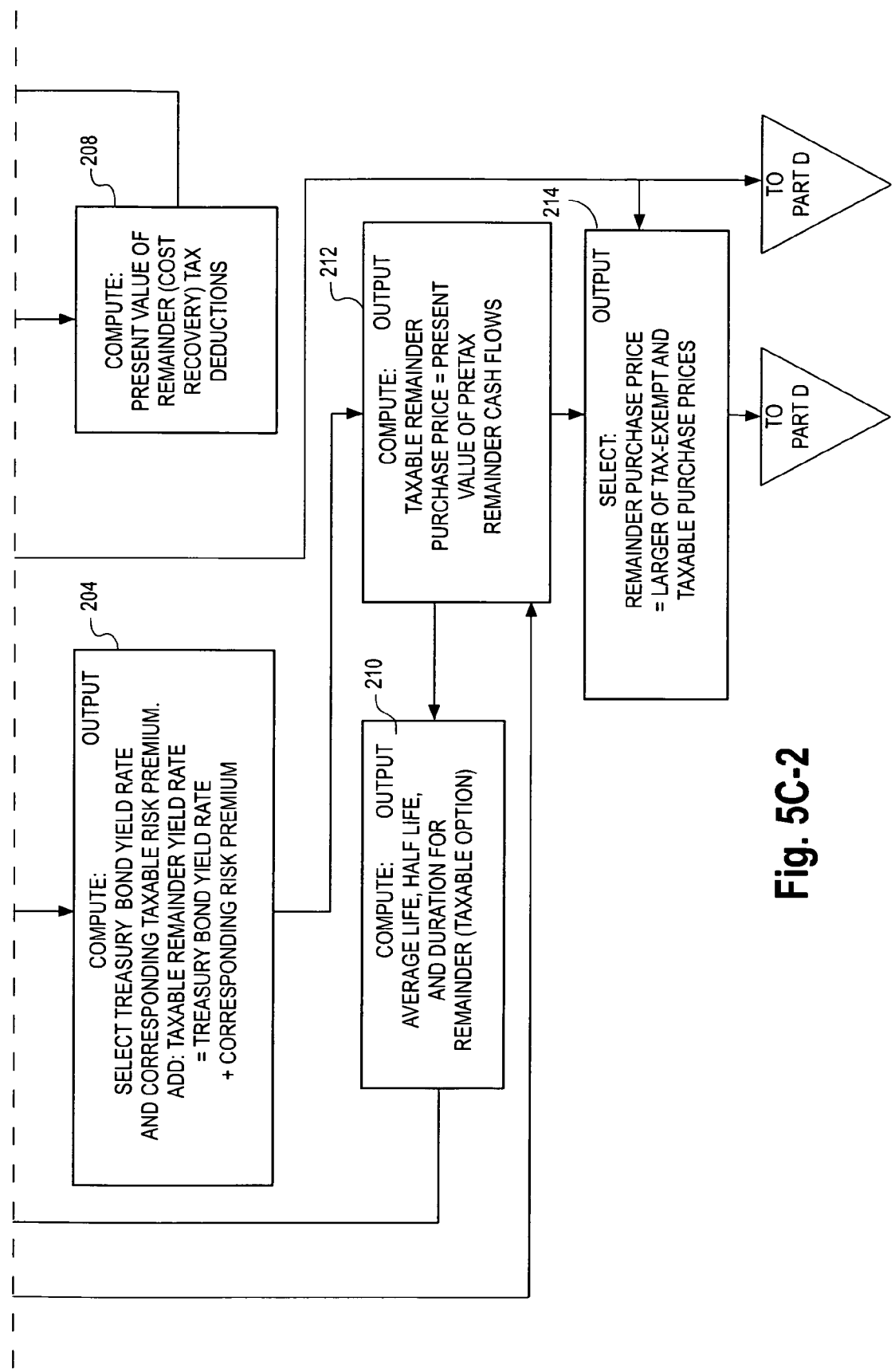
Figures 1, 5D:
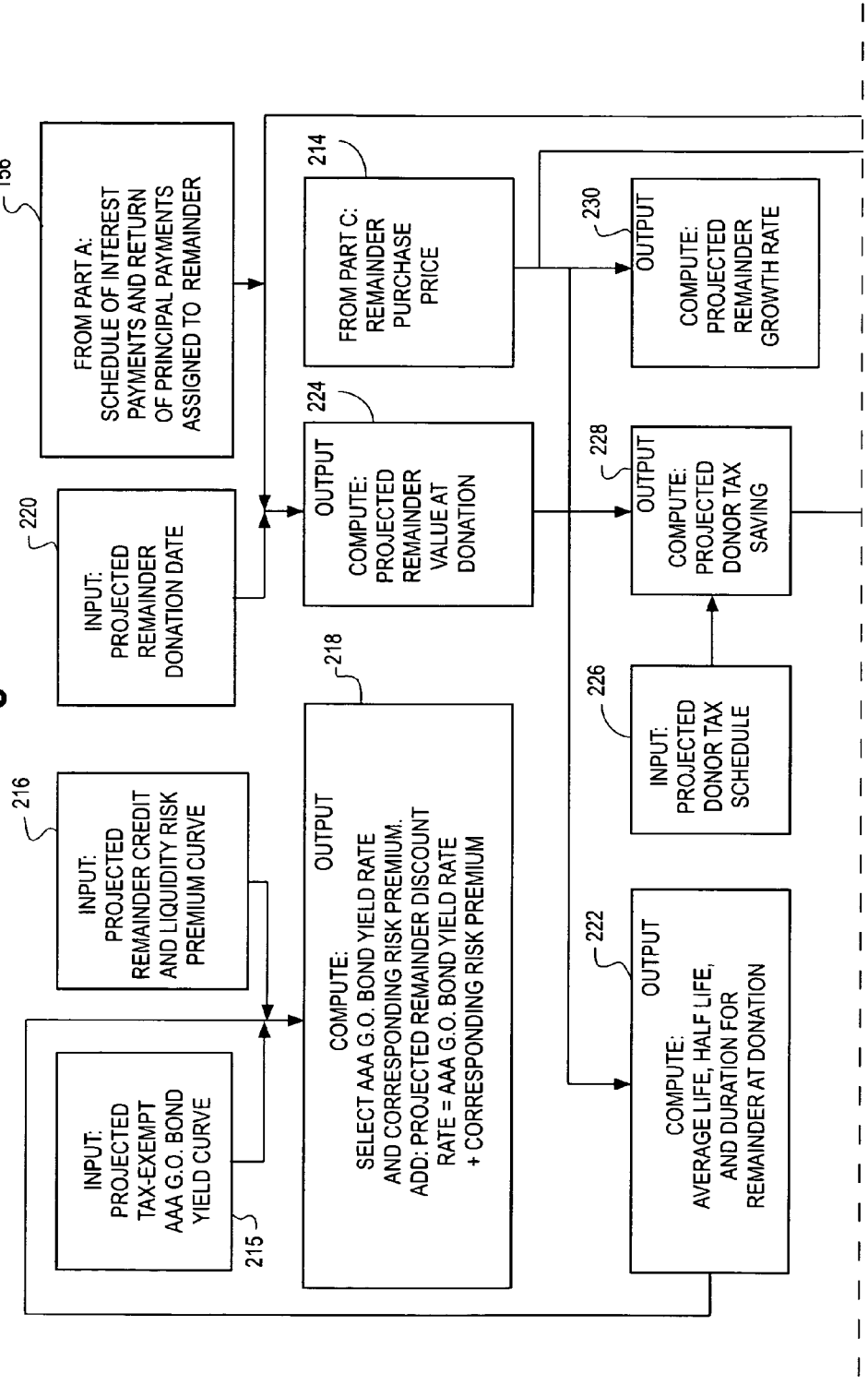
Figures 2, 5D:
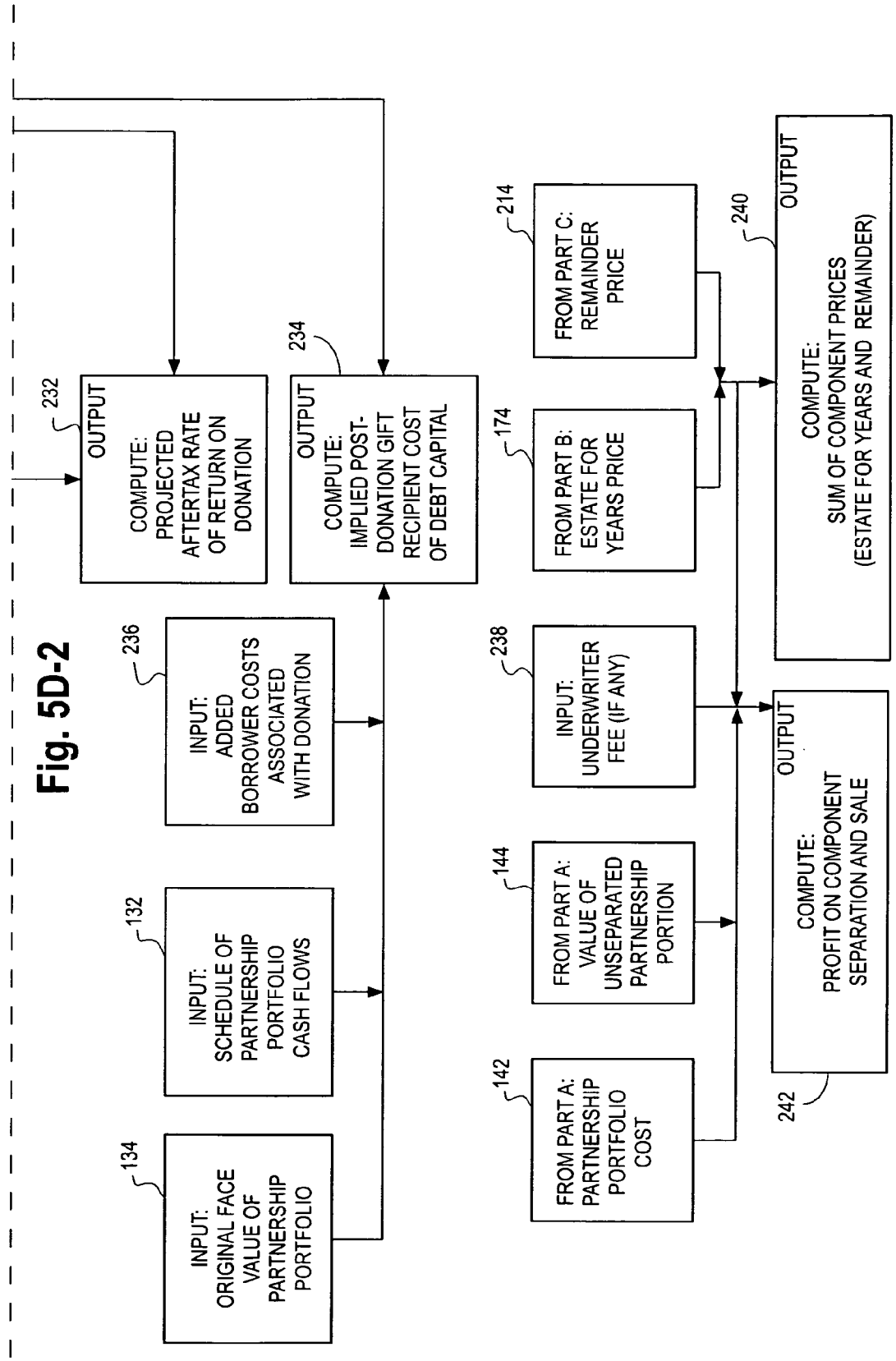

Next a schedule of estate for years amortization deductions is computed in Block 182, a present value of amortization deductions is computed by Block 184, and an updated iterate for the estate for years purchase price is computed by summing the output of Blocks 170 and 184. Then the loop is repeated as shown in FIG. 5(B), until the computed value of the estate for years purchase price ceases to change significantly with additional iterations.

The projected tax schedule of the estate for years purchaser received from Input Data 168 is essential to the valuation of amortization of tax deductions in Block 184. If the estate for years purchaser were assumed to be a tax-exempt investor, the present value of the tax deductions would be zero. This reveals an important point: as with conventional tax-exempt securities, the estate for years component is worth more to a taxable investor than to a tax-exempt investor. Furthermore, as the tax bracket of the estate for years investor increases, so does the value of the estate for years component.

Typically, the projected tax rate schedule received from Input Data 168 will consist of a single tax rate, and some implementations of Logic Means 30 will make this simplification.

It is not always necessary to compute the value of the estate for years component iteratively. If the cash flows from the partnership portfolio are sufficiently regular, for example if debt service payments do not vary and are made at regular intervals (e.g., as is the case for a single-security partnership portfolio with constant debt service payments, and possibly a balloon payment at maturity), then computation of the estate for years purchase price in Block 174 is made via an analytic formula without Block 170 and without iterative computations.

The output of Block 174 shows the value of applying the innovation to tax-exempt securities. The estate for years component generates amortization deductions to shelter a portion of the cash flows received by the estate for years component from taxes. However, because the partnership portfolio is tax-exempt, portions of the cash flows attributed to interest are already tax-exempt. For cases in which tax-exempt interest represents a sufficiently large part of estate for years cash flow, estate for years amortization deductions will be greater than needed to shelter the repayment of principal portions of estate for years cash flows from taxes. These excess amortization deductions can be used to reduce taxes on disbursements from (other) taxable investments, which implies that the estate for years value is greater than the value of the estate for years cash flows alone.

The incremental value represented by excess amortization deductions is computed in Block 176, which subtracts the value of the tax-exempt estate for years cash flows computed in Block 172 from the estate for years purchase price computed in Block 174. Block 176 reveals the business/economic value created by the application of component separation to tax-exempt securities. This invention is not tied to any particular amortization or cost recovery schedule for the estate for years, as long as the contribution of the present value of tax deductions generated by the estate for years component enhances the estate for years value relative to its value as a schedule of tax-exempt cash flows.

Block 178 computes the implied yield on the estate for years component based on cash flow alone. This is an important safety check on the validity of the estate for years amortization deductions, because under current tax law deductions are invalid if they create an asset with negative or zero expected investment return. Because the estate for years is a fixed-income asset, implied yield to maturity based on cash flow alone equals expected investment return. Thus the output of Block 178 must be greater than zero for the prices computed by the invention to be valid.

Block 180 computes the average life, half life, and duration of the estate for years using the full schedule of estate for years cash flows plus projected tax savings. This output is used in the iterative calculation of the estate for years yield rate as in the previous examples of this process.

Computation of the remainder component price entails a complication not present in computing the estate for years price, due to the fact that is a zero-coupon security, i.e., due to the fact that no cash flow is generated during the estate for years term. Consequently, the tax basis of the remainder component will never be large enough to tax shelter all of the return of principal payments received by the remainder, so that a portion of the cash flows received by the remainder investor is subject to federal taxation.

This implies that the remainder component can be valued in at least two ways: (1) as a tax-exempt security, on the basis of its aftertax cash flows; or (2) a conventional taxable security, valued on the basis of its pretax cash flows. In case (1), the projected tax rate schedule of the purchaser affects the computation of the purchase price, whereas in case (2), the purchase price computation is independent of the tax bracket of the purchaser. Logic Means 30 computes the remainder value as a tax-exempt security in Block 198, and the remainder value as a taxable security in Block 212. Logic Means 30 selects the larger value in Block 214, and outputs a recommendation as to the appropriate marketing strategy, i.e., whether to market the remainder as a tax-exempt fixed-income security or a taxable fixed-income security.

As a longer term zero-coupon investment, the regularity or irregularity of remainder cash flows has little to do with asset marketability. Because there is little to gain by rescheduling the remainder cash flows via cash flow warehousing, this degree of complexity is omitted from the structure of the remainder component by the logic means.

Block 190 computes the yield rate for the remainder under the assumption that it is regarded as a tax-exempt security.

The computation of the remainder price in Block 198 proceeds iteratively exactly as in the case of the estate for years, substituting Block 192 for Block 170, Block 206 for Block 182, and Block 208 for Block 184. Also, again as with computation of the estate for years purchase price, the iterations can be avoided and replaced by an analytic formula for the tax-exempt remainder purchase price if the remainder cash flows are assumed to be sufficiently regular.

The computation of the average life of a fixed-income security is based on pretax cash flows and pretax interest rate. Block 196 computes the implied pretax remainder interest rate. This value is identical to the tax-exempt yield rate computed by Block 190 if the tax rate schedule from Input Data 188 is zero, and in general the value computed by Block 196 differs only slightly from the tax-exempt yield rate. The interest rate computed by Block 196 together with the pretax cash flows and the tax-exempt remainder purchase price from Block 198 are used to compute the tax-exempt average life for the remainder in Block 194.

Viewing the remainder as a taxable fixed-income security, the corresponding computations become much simpler. Input Data 200 receives the conventional Treasury yield curve, and Input Data 202 the corresponding (taxable) risk premium curve. Block 204 computes the taxable remainder yield rate, and Block 212 computes the taxable remainder purchase as the present value of the pretax remainder cash flows discounted at the yield rate computed in Block 204. As in previous cases, Block 210 computes the average life, half life, and duration for the taxable remainder, and the average life is fed back to Block 204 to iterate the computation of the taxable remainder yield rate.

Block 240 computes the sum of the estate for years and remainder prices. Block 242 computes a measure of profitability for the separation transaction by computing the difference between: (1) the sum of the estate for years price, the remainder price, the value of the unseparated portion of the partnership interests, and any underwriting fees received in connection with the overall transaction, and (2) the price of the tax-exempt fixed-income portfolio acquired by the partnership.

An additional feature of component decomposition applied to tax-exempt fixed-income portfolios arises because of the zero-coupon nature of the remainder interest.

During the estate for years term, the remainder is a zero-coupon security, and the return earned on the remainder is tax-deferred for a remainder investor; taxes are only due when the estate for years term has expired and the remainder investor begins to receive cash flows, or when the remainder is sold. Consequently, a tax-effective strategy for a philanthropic remainder purchaser would be the following: hold the remainder during the estate for years term while it earns tax-deferred returns, then make a charitable donation of the remainder when the estate for years term expires and take a charitable deduction enhanced by the increase in the remainder value. In addition, the remainder purchaser receives the satisfaction of seeing a favorite charitable foundation or institution receive a substantial fixed-income security as a gift.

Logic Means 30 computes values to describe and measure the value generated by a remainder purchaser through a remainder donation. The key value needed by the remainder purchaser is the projected value of the remainder at the time of the donation. This value is a fixed-income present value computation analogous to the other present value computations made by Logic Means 30 in this application.

Input Data 220 receives the projected date of a remainder donation. Frequently, though not necessarily, the projected donation date will be near the expiration of the estate for years term.

Input Data 215 receives the AAA g. o. curve projected for the date of the donation, and Input Data 216 receives the corresponding risk premium curve projected for that date. Block 218 selects the appropriate AAA base rate and risk premium based on the average life of the remainder at the projected time of the remainder donation, and sums these two rates to obtain the projected discount rate needed to compute the projected present value of the remainder at the time it is donated.

Block 224 computes the projected value of the remainder at the projected donation date; using this value, Block 222 computes the average life, half life, and duration for the remainder at the projected donation date. Using the remainder purchase price computed earlier, Block 230 computes the projected growth rate in the remainder value between the remainder purchase date and the remainder donation date.

Using a projected donor tax rate schedule received by Input Data 228, Block 228 computes the projected value of the donor tax saving generated for the remainder investor by the remainder donation.

Block 232 computes the rate of return for the remainder purchaser from an investment equal in value to the remainder purchase price on the component separation date that generates a return equal in value to the projected value of the donor tax saving at the remainder donation date.

Finally, under the additional assumption that the tax-exempt portfolio held by the partnership is a financial obligation of the intended recipient of the remainder donation, Block 234 subtracts the remainder cash flows after the projected donation date from the tax-exempt portfolio cash flows and recomputes the cost of debt capital on the tax-exempt portfolio based on the remaining cash flows and the initial value of the tax-exempt portfolio. This is an additional piece of financial information to aid the remainder purchaser in gauging the effectiveness of a prospective remainder donation under the assumption that the intended donation recipient is the original issuer of the tax-exempt portfolio; in this case, Block 234 measures the reduction in the cost of capital for the fixed-income debt obligations in the partnership portfolio due to the cancellation of the portion of the debt represented by the remainder component.

E. Interrelated Computer Systems

That aspect of the invention illustrated with respect to FIG. 2, etc., can function in cooperation with other computer systems respectively in different institutions involved in the decomposition. One or both component buyers preferably employ a digital electrical Computer System 243, comprised of a processor in a computer, input means, output means, and logic means, such as preferably a computer program. Computer System 243 in FIG. 6 is programmed to receive and store cash flow and tax deduction schedules provided to the component buyer, or at least some of the Output 24 of System 2. This data can be communicated electronically or by manually entering the data from hard copy produced by System 2 into Computer System 243 by a keyboard. The Computer System 243 is programmed to: (1) compute and/or recompute taxes, (2) complete and/or generate required annual and/or interim tax filing schedules, and/or (3) generate investment portfolio and income accounting reports required by regulatory agencies on a periodic basis from regulated institutional investors. This can include generation of an accounting income and valuation schedule to value an equity interest in a component and income therefrom for accounting purposes between the purchase date of the equity interest and the end of the estate for years term or beyond, based on generally accepted accounting principles, and can include insertion of the income and valuation schedule or portions thereof in investment portfolio and income accounting reporting and documentation. Parameters for this programming are straightforward: the tax code and accounting standards of the regulator(s).

More particularly, this can be characterized as providing a second digital electrical computer controlled by a processor, the processor being controlled by logic means for receiving and storing in memory accessible by the computer electrical signals representing cash flow and tax deduction schedules provided to a component buyer. The logic means is also for manipulating the electrical signals representing cash flow and tax deduction schedules to produce altered electrical signals corresponding to at least one of the group consisting of (1) computing the tax, (2) generating a tax filing schedule, and (3) generating documentation at an output means electrically connected to said second computer.

Computer System 244 has hardware and logic means analogous to Computer System 243, except that the computer system is programmed particularly to examine a different tax and/or investment scenario than that used in the decomposition conducted in accordance with System 2 for at least one of the components, e.g., a tax scenario under a different interpretation of the tax code or a change in the tax code. Computer System 244 is programmed to generate a tax schedule from input data representing: (1) a breakdown of the cash payment schedule into schedules of interest/income payments and return of principal payments, (2) the security purchase price, and—in the case of estate for years securities—(3) the estate for years term. This input data includes at least some of the output 24. The Computer System 244 in FIG. 6 can also be programmed to format the schedule of tax deductions for transmittal to other computer systems, and to store and transmit this schedule in exactly the same way that System 2 does.

Computer System 244 thus can be programmed to compute: (1) independent verification of the tax deduction schedules furnished to purchasers by sellers, and/or (2) a sensitivity analysis of the effect of future modifications in the tax code on the tax deduction schedule generated by the security and/or the effect of these modifications on the present value of the aftertax cash flows.

More particularly, the Computer System 244 can be characterized as providing a second digital electrical computer controlled by third logic means controlling a second processor in manipulating other digital electrical signals representing next input data to the second computer, the next input data characterizing at least one of the at least two components decomposed from the property, the manipulating by the second processor including transforming the other digital electrical signals into other modified digital electrical signals representing a respective value for the at least one of the two components, the respective value being computed to reflect taxation for the components under a second tax and/or investment scenario. Additionally involved is providing second input means electrically connected to the second computer converting the next input data into the other digital electrical signals, and communicating the corresponding other digital electrical signals to the second computer; and providing second output means electrically connected to the second computer for receiving the other modified digital electrical signals from the second computer, and converting the other modified digital electrical signals representing the respective value into a printed document.

Computer System 244 usually computes output values, for example, component prices and expected returns for a specific set of input parameter values at the time property decomposition into components occurs. Computer System 244 can also be programmed to perform risk analysis for the output parameters, e.g., by Monte Carlo analysis, for example, for the expected remainder annual return.

More particularly, an example of a risk analysis input (e.g., in the case of expected remainder annual return) is a probability distribution for the expected property value at a future time (e.g., at the end of the estate for years term) and a set of values for the other input parameters for the embodiment. Computer System 244 can be programmed to generate random samples from the probability distribution for expected future property value, and each random sample for the expected future property value can be combined with the fixed values for the other input parameters and processed to generate a set of output values, including a value for expected annual remainder return. By generating repeated random samples of the multiple future property value (e.g., normally at least one thousand, and usually at least ten thousand), Computer System 244 generates a probability distribution for the expected annual remainder return and can compute investment risk parameters for the expected annual remainder return from the distribution, for example, standard deviation, skewness, and kurtosis.

In cases involving further decomposition of the remainder component into a preferred interest and a residual interest, Computer System 244 also generates a probability distribution for the expected annual residual return and can compute investment risk parameters for the expected annual residual return from the distribution, for example, standard deviation, skewness, and kurtosis.

For the case of support for a decision about a commitment to component decomposition significantly in advance of the expected date for the component decomposition or in advance of the expected date for at least one component purchase, Computer System 144 can compute the probability that the decomposition of property into components and the at least one component purchase will become uneconomical due to changes in the values of input parameters between the date of the analysis and the expected date of component separation.

More particularly, in this case, an example of an additional input for a Computer System 244 risk analysis is a probability distribution for at least one input parameter, for example, a multivariate probability distribution for the following group of input parameters: the yield curve, the risk premium curve for the estate for years component, the risk premium curve for the preferred interest (in cases wherein there is or will be a preferred interest), and the future property value that will be expected at the time of component decomposition. An example of an additional input value for Computer System 244 in this case is at least one of the following: a value for the minimum required annual return for remainder interest investor(s), a value for the minimum required annual return for residual interest investor(s), and a value for the minimum required annual return for estate for years interest investor(s). Computer System 244 generates a multivariate distribution for the output parameters, from which it can compute a risk analysis of the financial success or failure of the transaction. For example, Computer System can compute at least one of the values for the following risk parameters: the probability that the sum of the estate for years purchase price and the remainder interest purchase price will not be sufficient to cover the sale price of the property together with associated expenses such as real estate brokerage commissions and the cost of component decomposition, the expected magnitude of the deficit, the expected magnitude of the deficit given that a deficit does occur, and the below-target semivariance of the deficit.

Computer System 246 is again structurally analogous to that of Computer System 243, with the digital electrical computer being controlled in its signal processing by a processor, etc. However, Computer System 246 can be used by an insurance company, for example, in computing premiums for writing insurance against the savings that accrue to the component purchaser from tax deductions generated by the component. Computing insurance premiums for a given event is a well explored discipline, though in the present case, it would reflect sensitivity analyses of the effect of tax code modifications too. Thus, the invention discussed with respect to FIG. 2 can be employed in combination with software for determining insurance premiums. Because tax deductions are default free, there is no credit risk associated with these deductions that might be reduced by insurance. However, insurance can be written against legislative risk that results from potential (future) changes in the tax law, such as: (1) changes in tax brackets and rates that inversely affect the value of tax deductions generated by the security, and (2) modifications of tax code regulations regarding availability and/or scheduling of tax deductions.

More particularly, Computer System 246 can be characterized as providing a second digital electrical computer controlled by third logic means controlling a second processor in manipulating other digital electrical signals representing next input data to the second computer, the next input data characterizing at least one of the two components decomposed from the property, the manipulating by the second processor including transforming the other digital electrical signals into other modified digital electrical signals representing a respective value under a second tax scenario for the at least one of the two components, the manipulating by the second processor also including transforming the other digital electrical signals into still other modified digital electrical signals representing an insurance premium for insurance against the second tax scenario. Additionally involved is providing second input means electrically connected to the second computer converting the next input data into the other digital electrical signals, and communicating the corresponding other digital electrical signals to the second computer; and providing second output means electrically connected to the second computer for receiving the still other modified digital electrical signals from the second computer, and converting the still other modified digital electrical signals representing the insurance premium into a printed document.

Computer System 246 can also be used by an insurance company in computing premiums for writing insurance against an economic risk in a component. For the case of an estate for years component, this can include insurance to protect the estate for years holder against any property-related risk that might otherwise be assumed by purchase of the estate for years component in cases wherein the existing leases are not bondable net. Insurance for the estate for years component can also include credit enhancement insurance to raise the credit rating of the estate for years component to investment grade in cases wherein one or more existing lessees for the property have below-investment-grade credit ratings. For the case of a remainder component, this can include residual value insurance, which sets a minimum target valuation for the property and insures the remainder interest holder against the risk that the property value will be below the target valuation when the remainder interest matures into ownership of the property.

In the case of residual value insurance for remainders, such policies have been discussed in recent years for conventional real estate ownership. However, in this case they suffer from the defect that the insurer has a subordinate claim on the real estate to any mortgage lender. Thus the insurer can suffer huge losses if tenants default and the mortgage lender forecloses because of temporary cash flow deficiencies, events which have nothing to do with the underlying economics of the real estate. By contrast, residual value insurance on the remainder provides the insurer with an unsubordinated claim on the real estate. This is the rationale for the innovation of residual value insurance for remainders.

Computer System 248 in FIG. 6 is again structurally analogous to that of Computer System 244, except it is programmed, to: (1) receive market-based interest rate inputs, (2) compute the current market-based yield/discount rate for the component, (3) determine the current market/based price of the component by computing the sum of the present values of expected aftertax future cash flows and future purchaser tax savings from tax deductions generated by the component.

Computer System 248 is adapted to provide analytic support for purchasers who might need to sell or resell the component security at some time prior to the maturity date of the security. Thus, making use of logic such as that in FIG. 2, Computer System 248 is programmed to price the security for resale and to compute the schedule of tax deductions generated by the security for the subsequent owner if a resale effort is successful.

More particularly, Computer System 248 can be characterized as providing a second digital electrical computer controlled by third logic means controlling a second processor in manipulating other digital electrical signals representing next input data to the second computer, the next input data characterizing at least one of the two components decomposed from the property, the manipulating by the second processor including transforming the other digital electrical signals into other modified digital electrical signals representing a respective value under a tax scenario for the at least one of the two components, the manipulating by the second processor also including computing current market-based yield/discount rate for the at least one component, and determining a market/based price of the at least one component by computing a sum of present values of expected aftertax future cash flows and future purchaser tax savings from tax deductions generated by the at least one component. Additionally involved is providing second input means electrically connected to the second computer converting the next input data into the other digital electrical signals, and communicating the corresponding other digital electrical signals to the second computer; and providing second output means electrically connected to the second computer for receiving the other modified digital electrical signals from the second computer, and converting the other modified digital electrical signals into an illustration of data corresponding to the other modified electrical signals.

As with any of the above-referenced computer systems and methods for making or using them, the invention extends to any kind of property, including a portfolio of at least one tax-exempt fixed income security. Further, the tax may be computed in different ways, including with an accelerated deduction for at least one of the components, as well as taxation under different interpretations of the existing tax code, or under a changed tax code altogether, without at all departing from the spirit of the invention of the computer system and methods related to electrical signal processing.

VI. CONCLUSION

While a particular embodiment of the present invention has been disclosed, it is to be understood that various different modifications are possible and are within the true spirit of the invention, the scope of which is to be determined with reference to the claims set forth below. Of course, the invention can be carried out by using multiple computers or by using the same computer to handle operations sequentially, as would be equivalent under the circumstances—software embodiments being equivalent to hardwired embodiments, as is well known in the art. There is no intention, therefore, to limit the invention to the exact disclosure presented herein as a teaching of one embodiment of the invention.

SPECIMEN 1 SCREEN 1
ESTATE FOR YEARS/REMAINDER INPUT PARAMETERS

| | |
|---|---:|
| PROPERTY VALUATION: | $28,000,000 |
| TREASURY BOND YIELD BASIS: | 5.40% |
| (AVERAGE LIFE = 5.66) | |
| RENTAL INCOME RISK PREMIUM: | 1.50% |
| ESTATE FOR YEARS TAX RATE: | 40.00% |
| COMPONENT SEPARATION COSTS/FEES: | $800,000 |
| RENTABLE SQUARE FOOTAGE: | 280,940 |
| ZERO-COUPON RISK-FREE RATE: | 10.00% |
| WRAP INSURANCE COST: | 3.00% |
| FUTURE REMAINDER VALUE: | 100.00% |
| INITIAL ANNUAL RENT: | $3,080,000 |
| TERM (MONTHS): | 60 |
| SECOND ANNUAL RENT: | $3,388,000 |
| TERM (MONTHS): | 60 |
| THIRD ANNUAL RENT: | $0 |
| TERM (MONTHS): | 0 |
| FOURTH ANNUAL RENT: | $0 |
| TERM (MONTHS): | 0 |
| FIFTH ANNUAL RENT: | $0 |
| TERM (MONTHS): | 0 |
| SIXTH ANNUAL RENT: | $0 |
| TERM (MONTHS): | 0 |
| SEVENTH ANNUAL RENT: | $0 |
| TERM (MONTHS): | 0 |
| EIGHTH ANNUAL RENT: | $0 |
| TERM (MONTHS): | 0 |
| NINTH ANNUAL RENT: | $0 |
| TERM (MONTHS): | 0 |
| TENTH ANNUAL RENT: | $0 |
| TERM (MONTHS): | 0 |

SPECIMEN 1 SCREEN 2
ESTATE FOR YEARS/REMAINDER OUTPUT PARAMETERS

| | |
|---|---:|
| ESTATE FOR YEARS PURCHASE PRICE: | $22,560,530 |
| ESTATE FOR YEARS TERM (MONTHS): | 120 |
| ESTATE FOR YEARS YIELD RATE: | 6.90% |
| AFTERTAX BOND YIELD RATE: | 4.14% |
| AFTERTAX ESTATE FOR YEARS YIELD: | 4.34% |
| PRETAX BOND EQUIVALENT ESTATE FOR YEARS YIELD: | 7.23% |
| BOND EQUIVALENT ESTATE FOR YEARS VALUE: | $22,772,597 |
| INITIAL RENT/SQUARE FOOT: | $10.96 |
| REMAINDER PURCHASE PRICE: | $6,239,470 |
| GROSS PROPERTY SALE PRICE: | $28,800,000 |
| ANNUAL REMAINDER RETURN: | 16.20% |
| REMAINDER PRICE/SQUARE FOOT: | $22.21 |
| REMAINDER PRICE/SQ. FT. AT ESTATE FOR YEARS MATURITY: | $57.61 |
| CURRENT PRICE/SQ. FT. | $99.67 |
| NET TO SELLER: | |
| INITIAL CAP RATE = | 11.00% |

SPECIMEN 1 SCREEN 3
ADDITIONAL OUTPUT PARAMETERS

| | |
|---|---:|
| PRESENT VALUE OF ENHANCEMENT: | 15.93% |
| PV OF ENHANCEMENT: (DOLLARS) | $4,460,877 |

SPECIMEN 1 SCREEN 4
ADDITIONAL INPUT PARAMETERS

| | |
|---|---:|
| INSURED MINIMUM PROPERTY VALUE: | 50.00% |
| RESIDUAL VALUE INSURANCE PREMIUM FEE: | $1,000,000 |
| ADDITIONAL ASSOCIATED FEES: | $100,000 |
| TREASURY BOND YIELD BASIS: | 6.00% |
| INSURER CREDIT RISK PREMIUM: | 1.50% |
| LIQUIDATION/REFINANCING FEES: | 1.00% |
| EXTRA MONTHS TO RETIRE PREFERRED: | 0 |

ADDITIONAL OUTPUT PARAMETERS

| | |
|---|---:|
| PREFERRED INTEREST ANNUAL RETURN: | 7.50% |
| PREFERRED INTEREST PURCHASE PRICE: | $6,792,715 |
| RESIDUAL INTEREST PURCHASE PRICE: | $546,755 |
| RESIDUAL INTEREST ANNUAL RETURN: | 38.02% |
| REMAINDER-TO-RESIDUAL RATIO: | 11.41 |
| RESIDUAL LEVERAGE RATIO: | 5.59 |
| INSURED VALUE/SQUARE FOOT: | $49.83 |

| SPECIMEN 2 SCREEN 1 ESTATE FOR YEARS/REMAINDER INPUT PARAMETERS | |
|---|---|
| TAX-EXEMPT AAA G.O. BOND BASE: (AVERAGE LIFE = 8.81) | 5.90% |
| ORIGINAL SECURITY RISK PREMIUM: | 1.00% |
| AAA G.O. ESTATE FOR YEARS BASE: (AVERAGE LIFE = 5.66) | 5.70% |
| ESTATE FOR YEARS RISK PREMIUM: | 1.10% |
| AAA G.O. REMAINDER BASE: (AVERAGE LIFE = 12.72) | 6.00% |
| REMAINDER RISK PREMIUM: | 1.00% |
| TREASURY (TAXABLE) REMAINDER BASE: (AVERAGE LIFE = 12.73) | 8.00% |
| REMAINDER (TAXABLE) RISK PREMIUM: | 1.00% |
| ESTATE FOR YEARS TAX RATE: | 40.00% |
| REMAINDER INTEREST TAX RATE: | 40.00% |
| ESTATE FOR YEARS TERM (YEARS): | 10.00 |
| ORIGINAL SECURITY TERM (YEARS): | 15.00 |
| AMORTIZATION TERM (YEARS): | 15.00 |
| ESTATE FOR YEARS GIC RATE: | 4.00% |
| GENERAL PARTNER SHARE: | 1.00% |
| UNDERWRITER FEE: | 0.00% |

| SPECIMEN 2 SCREEN 2 ESTATE FOR YEARS/REMAINDER OUTPUT PARAMETERS | |
|---|---|
| ORIGINAL SECURITY ANNUALIZED YIELD: | 6.90% |
| ESTATE FOR YEARS CASH-ON-CASH YIELD: (CASH FLOW AV. LIFE = 5.60) | 4.21% |
| ESTATE FOR YEARS YIELD: | 6.80% |
| REMAINDER YIELD AS TAX-EXEMPT: (PRETAX YIELD = 8.66%) | 7.00% |
| REMAINDER YIELD AS TAXABLE BOND: | 9.00% |
| ORIGINAL SECURITY DEBT SERVICE: | 10.72% |
| THE REMAINDER VALUE IS HIGHER IF IT IS MARKETED AS A TAX-EXEMPT BOND. ESTATE FOR YEARS PRICE: | 86.59% |
| REMAINDER PRICE AS TAX-EXEMPT: | 18.12% |
| REMAINDER PRICE AS TAXABLE BOND: | 17.38% |
| SUM OF COMPONENT PRICES: | 104.71% |
| PROFIT (INCL.G.P.SHARE + FEE): | 5.71% |

| SPECIMEN 2 SCREEN 3 TRANSACTION DOLLAR AMOUNTS |
|---|
| PRINCIPAL VALUE = $50,000,000 |
| ANNUAL DEBT SERVICE = $5,359,481 |
| ESTATE FOR YEARS PURCHASE PRICE = $43,297,056 |
| REMAINDER PURCHASE PRICE = $9,060,219 |

| SPECIMEN 2 SCREEN 4 REMAINDER DONATION ANALYSIS | |
|---|---|
| INPUT PARAMETERS | |
| PROJECTED AAA G.O. REMAINDER BASE AT ESTATE FOR YEARS MATURITY: (AVERAGE LIFE = 2.68) | 5.75% |
| REMAINDER RISK PREMIUM AT MATURITY: | 1.00% |
| REMAINDER DONOR TAX RATE: | 40.00% |
| ADDITIONAL COST TO BORROWER: | 0.00% |
| OUTPUT PARAMETERS | |
| PROJECTED REMAINDER YIELD AT ESTATE FOR YEARS MATURITY: | 6.75% |
| PROJECTED REMAINDER VALUE AT ESTATE FOR YEARS MATURITY: | 44.93% |
| PROJECTED DONOR TAX SAVING AT ESTATE FOR YEARS MATURITY: | 17.97% |
| PROJECTED DONOR GIFT GROWTH RATE THROUGH ESTATE FOR YEARS TERM: | 9.50% |
| PROJECTED AFTERTAX DONOR ANNUAL RETURN: | −0.08% |
| IMPLIED DONATION RECIPIENT COST OF BORROWED CAPITAL: | 1.48% |
| PROJECTED $$ DONOR TAX DEDUCTION AT ESTATE FOR YEARS MATURITY = $22,463,386 PROJECTED $$ DONOR TAX SAVING = $8,985,354 | |

Specimen 3

Summary of Terms

The Estate for Years Component Security

For Real Estate to be Occupied by Anonymous Mortgage Company at Typical Industrial Park Anytown, Illinois Description of Security:

The security, henceforth known as the "Security," is the sole beneficial interest in a grantor trust that will be established to hold the deed to an estate for years in the land and improvements described in Exhibit A, henceforth known as the "Premises." The estate for years will be created as part of a transaction in which fee simple ownership of the Premises will change hands, the estate for years to be acquired by the trust and the remainder interest to be acquired by a legally separate entity.

The Premises have been fully (100%) pre-leased on a triple-net basis to a single tenant for an initial term of approximately ten years. The lease is uncancellable during the initial term except as described below. The Security entitles the holder to receive Base Rent from the lease on the Premises during the initial lease term, and to re-lease the Premises subject to specified restrictions in the event of premature lease cancellation.

The Security has similar investment characteristics to an asset-backed bond: a debt-like obligation with the right to legal recourse to compel Tenant performance absent Tenant bankruptcy; and in Tenant bankruptcy, a senior claim to repossess the asset (term occupancy of the Premises) that secures the debt-like obligation if the Tenant repudiates the obligation. The general rental agreement formalizes financial restrictions, offering sufficient security for classification of the Security as a fixed-income investment for regulatory purposes.

Description of Security Term:

Expiration of the estate for years term will coincide with expiration of the initial lease term. The period from acquisition of the estate for years by the grantor trust to expiration of the initial lease term will henceforth be known as the "Term."

Covenants in the estate for years deed and the remainder interest deed will provide for claims of the estate for years beneficiary incurred during the Term to survive the Term expiration. The grantor trust indenture will provide for continuation of the trust until all such claims are resolved.

Description of Security Lease:

The Tenant is Anonymous Mortgage Company, a wholly-owned affiliate of Anonymous Conglomerate Corporation. The lease is tentatively scheduled to begin on 15 Oct. 1992, and will expire on the last day of the calendar month that contains the tenth anniversary of the Commencement Eve Date, where the Commencement Eve Date is the day immediately prior to the commencement of the lease term.

Description of Security Cash Flows:

Security cash flows consist of Base Rent from the Anonymous Mortgage lease. Annual Base Rent is determined by multiplying the annual base rent per square foot by the building net square footage. Initial annual Base Rent per square foot is $11.00. The preliminary estimate of net square footage is 100,000 feet, implying an estimated initial Annual Base rent of $1,100,000.

The building net square footage, and hence the initial net rent, will be finalized for the Term as described in Lease Section 3.02 within ten days of the Lease Commencement date.

Annual Base Rent per square foot in subsequent lease years is determined by increasing the base rent per square foot in the preceding year by three percent (3%) and rounding the resulting value off to the nearest cent ($0.01).

Base Rent is due in equal monthly installments at the beginning of each month.

Prepayment:

Security cash flows cannot be reduced by prepayment.

Tax Shields:

From a legal perspective the Security is an income-producing asset, so tax treatment of Security cash flows differs from tax treatment of cash flows generated by debt securities.

Tax deductions generated by the Security arise from amortization of a wasting asset purchase price rather than from the separation of cash flows into taxable and tax-exempt (i.e. interest and principal) components. Since Security deductions are generated by asset characteristics rather than by cash flow receipts, Security tax deductions are independent of cash flows. Consequently, whereas the credit risk of Security cash flows is determined by the credit risk of Anonymous Mortgage, Security tax deductions are default free.

The Security holder is entitled to an annual amortization deduction on the estate for years. The annual deduction is computed by multiplying the Security tax basis by the following ratio: the number of days during the tax year that the grantor trust held the estate for years divided by the number of days remaining in the estate for years on the first day of the tax year that the grantor trust held title.

Amortization deductions are classified for tax reporting purposes as passive deductions, and are subject to the restrictions of the Internal Revenue Code on the use of such deductions to offset taxes on income. These restrictions vary with the tax status and classification of the beneficiary.

Definition of Default:

Any of the following events constitutes a default under the Security lease: failure by Tenant to pay monthly Rent when due, together with failure to pay within ten (10) days after Landlord serves Tenant with written notice of past due Rent; failure by Tenant to perform or observe any other provision of the lease, provided that such failure continues for more than ten (10) days after Landlord gives Tenant written notice of such failure or, if the failure cannot be corrected within the ten (10) day period, provided that Tenant does not commence to correct the failure within the ten (10) day period and thereafter pursue the correction through to completion within a reasonable time, and in any case prior to such time as failure to complete the correction could result in violation of any law, rule, or ordinance; failure by Tenant to pay monthly Rent on time more than three (3) times during any twelve (12) month period, or failure by Tenant to perform or observe any other provision of the lease more than three (3) times during any twelve (12) month period; performance by Tenant of any act that results in the creation of a lien upon the Premises and fails to discharge the lien or post bond for the lien with Landlord as required by Lease Article XX; any attempt by Tenant to make an unpermitted assignment or sublease; failure by Tenant to maintain in force all insurance policies required by the lease, and such failure continues for more than ten (10) days after Landlord gives Tenant written notice of such failure; the filing of a petition against Tenant or any guarantor of the lease under any section of the Bankruptcy Code (and in the case of an involuntary proceeding, the filing is not permanently discharged or vacated within sixty (60) days); if Tenant or any guarantor of the lease becomes insolvent or makes a transfer in fraud of creditors or makes an assignment for the benefit of creditors; a court-authorized appointment of a receiver, custodian, or trustee for substantially all Tenant assets or all assets of or any guarantor of the lease is made and not subsequently vacated within sixty (60) days of the initial appointment date; the cumulative transfer of more than 50% interest in Anonymous Mortgage that results in Anonymous retaining less than a 50% interest Anonymous Mortgage.

Default Recourse:

Security Lease Provisions:

In event of default, Landlord has the right to enter and take possession of the Premises and if Landlord elects, at Tenant's expense release the Premises and/or repair any damage for which Tenant is responsible. In the event that Landlord relets the Premises: Tenant is liable for all costs associated with the default and with recovery of the Premises; all accumulated Rent up to the time the Anonymous Mortgage lease is terminated; costs associated with preparing the Premises for new tenants; and any deficiency between the present value of rent payable by new tenants over the remaining Term and the present value of Anonymous Mortgage rent contracted in the current lease. The deficiency between the present value of total rent payable by the new tenant(s) and contracted total rent in the Anonymous Mortgage lease can be calculated either: before the new lease(s) are signed, on the basis of expected market rent; after the new lease(s) are signed, on the basis of actual rent specified in the new lease(s).

Letter of Credit:

For the duration of the lease Anonymous or a successor Anonymous-affiliated parent of Anonymous Mortgage agrees to provide a one-time two million dollar ($2,000,000) irrevocable letter of credit within two (2) business days of receipt of written notification from Landlord of any one of the following events: Tenant default under the lease that remains uncured for twenty (20) days after written notification to Anonymous Real Estate and which, in the case of nonmonetary default, Tenant has not commenced or has not diligently pursued to cure; a decline in Tenant net worth, as calculated annually, of either more than five percent (5%) of total Tenant assets or below twenty-five million dollars, which continues without correction for ten (10) business days after the determination of the decline. The letter of credit must be issued by a nationally recognized institution with sufficient funds available to fund such a credit instrument at the time of issuance.

In the event that Anonymous Real Estate or its successor Anonymous-affiliated parent fails to provide the agreed-upon letter of credit as required, Anonymous agrees to provide the letter of credit within ten (10) business days of written notification from Landlord of nonperformance of the first-specified provider.

In event of Tenant default(s), Landlord can draw cumulatively against the credit line provided by the letter up to the lesser of the default amount and the remaining balance of the credit line. If Tenant default results in lease termination, the entire remaining balance on the letter of credit will be available immediately to the Landlord.

In event of a Tenant default resulting in lease termination prior to the end of the Term, then effective as of the termination date, the amount deemed due and owing to Landlord pursuant to the Letter of Credit agreement shall be the amount due and owing to Landlord pursuant to the lease remedies provisions.

In event that the scheduled letter of credit expiration date is earlier than the end of the Term, Landlord is entitled to draw upon the full outstanding balance of the credit line unless the letter is renewed at least thirty (30) days prior to scheduled expiration for an amount equal to the remaining outstanding balance.

Interruption of Cash Flows:
Condemnation:

If the entire Premises is acquired or condemned by eminent domain, the lease terminates as of the date the condemning authority takes possession, and total Rent due is adjusted to that date.

If partial condemnation results in the loss by Landlord of at least five percent (5%) of the Building or ten percent (10%) of parking for the Building, then Tenant may elect to terminate the lease within thirty (30) days of final determination of the extent of the loss, termination to occur as of the date the condemning authority takes possession, and total Rent due is adjusted to that date.

If Tenant has the option to terminate the lease but fails to exercise the option, then Landlord shall promptly restore the remaining Premises to a condition comparable to its condition immediately prior to condemnation and the lease shall continue as prior to the condemnation, except that after the effective date of condemnation the Rent shall be reduced as reasonably determined by Landlord if such reduction is reasonably warranted. Tenant waives any right or claim to any part of a compensatory award from the condemning authority to Landlord, and waives any claim against Landlord due to the condemnation.

In any action of eminent domain involving the Premises, the grantor trust and the remainder interest holder make separate compensation claims against the condemning authority. The estate for years deed and the remainder interest deed will disallow condemnation claims of the deed holders against each other.

Damage and Destruction:

The Security holder shall carry rent business interruption insurance applicable to the Premises sufficient to cover Base Rent payments plus all related taxes and operating expenses for a period of 300 days. The cost of business interruption insurance will be reimbursed by the Tenant, including all related appraisal and consulting fees.

If the Building or any portion thereof is damaged or destroyed to such an extent that it cannot be repaired within two hundred seventy days of the event, then the Tenant has the right to terminate the lease by giving the Landlord written notice within the later of (i) thirty (30) days after the event or (ii) five (5) business days after determination that the damage or destruction cannot be repaired within 270 days. The Landlord would continue to receive Base Rent for the period covered by business interruption insurance, and would have the right to relet the Premises after restoration for the remainder of the Term.

In event of destruction or damage to the Building which does not result in lease termination but which renders the Building wholly or partially untenantable, Base Rent shall be abated in proportion to the area so rendered until restoration is completed. However, the Landlord would continue to receive the abated portion of Base Rent plus operating expenses while restoration is under way due to business interruption insurance, unless restoration took longer than 300 days.

If the Building or any portion thereof is destroyed by fire or other cause during the last two (2) years of the lease term, then Tenant shall have the right to terminate the lease by giving written notice to the Landlord within sixty (60) days of the destruction. In this case, the Landlord would continue to receive Base Rent plus taxes and operating expenses from business interruption insurance for 300 days.

Preservation of Asset That Secures Cash Flows:
Grantor Trust:

The grantor trust indenture will charge the trustee with preventing the Security holder from imposing any lien whatsoever on the Premises, with removing any liens imposed by other entities that the Security holder does not promptly seek to remove by all legal means available, and otherwise with passing tenant rent through to the Security holder. Otherwise, ultimate responsibility for Landlord decisions concerning property management, maintenance, insurance and taxes will remain with the Security holder during the Term, although under the Anonymous Mortgage lease the Tenant will assume full responsibility for performance in these areas as prescribed in the lease, together with responsibility for direct payment of all costs associated with performance. The trust indenture assigns the Security holder the general responsibilities accorded financial fiduciaries, reserving other specified services to the trustee as appropriate.

During the final Term year, the Security holder and Anonymous Mortgage are responsible only for management and maintenance costs incurred prior to Term expiration, and only for a pro rata share of tax and insurance expenses based on the ratio of the number of days during the year that fall within the estate for years to the total number of days in the year.

Management and Maintenance:

Anonymous Mortgage assumes full and sole responsibility for the condition, operation, repair, replacement, management and maintenance of the Premises and all improvements thereon. At its own expense, Anonymous Mortgage Company will keep the Premises both clean and in good order and operating condition, and make all necessary repairs (both structural and nonstructural, interior and exterior, ordinary and extraordinary, foreseen and unforeseen, of every nature, kind and description, including parking areas, driveways, sidewalks, landscaping and roadways).

Anonymous Mortgage will maintain, at its own expense, service contracts satisfactory to the Landlord for the following: (i) maintenance for HVAC systems, roof, elevators, landscaping and irrigation, and the parking lot; (ii) fire alarm service; (iii) janitorial service; (iv) security service; (v) snow removal; (vi) exterior window cleaning at least four (4) times per calendar year.

If, after expiration of the sixth (6th) year of the lease term, any capital repairs are required, and such repairs are not required due to (i) the failure of the tenant to perform routine maintenance required by the lease, (ii) tenant negligence, (iii) unusual or excessive tenant use of any system or portion of the Premises, or (iv) any tenant act which voids a warranty that otherwise would reimburse repair costs, then tenant is only required to pay a fraction of the repair cost based on the ratio of the remaining lease term (including exercised options for extension) to the remaining useful life of the item repaired.

Anonymous Mortgage will not make any alterations to the Premises without first obtaining written Landlord consent, which consent shall not be withheld or delayed unreasonably. Landlord may refuse permission for any alterations that are likely to weaken the structure of the Building, which are likely to damage or disrupt the HVAC systems or other major Building systems, or which are visible from the exterior of the Building. All alterations shall be made at Tenant's sole expense, either by Tenant's contractors approved in advance by Landlord or, at Tenant's option, by Landlord on terms reasonable to Tenant, including a fifteen percent (15%) supervisory fee in addition to the net cost of the materials and labor.

Notwithstanding the above, Anonymous Mortgage will pay, in addition to Base Rent, a management fee of one and eight tenths percent (1.8%) of the Base rent for administering the lease and as reimbursement of Landlord expenses for the costs of semiannual maintenance review and other management overhead.

Taxes:

Anonymous Mortgage is responsible for direct payment of all real and personal property-related taxes (except income taxes) as specified in Lease Section 5.01. Tenant will provide Landlord with evidence in the form of official receipts or other acceptable proof that complete payment has been made within thirty (30) days of each assessment due date.

Anonymous Mortgage has the right at its sole expense to contest the validity or amount of any tax, but will first pay the tax under protest.

For taxes and assessments related to the calendar year during which the Term expires, the Security holder is responsible for a pro rata share of taxes and assessments based on the ratio of the number of days during the year that fall within the Term to the total number of days in the year, and the remainder interest holder is responsible for the remaining portion of taxes and assessments. If the lease has not been extended, Anonymous Mortgage is responsible for the portion of taxes attributable to the Security. If the lease has been extended, Anonymous Mortgage is responsible for all property taxes incurred during the calendar year.

Insurance and Indemnification:

Tenant shall obtain and maintain various insurance policies related to the Premises and activities therein. All expenses in connection with Tenant policies shall be the sole responsibility of the Tenant.

Tenant policies shall include the following: All Risk insurance sufficient to cover the replacement cost of Tenant personal property, Building improvements and alterations; business interruption insurance; comprehensive general public liability insurance with limits of not less than $5,000,000 per occurrence; automobile liability insurance of at least $300,000; Worker's Compensation and Employer's Liability insurance; Tenant's All Risk Legal Liability insurance for the replacement cost of the Premises.

Except for events due to Landlord negligence or willful misconduct, Tenant waives all claims against Landlord and agrees to indemnify and hold Landlord harmless for damage to any property, or injury to or death of any person, on or about the Premises. This includes injury or damage to persons or property resulting from fire, explosion, falling plaster, steam, gas, electricity, water, rain, flood, snow, dampness, or leaks from pipes, appliances, plumbing works, roof, floor or ceiling subsurfaces or from the street.

Utilities:

During the Term, Anonymous Mortgage is responsible for all deposits and fees in connection with obtaining and maintaining necessary utility services for the Premises, including but not limited to the following: water, sewage, heat, gas, light, garbage, electricity, telephone, steam and power.

Tenant-Incurred Liens:

Anonymous Mortgage warrants to keep the Premises free from any liens arising from any work performed, materials furnished, or obligations incurred by or on behalf of Anonymous Mortgage. If any such lien is attached and not promptly discharged as prescribed in Lease Section 10.01, Landlord has the right to pay the full amount of the lien without inquiry into its validity, and to bill Tenant as Additional Rent for all expenses connected with the lien removal, including interest and attorneys' fees.

Hazardous Materials and Indemnification:

Tenant is restricted to use of the Premises for executive, sales and administrative purposes. For the restrictions on use and/or handling of hazardous and toxic material, see Lease Article XXV.

Tenant shall indemnify, defend and hold Landlord, its beneficiaries, any managing agents and leasing agents of the Premises, and their respective agents, partners, officers, directors and employees harmless from all damages, costs, losses, expenses (including, but not limited to, actual attorney's fees and engineering fees) arising from or attributable to any breach by Tenant or any of its warranties, representations or covenants in Lease Article XXV. Tenant's obligations hereunder shall survive termination of this lease.

Remainder Interest Liens:

During the Term the remainder interest will be held in a grantor trust. Among the primary responsibilities of the remainder interest trustee will be to prevent any liens whatsoever from being attached to the remainder interest fee.

Tenant Financial Reports:

During each year of the Term, on no later than March 1, Anonymous Mortgage shall provide Landlord with a net worth report as of December 31 of the prior calendar year and the preceding year. The report shall be certified by a nationally recognized accounting firm.

At any time during the Term, up to once per fiscal year, Tenant will, upon ten days prior notice from Trustee A, provide the Trustee with a current financial statement and financial statements for the two (2) preceding fiscal years. The statements will be prepared in accordance with Generally Accepted Accounting Principles.

Specimen 4

Summary of Terms

The Remainder Equity Component Security

For Real Estate to be Occupied by Anonymous Mortgage Company at Typical Industrial Park Anytown, Illinois Description of Security:

The security, henceforth known as the "Security," is the sole beneficial interest in a land or grantor trust, as will be determined, that will be established to hold the deed to the remainder interest in the land and improvements described in Exhibit A, henceforth known as the "Premises." The remainder interest will be created as part of a transaction in which fee simple ownership of the Premises changes hands and is separated into an estate for years and a remainder interest. The remainder interest will be acquired by the Trust and the estate for years will be acquired by a legally separate trust. The trust indenture will assign the Security holder the general responsibilities accorded financial fiduciaries, reserving other specified services to the trustee as appropriate.

The holder of the estate for years will have the right to all rent paid by tenants for occupancy of the Premises during the estate for years term. Covenants in the estate for years deed and the remainder interest deed will provide for claims by the estate for years holder against tenants incurred during the estate for years term to survive expiration of the estate for years term. All other rights of property ownership after expiration of the estate for years term belong to the Security holder.

The Security has similar investment characteristics to a zero-coupon bond: a remainder interest with a specified term and a balloon payment at maturity, and no cash flows prior to maturity. Unlike a zero-coupon bond, the balloon payment at maturity consists of the fee simple interest in real property rather than a nominal cash payment.

Description of Property:

The Premises are located in the Typical Industrial Park, a 400 acre master-planned business park under development in Anytown, Ill. The park is zoned for office and light industrial facilities.

The Building is a two-story, 100,000 square foot build-to-suit office building configured for multitenant occupancy but fully (100%) pre-leased on a triple-net basis to Anonymous Mortgage Company, a wholly-owned affiliate of Anonymous Conglomerate Corporation, for initial term of approximately ten years with options for renewal.

Description of Lease Term:

The Anonymous Mortgage lease is tentatively scheduled to begin on 15 Oct. 1992, and will expire on the last day of the calendar month that contains the tenth anniversary of the Commencement Eve Date, where the Commencement Eve Date is the day immediately prior to the commencement of the lease term. The lease is not cancelable during the initial term except as described below.

The period from acquisition of the remainder interest by the grantor trust to expiration of the initial lease term wi henceforth be known as the "Term."

Automatic Lease Extension:

Anonymous Mortgage Company and the developer have entered into an option agreement (Phase II) under which, at the option of Anonymous Mortgage, a second office building may be constructed and leased on a build-to-suit basis to Anonymous Mortgage on property adjacent to the Premises. In the event the option is exercised, the initial lease term will automatically be extended to cause the expiration of the initial lease term to coincide with the expiration of the 10-year Phase II lease. However, in the event of an extension of the initial lease term, the expiration of the Term of the Security will remain unchanged. The Phase II option to extend the initial lease term expires on Jun. 1, 1993.

Renewal Options:

Anonymous Mortgage shall have options to extend the lease term for two (2) consecutive five (5) year periods, on the same terms, conditions and provisions as contained in the lease agreement for the initial lease term. The first renewal period shall commence on the day after the expiration date for the initial lease term and shall expire on the fifth (5th) anniversary of the expiration date for the initial lease term. The second renewal period shall commence on the day after the expiration date for the first renewal period and shall expire on the fifth (5th) anniversary of the expiration date for the first renewal period.

Exercise of each renewal option shall be exercised by written notice from Tenant to Landlord of Tenant's election to exercise said option. Written notice must be provided not later than twelve (12) months prior to expiration of the then current lease term.

Description of Rent:

Total Rent consists of Base Rent from the Anonymous Mortgage lease, plus Additional Rent to cover property management, maintenance, taxes and insurance as described in subsequent sections. Annual Base Rent is determined by multiplying the annual base rent per square foot by the building net square footage. Initial Annual Base Rent per square foot is $11.00. The preliminary estimate of net square footage is 100,000 feet, implying an estimated initial Annual Base rent of $1,100,000.

The building net square footage, and hence the initial net rent, will be finalized for the Term as described in Lease Section 3.02 within ten days of the Lease Commencement Date.

Annual Base Rent per square foot in subsequent years of the initial lease term (including the Phase II extension option) is determined by increasing the base rent per square foot in the preceding year by three percent (3%) and rounding the resulting value off to the nearest cent ($0.01).

During the first year of the first renewal option period, Annual Base Rent shall be the greater of (i) initial Annual Base Rent on the Lease Commencement Date, increased by three percent (3%) per year compounded annually through the first day of the renewal period, and (ii) ninety-five percent (95%) of the fair market rental rate as defined in Lease Section 26.04(a).

In each successive year of the renewal option period, Annual Base Rent shall increase by an amount equal to three percent (3%) of the Annual Base Rent for the preceding year.

During the first year of the second renewal option period, Annual Base Rent shall be the greater of (i) initial Annual Base Rent on the Lease Commencement Date, increased by three percent (3%) per year compounded annually through the first day of the renewal period, and (ii) the fair market rental rate as defined in Lease Section 26.04(a). In each successive year of the renewal option period, Annual Base Rent shall increase by an amount equal to three percent (3%) of the Annual Base Rent for the preceding year.

Base Rent is due in equal monthly installments at the beginning of each month. Additional Rent is paid directly or as described under "Preservation of Property" and "Damage and Destruction."

Preservation of Property:

Estate for Years Trust:

The trust indenture for the estate for years will forbid the trustee from imposing any lien whatsoever on the Premises and will charge the trustee with removing any liens imposed by other entities that the trust beneficiary does not promptly seek to remove by all legal means available. Otherwise, ultimate responsibility and discretion regarding Landlord decisions concerning property management, maintenance, insurance and taxes will remain with the estate for years trust during the Term, although under the Anonymous Mortgage lease the Tenant will assume full responsibility for performance in these areas as prescribed in the lease, together with responsibility for direct payment of all costs associated with performance. The trust indenture assigns the estate for years beneficiary the general responsibilities accorded financial fiduciaries, reserving other specified services to the estate for years trustee as appropriate.

During the final Term year, the estate for years trust is responsible only for management and maintenance costs incurred prior to Term expiration, and only for a pro rata share of tax and insurance expenses based on the ratio of the number of days during the year that fall within the estate for years to the total number of days in the year.

Management and Maintenance:

Anonymous Mortgage assumes full and sole responsibility for the condition, operation, repair, replacement, management and maintenance of the Premises and all improvements thereon. At its own expense, Anonymous Mortgage Company will keep the Premises both clean and in good order and operating condition, and make all necessary repairs (both structural and nonstructural, interior and exterior, ordinary and extraordinary, foreseen and unforeseen, of every nature, kind and description, including parking areas, driveways, sidewalks, landscaping and roadways).

Anonymous Mortgage will maintain, at its own expense, service contracts satisfactory to the Landlord for the following: (i) maintenance for HVAC systems, roof, elevators, landscaping and irrigation, and the parking lot; (ii) fire alarm service; (iii) janitorial service; (iv) security service; (v) snow removal; (vi) exterior window cleaning at least four (4) times per calendar year.

If, after expiration of the sixth (6th) year of the lease term, any capital repairs are required, and such repairs are not required due to (i) the failure of the tenant to perform routine maintenance required by the lease, (ii) tenant negligence, (iii) unusual or excessive tenant use of any system or portion of the Premises, or (iv) any tenant act which voids a warranty that otherwise would reimburse repair costs, then tenant is only required to pay a fraction of the repair cost based on the ratio of the remaining lease term (including exercised options for extension) to the remaining useful life of the item repaired.

Anonymous Mortgage will not make any alterations to the Premises without first obtaining written Landlord consent, which consent shall not be withheld or delayed unreasonably. Landlord may refuse permission for any alterations that are likely to weaken the structure of the Building, which are likely to damage or disrupt the HVAC systems or other major Building systems, or which are visible from the exterior of the Building. All alterations shall be made at Tenant's sole expense, either by Tenant's contractors approved in advance by Landlord or, at Tenant's option, by Landlord on terms reasonable to Tenant, including a fifteen percent (15%) supervisory fee in addition to the net cost of the materials and labor.

Notwithstanding the above, Anonymous Mortgage will pay, in addition to Base Rent, a management fee of one and eight tenths percent (1.8%) of the Base rent for administering the lease and as reimbursement of Landlord expenses for the costs of semiannual maintenance review and other management overhead.

Taxes:

Anonymous Mortgage is responsible for direct payment of all real and personal property-related taxes (except income taxes) as specified in Lease Section 5.01. Tenant will provide Landlord with evidence in the form of official receipts or other acceptable proof that complete payment has been made within thirty (30) days of each assessment due date.

Anonymous Mortgage has the right at its sole expense to contest the validity or amount of any tax, but will first pay the tax under protest.

For taxes and assessments related to the calendar year during which the Term expires, the estate for years trust is responsible for a pro rata share of taxes and assessments based on the ratio of the number of days during the year that fall within the Term to the total number of days in the year, and the Security holder is responsible for the remaining portion of taxes and assessments. If the lease has not been extended, Anonymous Mortgage is responsible for the portion of taxes attributable to the estate for years. If the lease has been extended, Anonymous Mortgage is responsible for all property taxes incurred during the calendar year.

Insurance and Indemnification:

Tenant shall obtain and maintain various insurance policies related to the Premises and activities therein. All expenses in connection with Tenant policies shall be the sole responsibility of the Tenant.

Tenant policies shall include the following: All Risk insurance sufficient to cover the replacement cost of Tenant personal property, Building improvements and alterations; business interruption insurance; comprehensive general public liability insurance with limits of not less than $5,000,000 per occurrence; automobile liability insurance of at least $300,000; Worker's Compensation and Employer's Liability insurance; Tenant's All Risk Legal Liability insurance for the replacement cost of the Premises.

Except for events due to Landlord negligence or willful misconduct, Tenant waives all claims against Landlord and agrees to indemnify and hold Landlord harmless for damage to any property, or injury to or death of any person, on or about the Premises. This includes injury or damage to persons or property resulting from fire, explosion, falling plaster, steam, gas, electricity, water, rain, flood, snow, dampness, or leaks from pipes, appliances, plumbing works, roof, floor or ceiling subsurfaces or from the street.

Utilities:

During the Term, Anonymous Mortgage is responsible for all deposits and fees in connection with obtaining and maintaining necessary utility services for the Premises, including but not limited to the following: water, sewage, heat, gas, light, garbage, electricity, telephone, steam and power.

Tenant-Incurred Liens:

Anonymous Mortgage warrants to keep the Premises free from any liens arising from any work performed, materials furnished, or obligations incurred by or on behalf of Anonymous Mortgage. If any such lien is attached and not promptly discharged as prescribed in Lease Section 10.01, Landlord has the right to pay the full amount of the lien without inquiry into its validity, and to bill Tenant as Additional Rent for all expenses connected with the lien removal, including interest and attorneys' fees.

Hazardous Materials and Indemnification:

Tenant is restricted to use of the Premises for executive, sales and administrative purposes. For the restrictions on use and/or handling of hazardous and toxic material, see Lease Article XXV.

Tenant shall indemnify, defend and hold Landlord, its beneficiaries, any managing agents and leasing agents of the Premises, and their respective agents, partners, officers, directors and employees harmless from all damages, costs, losses, expenses (including, but not limited to, actual attorney's fees and engineering fees) arising from or attributable to any breach by Tenant or any of its warranties, representations or covenants in Lease Article XXV. Tenant's obligations hereunder shall survive termination of this lease.

Definition of Tenant Default:

Any of the following events constitutes a default under the lease: failure by Tenant to pay monthly Rent when due, together with failure to pay within ten (10) days after Landlord serves Tenant with written notice of past due Rent; failure by Tenant to perform or observe any other provision of the lease, provided that such failure continues for more than ten (10) days after Landlord gives Tenant written notice of such failure or, if the failure cannot be corrected within the ten (10) day period, provided that Tenant does not commence to correct the failure within the ten (10) day period and thereafter pursue the correction through to completion within a reasonable time, and in any case prior to such time as failure to complete the correction could result in violation of any law, rule, or ordinance; failure by Tenant to pay monthly Rent on time more than three (3) times during any twelve (12) month period, or failure by Tenant to perform or observe any other provision of the lease more than three (3) times during any twelve (12) month period; performance by Tenant of any act that results in the creation of a lien upon the Premises and fails to discharge the lien or post bond for the lien with Landlord as required by Lease Article XX; any attempt by Tenant to make an unpermitted assignment or sublease; failure by Tenant to maintain in force all insurance policies required by the lease, and such failure continues for more than ten (10) days after Landlord gives Tenant written notice of such failure; the filing of a petition against Tenant or any guarantor of the lease under any section of the Bankruptcy Code (and in the case of an involuntary proceeding, the filing is not permanently discharged or vacated within sixty (60) days); if Tenant or any guarantor of the lease becomes insolvent or makes a transfer in fraud of creditors or makes an assignment for the benefit of creditors; a court-authorized appointment of a receiver, custodian, or trustee for substantially all Tenant assets or all assets of any guarantor of the lease is made and not subsequently vacated within sixty (60) days of the initial appointment date; the cumulative transfer of more than 50% interest in Anonymous Mortgage that results in Anonymous retaining less than a 50% interest Anonymous Mortgage.

Default Recourse:

In event of default, Landlord has the right to enter and take possession of the Premises and if Landlord elects, at Tenant's expense release the Premises and/or repair any damage for which Tenant is responsible. In the event that Landlord relets the Premises: Tenant is liable for all costs associated with the default and with recovery of the Premises; all accumulated Rent up to the time the Anonymous Mortgage lease is terminated; costs associated with preparing the Premises for new tenants; and any deficiency between the present value of rent payable by new tenants over the remaining Term and the present value of Anonymous Mortgage rent contracted in the current lease. The deficiency between the present value of total rent payable by the new tenant(s) and contracted total rent in the Anonymous Mortgage lease can be calculated either: before the new lease(s) are signed, on the basis of expected market rent; after the new lease(s) are signed, on the basis of actual rent specified in the new lease(s).

Interruption of Rent:

Condemnation:

If the entire Premises is acquired or condemned by eminent domain, the lease terminates as of the date the condemning authority takes possession, with total Rent due is adjusted to that date.

If partial condemnation results in the loss by Landlord of at least five percent (5%) of the Building or ten percent (10%) of parking for the Building, then Tenant may elect to terminate the lease within thirty (30) days of final determination of the extent of the loss, termination to occur as of the date the condemning authority takes possession, with total Rent due is adjusted to that date.

If Tenant has the option to terminate the lease but fails to exercise the option, then Landlord shall promptly restore the remaining Premises to a condition comparable to its condition immediately prior to condemnation and the lease shall continue as prior to the condemnation, except that after the effective date of condemnation the Rent shall be reduced as reasonably determined by Landlord if such reduction is reasonably warranted.

Tenant waives any right or claim to any part of a compensatory award from the condemning authority to Landlord, and waives any claim against Landlord due to the condemnation.

In any action of eminent domain involving the Premises, the grantor trust and the remainder interest holder make separate compensation claims against the condemning authority.

Damage and Destruction:

The Landlord shall carry rent business interruption insurance applicable to the Premises sufficient to cover Base Rent payments plus all related taxes and operating expenses for a period of 300 days. The cost of business interruption insurance will be reimbursed by the Tenant, including all related appraisal and consulting fees.

If the Building or any portion thereof is damaged or destroyed to such an extent that it cannot be repaired within two hundred seventy days of the event, then the Tenant has the right to terminate the lease by giving the Landlord written notice within the later of (i) thirty (30) days after the event or (ii) five (5) business days after determination that the damage or destruction cannot be repaired within 270 days. The Landlord would continue to receive Base Rent for the period covered by business interruption insurance, and would have the right to relet the Premises after restoration for the remainder of the Term.

In event of destruction or damage to the Building which does not result in lease termination but which renders the Building wholly or partially untenantable, Base Rent shall be abated in proportion to the area so rendered until restoration is completed. However, the Landlord would continue to receive the abated portion of Base Rent plus operating expenses while restoration is under way due to business interruption insurance, unless restoration took longer than 300 days.

If the Building or any portion thereof is destroyed by fire or other cause during the last two (2) years of the lease term, then Tenant shall have the right to terminate the lease by giving written notice to the Landlord within sixty (60) days of the destruction. In this case, the Landlord would continue to receive Base Rent plus taxes and operating expenses from business interruption insurance for 300 days.

Tenant Financial Reports:

During each year of the Term, on no later than March 1, Anonymous Mortgage shall provide Landlord with a net worth report as of December 31 of the prior calendar year and the preceding year. The report shall be certified by a nationally recognized accounting firm.

At any time during the Term, up to once per fiscal year, Tenant will, upon ten days prior notice from Trustee A, provide the Trustee with a current financial statement and financial statements for the two (2) preceding fiscal years. The statements will be prepared in accordance with Generally Accepted Accounting Principles.

I claim:

1. A multiple computer system to make financial analysis outputs, the multiple computer system including:

a first computer system controlled to generate a first valuation of a component of property, wherein the property is a tax-exempt fixed-income asset comprised of at least one tax-exempt fixed-income security, as part of a first financial analysis output; and a second computer system including a processor programmed to receive at least some of the first financial analysis output including the first valuation as input, programmed to generate using at least some of said input a second valuation of the component reflecting computation of a yield/discount rate for the property, and controlled to produce a second financial analysis output in consummating a sale and corresponding purchase of the component at a price corresponding to the second valuation, wherein the second financial analysis output includes the price.

2. The multiple computer system of claim 1, wherein the component is a fixed-income debt security.

3. A multiple computer system to make financial analysis outputs, the multiple computer system including:
   a first computer system controlled to generate a first valuation of a component of property, wherein the property is at least one fixed-income asset, as part of a first financial analysis output; and
   a second computer system including a processor programmed to receive at least some of the first financial analysis output including the first valuation as input, programmed to generate using at least some of said input a second valuation of the component reflecting computation of a yield/discount rate for the property, and controlled to produce a second financial analysis output in consummating a sale and corresponding purchase of the component at a price corresponding to the second valuation, wherein the second financial analysis output includes the price.

4. The multiple computer system of claim 3, wherein the at least one fixed-income asset is comprised of corporate debt.

5. The multiple computer system of claim 3, wherein the at least one fixed-income asset is comprised of a security for debt.

6. The multiple computer system of claim 5, wherein the debt is corporate debt.

7. The multiple computer system of claim 3, wherein the yield/discount rate is comprised of a current market-based yield/discount rate.

8. The multiple computer system of claim 7, wherein the at least one fixed-income asset is comprised of a tax-exempt security.

9. An apparatus to make financial analysis outputs, the apparatus including:
   a first computer system controlled to generate a valuation of a component of property, wherein the property is a fixed-income asset, as part of a first financial analysis output; and
   a second computer system including a processor programmed to receive at least some of the financial analysis output as input, programmed to generate using at least some of the input a valuation of the property reflecting computation of a yield/discount rate, and programmed to produce a second financial analysis output in consummating a sale and corresponding purchase of the component at a price corresponding to the valuation of the property, wherein the second financial analysis output includes the price.

10. The apparatus of claim 9, wherein the fixed-income asset is comprised of a corporate debt.

11. The apparatus of claim 9, wherein the fixed-income asset is comprised of at least one security for debt.

12. The apparatus of claim 11, wherein the debt is corporate debt.

13. The apparatus of claim 9, wherein the component is sold to a first buyer and an other component of the property is sold to a second buyer.

14. The apparatus of claim 9, wherein the fixed-income asset is comprised of at least one tax-exempt fixed-income security.

15. The multiple computer system of claim 1, wherein the first valuation reflects an expected return under a performance scenario.

16. The multiple computer system of claim 3, wherein the component is at least one fixed-income security for corporate debt.

17. The multiple computer system of claim 3, wherein the first valuation reflects an expected return under a performance scenario.

18. The multiple computer system of claim 4, wherein the first valuation reflects an expected return under a performance scenario.

19. The multiple computer system of claim 5, wherein the first valuation reflects an expected return under a performance scenario.

20. The multiple computer system of claim 6, wherein the first valuation reflects an expected return under a performance scenario.

21. The multiple computer system of claim 7, wherein the first valuation reflects an expected return under a performance scenario.

22. The multiple computer system of claim 8, wherein the first valuation reflects an expected return under a performance scenario.

23. The apparatus of claim 9, wherein the valuation of a component reflects an expected return under a performance scenario.

24. The apparatus of claim 10, wherein the valuation of a component reflects an expected return under a performance scenario.

25. The apparatus of claim 11, wherein the valuation of a component reflects an expected return under a performance scenario.

26. The apparatus of claim 12, wherein the valuation of a component reflects an expected return under a performance scenario.

27. The apparatus of claim 13, wherein the valuation of a component reflects an expected return under a performance scenario.

28. The apparatus of claim 14, wherein the valuation of a component reflects an expected return under a performance scenario.

29. The multiple computer system of claim 1, wherein the first valuation reflects a price.

30. The apparatus of claim 9, wherein the component is at least one security for debt.

31. The multiple computer system of claim 3, wherein the first valuation reflects a price.

32. The multiple computer system of claim 4, wherein the first valuation reflects a price.

33. The multiple computer system of claim 5, wherein the first valuation reflects a price.

34. The multiple computer system of claim 6, wherein the first valuation reflects a price.

35. The multiple computer system of claim 7, wherein the first valuation reflects a price.

36. The multiple computer system of claim 8, wherein the first valuation reflects a price.

37. The apparatus of claim 9, wherein the wherein the valuation of a component reflects a price.

38. The apparatus of claim 10, wherein the valuation of a component reflects a price.

39. The apparatus of claim 11, wherein the valuation of a component reflects a price.

40. The apparatus of claim 12, wherein the valuation of a component reflects a price.

41. The apparatus of claim 13, wherein the valuation of a component reflects a price.

42. The apparatus of claim 14, wherein the valuation of a component reflects a price.

43. The multiple computer system of claim 1, wherein the first valuation reflects a quantitative description of risk.

44. The apparatus of claim 9, wherein the component is a fixed-income corporate debt security.

45. The multiple computer system of claim 3, wherein the first valuation reflects a quantitative description of risk.

46. The multiple computer system of claim 4, wherein the first valuation reflects a quantitative description of risk.

47. The multiple computer system of claim 5, wherein the first valuation reflects a quantitative description of risk.

48. The multiple computer system of claim 6, wherein the first valuation reflects a quantitative description of risk.

49. The multiple computer system of claim 7, wherein the first valuation reflects a quantitative description of risk.

50. The multiple computer system of claim 8, wherein the first valuation reflects a quantitative description of risk.

51. The apparatus of claim 9, wherein the valuation of a component reflects a quantitative description of risk.

52. The apparatus of claim 10, wherein the valuation of a component reflects a quantitative description of risk.

53. The apparatus of claim 11, wherein the valuation of a component reflects a quantitative description of risk.

54. The apparatus of claim 12, wherein the valuation of a component reflects a quantitative description of risk.

55. The apparatus of claim 13, wherein the valuation of a component reflects a quantitative description of risk.

56. The apparatus of claim 14, wherein the valuation of a component reflects a quantitative description of risk.

57. A computer system to make financial analysis output, the system including:
a processor, an input device and an output device, the processor programmed to manipulate input digital signals received from the input device representing a component of property, wherein the property is more than one fixed-income security, to compute a system-determined purchase price for the component of property and controlled to generate financial analysis output comprised of a financial document for the property and the system-determined purchase price for the component at said output device.

58. A computer system to make financial analysis output, the system including:
a processor programmed to receive input signals and connected to an output means, the input signals representing property, wherein the property is a fixed-income asset, wherein the processor is programmed to compute a system-determined purchase price for the fixed-income asset using at least some of the input signals and controlled to generate financial analysis output, the financial analysis output comprising a financial document including the system-determined purchase price, at said output means.

59. The computer system of claim 58, wherein the fixed-income asset is a corporate debt.

60. The computer system of claim 58, wherein the fixed-income asset is at least one security for debt.

61. The computer system of claim 60, wherein the at least one security is a corporate debt security.

62. The computer system of claim 57, wherein the component is sold to a first buyer and an other component of the property is sold to a second buyer.

63. The computer system of claim 57, wherein the component is comprised of at least one tax-exempt fixed-income security.

64. An apparatus to make financial analysis outputs, the apparatus including:
a first computer system including a processor programmed to receive input signals representing a fixed-income asset and controlled to manipulate the input signals to generate a valuation of a component of the fixed-income asset as part of a first financial analysis output; and
a second computer system including a processor programmed to receive at least some of the first financial analysis output including the valuation as input and controlled to generate, using at least some of the input, a second financial analysis output including a system-determined purchase price for the component in consummating a sale and corresponding purchase of the component.

65. The apparatus of claim 64, wherein the processor of the second computer system is programmed to generate a yield/discount rate for the fixed-income asset using one of the at least some of the input and at least some of the input, and wherein the second financial analysis output includes the yield/discount rate.

66. The apparatus of claim 64, wherein the processor of the second computer system is programmed to generate a yield/discount rate for the fixed-income asset using one of the at least some of the input and at least some of the input, and wherein the system-determined purchase price reflects the yield/discount rate.

67. The apparatus of claim 64, wherein the processor of the second computer system is programmed to generate a yield/discount rate for the component using one of the at least some of the input and at least some of the input, and wherein the system-determined purchase price reflects the yield/discount rate.

68. The apparatus of claim 64, wherein the processor of the first computer system receives the input signals representing more than one fixed-income security for corporate debt as the fixed-income asset.

69. The apparatus of claim 65, wherein the processor of the first computer system receives the input signals representing more than one fixed-income security for corporate debt as the fixed-income asset.

70. The apparatus of claim 66, wherein the processor of the first computer system receives the input signals representing more than one fixed-income security for corporate debt as the fixed-income asset.

71. The apparatus of claim 67, wherein the processor of the first computer system receives the input signals representing more than one fixed-income security for corporate debt as the fixed-income asset.

72. The apparatus of claim 64, wherein the processor of the first computer system receives the input signals representing more than one tax-exempt fixed-income security as the fixed-income asset.

73. The apparatus of claim 65, wherein the processor of the first computer system receives the input signals representing more than one tax-exempt fixed-income security as the fixed-income asset.

74. The apparatus of claim 66, wherein the processor of the first computer system receives the input signals representing more than one tax-exempt fixed-income security as the fixed-income asset.

75. The apparatus of claim 67, wherein the processor of the first computer system receives the input signals representing more than one tax-exempt fixed-income security as the fixed-income asset.

76. A machine to make financial analysis output, the machine including a computer system comprising:
- an input device to receive input data representing a first component of property and a second component of property, wherein at least some of the input data is received from another computer system, wherein the property is a fixed-income asset, and to convert the input data into input signals representing the input data;
- a processor to receive said input signals, wherein the processor is program-controlled to manipulate the input signals to compute a one valuation for the first component and an other valuation for the second component in consummating a one sale and corresponding one purchase of the first component at a one price corresponding to the one valuation and in consummating an other sale and corresponding other purchase of the second component at an other price corresponding to the other valuation; and
- an output device to produce financial analysis output including one of the one valuation and the one price and one of the other valuation and the other price.

77. The machine of claim 76, wherein the first component includes at least one security for corporate debt.

78. The machine of claim 76, wherein the machine is program-controlled to generate a yield/discount rate for the first component using one of the at least some of the input signals and at least some of the input signals, and wherein the one valuation reflects the yield/discount rate.

79. The machine of claim 77, wherein the machine is program-controlled to generate a yield/discount rate for the first component using one of the at least some of the input signals and at least some of the input signals, and wherein the one valuation reflects the yield/discount rate.

80. The machine of claim 76, wherein the machine is program-controlled to generate a yield/discount rate for the first component using one of the at least some of the input signals and at least some of the input signals, and wherein the financial analysis output includes the yield/discount rate.

81. The machine of claim 77, wherein the machine is program-controlled to generate a yield/discount rate for the first component using one of the at least some of the input signals and at least some of the input signals, and wherein the financial analysis output includes the yield/discount rate.

82. The machine of claim 76, wherein the machine is program-controlled to generate a one yield/discount rate and an other yield/discount rate using one of the at least some of the input signals and at least some of the input signals, and wherein the one valuation reflects the one yield/discount rate and the other valuation reflects the other yield/discount rate.

83. The machine of claim 77, wherein the machine is program-controlled to generate a one yield/discount rate and an other yield/discount rate using one of the at least some of the input signals and at least some of the input signals, and wherein the one valuation reflects the one yield/discount rate and the other valuation reflects the other yield/discount rate.

84. The machine of claim 76, wherein the machine is program-controlled to generate a one yield/discount rate for the first component and an other yield/discount rate for the second component using one of the at least some of the input signals and at least some of the input signals, and wherein the financial analysis output includes the one yield/discount rate and the other yield/discount rate.

85. The machine of claim 77, wherein the machine is program-controlled to generate a one yield/discount rate for the first component and an other yield/discount rate for the second component using one of the at least some of the input signals and at least some of the input signals, and wherein the financial analysis output includes the one yield/discount rate and the other yield/discount rate.

86. The machine of claim 76, wherein the financial analysis output includes a financial document.

87. The machine of claim 77, wherein the financial analysis output includes a financial document.

88. The machine of claim 78, wherein the financial analysis output includes a financial document.

89. The machine of claim 79, wherein the financial analysis output includes a financial document.

90. The machine of claim 80, wherein the financial analysis output includes a financial document.

91. The machine of claim 81, wherein the financial analysis output includes a financial document.

92. The machine of claim 82, wherein the financial analysis output includes a financial document.

93. The machine of claim 83, wherein the financial analysis output includes a financial document.

94. The machine of claim 84, wherein the financial analysis output includes a financial document.

95. The machine of claim 85, wherein the financial analysis output includes a financial document.

96. The machine of claim 76, wherein the first component is at least one corporate debt security and the second component is an other at least one corporate debt security.

97. The machine of claim 77, wherein the first component is one of said at least one security for corporate debt and the second component is an other security for corporate debt.

98. A method of using a machine to make financial analysis output, the machine including a computer system comprising a processor and an output device, the method comprising:
- receiving input signals representing input data at a processor, the input data representing a first component of property and a second component of property, wherein at least some of the input data is received from another computer system, wherein the property is a fixed-income asset;
- program-controlling the processor to manipulate the input signals to compute a one valuation for the first component and an other valuation for the second component in consummating a one sale and corresponding one purchase of the first component to a one buyer at a one price corresponding to the one valuation and in consummating an other sale and corresponding other purchase of the second component to an other buyer at an other price corresponding to the other valuation, and;
- producing financial analysis output including one of the one valuation and the one price and one of the other valuation and the other price at an output device.

99. The method of claim 98, wherein the program-controlling includes program-controlling the processor to compute the one valuation for the first component including at least one security for corporate debt.

100. The method of claim 98, wherein the program-controlling includes generating a yield/discount rate for the first component using one of the at least some of the input signals and at least some of the input signals, and wherein the one valuation reflects the yield/discount rate.

101. The method of claim 99, wherein the program-controlling includes generating a yield/discount rate for the first component using one of the at least some of the input signals and at least some of the input signals, and wherein the one valuation reflects the yield/discount rate.

102. The method of claim 98, wherein the program-controlling includes generating a yield/discount rate for the first component using one of the at least some of the input signals and at least some of the input signals, and wherein the financial analysis output includes the yield/discount rate.

103. The method of claim 99, wherein the program-controlling includes generating a yield/discount rate for the first component using one of the at least some of the input signals and at least some of the input signals, and wherein the financial analysis output includes the yield/discount rate.

104. A computer system to make financial analysis output having a system-determined purchase price for at least one component from property in consummating a sale, the system comprising:
an input device converting input data, representing at least one component from property, wherein the property is a fixed-income asset, into input digital electrical signals representing the input data;
a digital electrical computer system controlled by a processor electrically connected to receive said input digital electrical signals and electrically connected to an output means, the processor controlled to manipulate electrical signals to compute a system-determined purchase price for at least one component from property in consummating a sale and corresponding purchase of the component, and to generate financial analysis output at said output means.

105. The system of claim 104, wherein the digital electrical computer processor manipulates the electrical signals to generate the system-determined purchase price for corporate debt as the fixed income asset.

106. A computer system to make financial analysis output, the system comprising:
an input device to receive input data representing a component of property from an other computer system, wherein the property is a fixed-income asset, and to convert the input data into input signals representing the input data;
a processor connected to the input device to receive said input signals and connected to an output device, wherein the processor is controlled to manipulate the input signals to compute a system-determined purchase price for the component in consummating a sale and corresponding purchase of the component and to generate financial analysis output including the system-determined purchase price at said output device.

107. The computer system of claim 106 that includes said input device, wherein the processor is controlled to compute the system-determined purchase price for at least one fixed-income security for corporate debt as the component of the fixed-income asset.

108. The computer system of claim 106 that includes said input device, wherein the processor is controlled to compute the system-determined purchase price for at least one tax-exempt fixed-income security as the component of the fixed-income asset.

109. The computer system of claim 106 that includes said input device, wherein the processor is programmed to generate a yield/discount rate for the fixed-income asset using one of the at least some of the input and at least some of the input, and wherein the financial analysis output includes the yield/discount rate.

110. The computer system of claim 106 that includes said input device, wherein the processor is programmed to generate a yield/discount rate for the fixed-income asset using one of the at least some of the input and at least some of the input, and wherein the system-determined purchase price reflects the yield/discount rate.

111. The computer system of claim 106 that includes said input device, wherein the processor is programmed to generate a yield/discount rate for the component using one of the at least some of the input and at least some of the input, and wherein the system-determined purchase price reflects the yield/discount rate.

112. The computer system of claim 107 that includes said input device, wherein the processor is programmed to generate a yield/discount rate for the fixed-income asset using one of the at least some of the input and at least some of the input, and wherein the financial analysis output includes the yield/discount rate.

113. The computer system of claim 107 that includes said input device, wherein the processor is programmed to generate a yield/discount rate for the fixed-income asset using one of the at least some of the input and at least some of the input, and wherein the system-determined purchase price reflects the yield/discount rate.

114. The computer system of claim 107 that includes said input device, wherein the programmed to generate a yield/discount rate for the component using one of the at least some of the input and at least some of the input, and wherein the system-determined purchase price reflects the yield/discount rate.

115. The computer system of claim 108 that includes said input device, wherein the processor is programmed to generate a yield/discount rate for the fixed-income asset using one of the at least some of the input and at least some of the input, and wherein the financial analysis output includes the yield/discount rate.

116. The computer system of claim 108 that includes said input device, wherein the processor is programmed to generate a yield/discount rate for the fixed-income asset using one of the at least some of the input and at least some of the input, and wherein the system-determined purchase price reflects the yield/discount rate.

117. The computer system of claim 108 that includes said input device, wherein the processor is programmed to generate a yield/discount rate for the component using one of the at least some of the input and at least some of the input, and wherein the system-determined purchase price reflects the yield/discount rate.

118. The method of claim 98, wherein the program-controlling includes generating a one yield/discount rate and an other yield/discount rate using one of the at least some of the input signals and at least some of the input signals, and wherein the one valuation reflects the one yield/discount rate and the other valuation reflects the other yield/discount rate.

119. The method of claim 99, wherein the program-controlling includes generating a one yield/discount rate and an other yield/discount rate using one of the at least some of the input signals and at least some of the input signals, and wherein the one valuation reflects the one yield/discount rate and the other valuation reflects the other yield/discount rate.

120. The method of claim 98, wherein the program-controlling includes generating a one yield/discount rate for the first component and an other yield/discount rate for the second component using one of the at least some of the input signals and at least some of the input signals, and wherein the financial analysis output includes the one yield/discount rate and the other yield/discount rate.

121. The method of claim 99, wherein the program-controlling includes generating a one yield/discount rate for the first component and an other yield/discount rate for the second component using one of the at least some of the input signals and at least some of the input signals, and wherein the financial analysis output includes the one yield/discount rate and the other yield/discount rate.

122. The method of claim 98, wherein the financial analysis output includes a financial document.

123. The method of claim 99, wherein the financial analysis output includes a financial document.

124. The method of claim 100, wherein the financial analysis output includes a financial document.

125. The method of claim 101, wherein the financial analysis output includes a financial document.

126. The computer system that includes said input device of any one of claims 106 to 117, wherein the processor is controlled to generate the financial analysis output comprising a financial document including the system-determined purchase price.

127. The method of claim 122, wherein the financial document includes one of the one price and the other price.

128. The multiple computer system of any one of claims 1, 3 to 8, 15, 17 to 22, 29, 31 to 36, 43, 45 to 50, further including a financial exchange through which the sale is consummated.

129. The computer system of any one of claims 57 to 63, further including a financial exchange through which a sale of the property is consummated.

130. The apparatus of any one of claims 9 to 14, 23 to 28, 37 to 42, 51 to 56, 64 to 75, further including a financial exchange through which the sale is consummated.

131. The method of claim 102, wherein the financial analysis output includes a financial document.

132. The method of claim 103, wherein the financial analysis output includes a financial document.

133. The method of claim 118, wherein the financial analysis output includes a financial document.

134. The method of claim 119, wherein the financial analysis output includes a financial document.

135. The method of claim 120, wherein the financial analysis output includes a financial document.

136. The method of claim 121, wherein the financial analysis output includes a financial document.

137. The method of claim 98, wherein the first component is at least one corporate debt security and the second component is an other at least one corporate debt security.

138. The method of claim 99, wherein the first component is one of said at least one security for corporate debt and the second component is an other security for corporate debt.

139. A computer system to make financial analysis output, the system comprising:
an input device to convert input data representing a component of property, wherein the property is a fixed-income asset, into input signals representing the input data;
a processor connected to receive said input signals and connected to an output device, wherein the processor is controlled to manipulate the input signals to compute a system-determined purchase price for the component in consummating a sale and corresponding purchase of the component and to generate financial analysis output including the system-determined purchase price at said output device.

140. The computer system of claim 139, wherein the processor is controlled to compute the system-determined purchase price for at least one fixed-income security as the component of the fixed-income asset.

141. The computer system of claim 139, wherein the processor is controlled to compute the system-determined purchase price for at least one fixed-income security for corporate debt as the component of the fixed-income asset.

142. The computer system of claim 139, wherein the processor is controlled to compute the system-determined purchase price for at least one tax-exempt fixed-income security as the component of the fixed-income asset.

143. The computer system of claim 139, wherein the processor is programmed to generate a yield/discount rate for the fixed-income asset using one of the at least some of the input and at least some of the input, and wherein the financial analysis output includes the yield/discount rate.

144. The computer system of claim 140, wherein the processor is programmed to generate a yield/discount rate for the fixed-income asset using one of the at least some of the input and at least some of the input, and wherein the financial analysis output includes the yield/discount rate.

145. The computer system of claim 141, wherein the processor is programmed to generate a yield/discount rate for the fixed-income asset using one of the at least some of the input and at least some of the input, and wherein the financial analysis output includes the yield/discount rate.

146. The computer system of claim 142, wherein the processor is programmed to generate a yield/discount rate for the fixed-income asset using one of the at least some of the input and at least some of the input, and wherein the financial analysis output includes the yield/discount rate.

147. The computer system of claim 139, wherein the processor is programmed to generate a yield/discount rate for the fixed-income asset using one of the at least some of the input and at least some of the input, and wherein the system-determined purchase price reflects the yield/discount rate.

148. The computer system of claim 140, wherein the processor is programmed to generate a yield/discount rate for the fixed-income asset using one of the at least some of the input and at least some of the input, and wherein the system-determined purchase price reflects the yield/discount rate.

149. The computer system of claim 141, wherein the processor is programmed to generate a yield/discount rate for the fixed-income asset using one of the at least some of the input and at least some of the input, and wherein the system-determined purchase price reflects the yield/discount rate.

150. The computer system of claim 142, wherein the processor is programmed to generate a yield/discount rate for the fixed-income asset using one of the at least some of the input and at least some of the input, and wherein the system-determined purchase price reflects the yield/discount rate.

151. The computer system of claim 139, wherein the processor is programmed to generate a yield/discount rate for the component using one of the at least some of the input and at least some of the input, and wherein the system-determined purchase price reflects the yield/discount rate.

152. The computer system of claim 140, wherein the processor is programmed to generate a yield/discount rate for the component using one of the at least some of the input and at least some of the input, and wherein the system-determined purchase price reflects the yield/discount rate.

153. The computer system of claim 141, wherein the processor is programmed to generate a yield/discount rate for the component using one of the at least some of the input and at least some of the input, and wherein the system-determined purchase price reflects the yield/discount rate.

154. The computer system of claim 142, wherein the processor is programmed to generate a yield/discount rate for the component using one of the at least some of the input and at least some of the input, and wherein the system-determined purchase price reflects the yield/discount rate.

155. The computer system of claim 106, wherein the processor is controlled to compute the system-determined purchase price for at least one fixed-income security as the component of the fixed-income asset.

156. The computer system of claim 155, wherein the processor is programmed to generate a yield/discount rate for the fixed-income asset using one of the at least some of the input and at least some of the input, and wherein the financial analysis output includes the yield/discount rate.

157. The computer system of claim 155, wherein the processor is programmed to generate a yield/discount rate for the fixed-income asset using one of the at least some of the input and at least some of the input, and wherein the system-determined purchase price reflects the yield/discount rate.

158. The computer system of claim 155, wherein the processor is programmed to generate a yield/discount rate for the component using one of the at least some of the input and at least some of the input, and wherein the system-determined purchase price reflects the yield/discount rate.

159. The computer system that includes said input device of any one of claims 106 to 117,155 to 158, wherein the processor is program-controlled to manipulate the input signals to compute the system-determined purchase price in consummating the sale and corresponding purchase.

160. The computer system of any one of claims 139 to 154, wherein the processor is program-controlled to manipulate the input signals to compute the system-determined purchase price for the component in consummating the sale.

161. The multiple computer system of any one of claims 1, 3 to 8, wherein the processor of the second computer system is controlled to produce the second financial analysis output comprising a financial document for the property including the system-determined purchase price.

162. The apparatus of any one of claims 9 to 14, wherein the second financial analysis output includes a financial document for the property.

163. The computer system that includes said input device of any one of claims 106 to 117, 155 to 158, further including a financial exchange through which the sale is consummated.

164. A method to make financial analysis output, the method comprising:
   receiving input signals at a processor in a computer system, the input signals representing data received from another computer system, the data including data associated with a component of property, wherein the property is a fixed-income asset;
   controlling the processor to manipulate at least some of the input signals to compute a valuation for the component in consummating a sale and corresponding purchase of the component at a price corresponding to the valuation; and
   producing financial analysis output including one of the valuation and the price at an output device connected to the processor.

165. The method of claim 164, wherein the controlling includes computing the valuation for at least one fixed-income security as the component of the fixed-income asset.

166. The method of claim 164, wherein the controlling includes computing the valuation for at least one fixed-income security for corporate debt as the component of the fixed-income asset.

167. The method of claim 164, wherein the controlling includes computing the valuation for at least one tax-exempt fixed-income security as the component of the fixed-income asset.

168. The method of claim 164, wherein the controlling includes generating a yield/discount rate for the fixed-income asset using one of the at least some of the input signals and at least some of the input signals, and wherein the financial analysis output includes the yield/discount rate.

169. The method of claim 165, wherein the controlling includes generating a yield/discount rate for the fixed-income asset using one of the at least some of the input signals and at least some of the input signals, and wherein the financial analysis output includes the yield/discount rate.

170. The method of claim 166, wherein the controlling includes generating a yield/discount rate for the fixed-income asset using one of the at least some of the input signals and at least some of the input signals, and wherein the financial analysis output includes the yield/discount rate.

171. The method of claim 167, wherein the controlling includes generating a yield/discount rate for the fixed-income asset using one of the at least some of the input signals and at least some of the input signals, and wherein the financial analysis output includes the yield/discount rate.

172. The method of claim 164, wherein the controlling includes generating a yield/discount rate for the fixed-income asset using one of the at least some of the input signals and at least some of the input signals, and wherein the valuation reflects the yield/discount rate.

173. The method of claim 165, wherein the controlling includes generating a yield/discount rate for the fixed-income asset using one of the at least some of the input signals and at least some of the input signals, and wherein the valuation reflects the yield/discount rate.

174. The method of claim 166, wherein the controlling includes generating a yield/discount rate for the fixed-income asset using one of the at least some of the input signals and at least some of the input signals, and wherein the valuation reflects the yield/discount rate.

175. The method of claim 167, wherein the controlling includes generating a yield/discount rate for the fixed-income asset using one of the at least some of the input signals and at least some of the input signals, and wherein the valuation reflects the yield/discount rate.

176. The method of claim 164, wherein the controlling includes generating a yield/discount rate for the component using one of the at least some of the input signals and at least some of the input signals, and wherein the valuation reflects the yield/discount rate.

177. The method of claim 165, wherein the controlling includes generating a yield/discount rate for the component using one of the at least some of the input signals and at least some of the input signals, and wherein the valuation reflects the yield/discount rate.

178. The method of claim 166, wherein the controlling includes generating a yield/discount rate for the component using one of the at least some of the input signals and at least some of the input signals, and wherein the valuation reflects the yield/discount rate.

179. The method of claim 167, wherein the controlling includes generating a yield/discount rate for the component using one of the at least some of the input signals and at least some of the input signals, and wherein the valuation reflects the yield/discount rate.

180. The method of any one of claims 164 to 179, further including a financial exchange through which the sale is consummated.

181. The method of any one of claims 164 to 179, wherein the processor of the computer system is program-controlled to produce the financial analysis output comprising a financial document for the property.

182. The method of claim 181, wherein the financial document includes the price.

183. The method of claim 164, wherein the controlling includes program-controlling the processor to compute the valuation.

184. The method of claim 164, wherein the controlling includes controlling the processor to compute an other valuation for an other component of the property in consummating an other sale and corresponding other purchase of the other component at an other price corresponding to the other valuation, and wherein the producing includes producing the financial analysis output including one of the other valuation and the other price.

185. The method of claim 184, wherein the controlling includes program-controlling the processor to compute the other valuation.

186. The method of any one of claims 184 to 185, wherein the controlling includes computing the other valuation for the other component including at least one security for corporate debt.

187. The method of any one of claims 184 to 186, wherein the controlling includes generating a yield/discount rate for the other component using one of the at least some of the input signals and at least some of the input signals, and wherein the other valuation reflects the yield/discount rate.

188. The method of any one of claims 183 to 186, wherein the controlling includes generating a yield/discount rate for the other component using one of the at least some of the input signals and at least some of the input signals, and wherein the financial analysis output includes the yield/discount rate.

189. The method of any one of claims 183 to 188, further including a financial exchange through which the other sale is consummated.

190. The method of any one of claims 183 to 188, wherein the financial analysis output includes a financial document for the property.

191. The computer system of claim 139, wherein the processor is controlled to compute an other system-determined purchase price for an other component of the property in consummating an other sale and corresponding other purchase of the other component, and wherein the financial analysis output includes the other system-determined purchase price.

192. The computer system of claim 191, wherein the processor is controlled to compute the other system-determined purchase price for a tax-exempt fixed-income asset as the component.

193. The computer system of claim 191, wherein the processor is controlled to compute the other system-determined purchase price for the other component including at least one security for corporate debt.

194. The computer system of any one of claims 191 to 193, wherein the processor is programmed to generate a yield/discount rate for the other component using one of the at least some of the input signals and at least some of the input signals, and wherein the other system-determined purchase price reflects the yield/discount rate.

195. The computer system of any one of claims 191 to 193, wherein the processor is programmed to generate a yield/discount rate for the other component using one of the at least some of the input signals and at least some of the input signals, and wherein the financial analysis output includes the yield/discount rate.

196. The computer system of any one of claims 191 to 195, further including a financial exchange through which the other sale and corresponding other purchase is consummated.

197. The computer system of any one of claims 191 to 195, wherein the financial analysis output includes a financial document for the property.

198. The computer system that includes said input device of any one of claims 155 to 158, wherein the processor is controlled to generate the financial analysis output comprising a financial document including the system-determined purchase price.

199. The computer system of any one of claims 139 to 154, wherein the financial analysis output includes a financial document for the property.

* * * * *